(12) United States Patent
Sweet et al.

(10) Patent No.: US 9,497,224 B2
(45) Date of Patent: Nov. 15, 2016

(54) SYSTEMS AND METHODS FOR IMPLEMENTING COMPUTER SECURITY

(71) Applicant: CloudPassage, Inc., San Francisco, CA (US)

(72) Inventors: Carson Sweet, San Francisco, CA (US); Vitaliy Geraymovych, Baltimore, MD (US)

(73) Assignee: CloudPassage, Inc., San Francisco, CA (US)

( * ) Notice: Subject to any disclaimer, the term of this patent is extended or adjusted under 35 U.S.C. 154(b) by 0 days.

(21) Appl. No.: 14/511,368

(22) Filed: Oct. 10, 2014

(65) Prior Publication Data
US 2015/0058619 A1  Feb. 26, 2015

Related U.S. Application Data

(63) Continuation-in-part of application No. 13/854,513, filed on Apr. 1, 2013, now Pat. No. 9,065,804, which is a continuation of application No. 13/205,948, filed on Aug. 9, 2011, now Pat. No. 8,412,945.

(51) Int. Cl.
*G06F 21/00* (2013.01)
*H04L 29/06* (2006.01)
(Continued)

(52) U.S. Cl.
CPC .............. *H04L 63/20* (2013.01); *G06F 21/55* (2013.01); *G06F 21/56* (2013.01); *G06F 21/577* (2013.01);
(Continued)

(58) Field of Classification Search
None
See application file for complete search history.

(56) References Cited

U.S. PATENT DOCUMENTS

| | | |
|---|---|---|
| 6,385,497 B1 | 5/2002 | Ogushi et al. |
| 6,505,248 B1 | 1/2003 | Casper et al. |

(Continued)

FOREIGN PATENT DOCUMENTS

| | | |
|---|---|---|
| EP | 1 818 833 A1 | 8/2007 |
| TW | 200839632 A | 10/2008 |
| WO | WO 2011-116459 | 9/2011 |
| WO | WO 2015/026476 A3 | 2/2015 |

(Continued)

OTHER PUBLICATIONS

Almgren, et al. "A Lightweight Tool for Detecting Web Server Attacks", pp. 1-14, Global Security Analysis Laboratory, IBM Research, Zurich Research Laboratory, Rueschlikon, Switzerland.

(Continued)

*Primary Examiner* — Farid Homayounmehr
*Assistant Examiner* — Maung Lwin
(74) *Attorney, Agent, or Firm* — Morgan, Lewis & Bockius LLP

(57) ABSTRACT

A security server transmits a specification of a first set of files and directories to a computing device for monitoring according to a security policy. Each of the files or directories in the first set is associated with the operating system of the computing device or associated with an application running on the computing device. The server securely receiving data collected at the remote computing device, which includes metadata for the files and directories and content signatures computed for each file. The server compares the received metadata and content signatures for each file or directory against corresponding baseline metadata and baseline content signatures. The baseline metadata and baseline content signatures are stored at the security server. When there is a mismatch between the received metadata and corresponding baseline metadata or a mismatch between a received content signature and a corresponding baseline content signature, the server performs a remedial action.

39 Claims, 40 Drawing Sheets

| File type | Added/Deleted | Content | Metadata | Target path |
|---|---|---|---|---|
| Text or binary file | Yes | Yes | Yes | |
| Directory | Yes | | Yes | |
| Symbolic link | Yes | | Yes | Yes |
| Device/special file | Yes | | Yes | |
| Windows Registry key | Yes | Yes | Yes | |

(columns labeled 1202, 1204, 1206, 1208, 1210)

(51) Int. Cl.
  *G06F 21/56* (2013.01)
  *G06F 21/57* (2013.01)
  *G06F 21/55* (2013.01)
  *H04L 29/08* (2006.01)

(52) U.S. Cl.
  CPC ....... *H04L 63/0428* (2013.01); *H04L 63/0227* (2013.01); *H04L 63/0807* (2013.01); *H04L 63/126* (2013.01); *H04L 63/166* (2013.01); *H04L 67/20* (2013.01)

(56) References Cited

U.S. PATENT DOCUMENTS

| | | | |
|---|---|---|---|
| 6,839,850 B1 | 1/2005 | Campbell et al. | |
| 7,017,185 B1 | 3/2006 | Wiley et al. | |
| 7,017,186 B2 | 3/2006 | Day | |
| 7,028,228 B1 | 4/2006 | Lovy et al. | |
| 7,143,444 B2 | 11/2006 | Porras et al. | |
| 7,418,490 B1 | 8/2008 | Zhang et al. | |
| 7,551,976 B2 | 6/2009 | Arima et al. | |
| 7,596,227 B2* | 9/2009 | Illowsky | G06F 1/3203 380/277 |
| 7,657,926 B1 | 2/2010 | Baker | |
| 7,747,736 B2 | 6/2010 | Childress et al. | |
| 7,975,031 B2 | 7/2011 | Bhattacharya et al. | |
| 7,987,444 B2 | 7/2011 | Fuller, et al. | |
| 7,991,764 B2 | 8/2011 | Rathod | |
| 7,991,859 B1 | 8/2011 | Miller et al. | |
| 7,996,836 B1 | 8/2011 | McCorkendale et al. | |
| 8,005,879 B2 | 8/2011 | Bornhoevd et al. | |
| 8,005,966 B2 | 8/2011 | Pandya | |
| 8,214,875 B2* | 7/2012 | John | H04L 63/102 726/1 |
| 8,281,396 B2 | 10/2012 | Ahmad et al. | |
| 8,484,694 B2 | 7/2013 | Diebler et al. | |
| 8,490,188 B2 | 7/2013 | Kandek et al. | |
| 8,539,545 B2 | 9/2013 | Kartha et al. | |
| 8,677,499 B2 | 3/2014 | Lim | |
| 8,843,561 B2 | 9/2014 | Chen et al. | |
| 8,925,093 B2 | 12/2014 | Ahmad et al. | |
| 9,026,646 B2 | 5/2015 | Whitlock et al. | |
| 9,088,615 B1* | 7/2015 | Avlasov | G06F 21/577 |
| 2002/0052715 A1 | 5/2002 | Maki | |
| 2004/0039798 A1 | 2/2004 | Hotz et al. | |
| 2004/0039803 A1 | 2/2004 | Law | |
| 2005/0050345 A1* | 3/2005 | Dowdy | G06F 21/10 713/193 |
| 2005/0246547 A1 | 11/2005 | Oswald et al. | |
| 2006/0010289 A1* | 1/2006 | Takeuchi | G06F 3/0605 711/114 |
| 2006/0150157 A1 | 7/2006 | Fellenstein et al. | |
| 2006/0262786 A1 | 11/2006 | Shimizu et al. | |
| 2007/0208918 A1 | 9/2007 | Harbin et al. | |
| 2007/0282986 A1 | 12/2007 | Childress et al. | |
| 2008/0060080 A1 | 3/2008 | Lim | |
| 2008/0083031 A1 | 4/2008 | Meijer et al. | |
| 2008/0098478 A1* | 4/2008 | Vaidya | G06F 21/34 726/24 |
| 2008/0109396 A1 | 5/2008 | Kacin | |
| 2008/0141372 A1* | 6/2008 | Massey | H04L 63/145 726/23 |
| 2008/0244747 A1* | 10/2008 | Gleichauf | G06F 11/1415 726/25 |
| 2008/0276309 A1* | 11/2008 | Edelman | G06F 21/335 726/9 |
| 2009/0044250 A1 | 2/2009 | Krahn et al. | |
| 2009/0064312 A1* | 3/2009 | Furuichi | G06F 21/84 726/16 |
| 2009/0132703 A1 | 5/2009 | Fellenstein et al. | |
| 2009/0178103 A1* | 7/2009 | Graham | G06F 21/6281 726/1 |
| 2009/0288161 A1* | 11/2009 | Wei | G06F 21/52 726/22 |
| 2009/0293056 A1 | 11/2009 | Ferris et al. | |
| 2009/0300607 A1 | 12/2009 | Ferries et al. | |
| 2009/0300719 A1 | 12/2009 | Ferries et al. | |
| 2009/0307744 A1 | 12/2009 | Nanda et al. | |
| 2010/0064009 A1 | 3/2010 | Chen et al. | |
| 2010/0211782 A1 | 8/2010 | Auradkar et al. | |
| 2012/0023546 A1 | 1/2012 | Kartha et al. | |
| 2012/0131635 A1* | 5/2012 | Huapaya | H04L 9/088 726/1 |
| 2012/0158725 A1 | 6/2012 | Molloy et al. | |
| 2012/0254957 A1 | 10/2012 | Fork et al. | |
| 2014/0109169 A1 | 4/2014 | Kandek et al. | |
| 2014/0137228 A1 | 5/2014 | Shema et al. | |
| 2014/0268245 A1 | 9/2014 | Kawach et al. | |
| 2014/0310408 A1 | 10/2014 | Kirner et al. | |
| 2014/0310415 A1 | 10/2014 | Kirner et al. | |
| 2015/0127832 A1 | 5/2015 | Kirner et al. | |
| 2015/0128211 A1 | 5/2015 | Kirner et al. | |
| 2015/0128212 A1 | 5/2015 | Scott et al. | |

FOREIGN PATENT DOCUMENTS

| | | | |
|---|---|---|---|
| WO | WO 2015/066208 A1 | 5/2015 | |
| WO | WO 2015/066369 A1 | 5/2015 | |
| WO | WO 2015/066648 A1 | 5/2015 | |

OTHER PUBLICATIONS

Daniels, et al. "A Network Audit System for Host-based Intrusion Detection (NASHID) in Linux", pp. 1-10, Purdue University, CERIAS Technical Report 99/10.

Porras, et al. "EMERALD: Event Monitoring Enabling Responses to Anomalous Live Disturbances", pp. 1-13, Computer Science Laboratory, 20th NISSC, Oct. 9, 1997.

J.D. Meier, et al., "Improving Web Application Security: Threats and Countermeasures" Microsoft Corporation—patterns & practices—https://msdn.microsoft.com/en-us/library/ff647642.aspx, pp. 1-7, published Jun. 2007.

An Overview of Vulnerability Scanners, Feb. 2008, pp. 1-16.

Dell KACE K1000 Series, Management Appliance, 2010, pp. 1-15.

Myerson, J., "Cloud computing versus grid computing: Service types, similarities and differences, and things to consider," Mar. 3, 2009, IBM Corporation 2009, 8 pages.

U.S. Appl. No. 61/810,480, filed Apr. 10, 2013.

U.S. Appl. No. 61/899,468, filed Nov. 4, 2013.

\* cited by examiner

╭─ 1402 Example target files for integrity monitoring

*Linux:*
   /vmlinux
   /usr/sbin/httpd
   /etc/passwd

*Windows:*
   C:\Windows\regedit.exe
   C:\Program Files\WinZip\WINZIP64.EXE

Figure 14A

╭─ 1404 Example target directories for integrity monitoring

*Linux:*
   /bin   (objects in the /bin directory)
   /etc   (objects in /etc)

*Windows:*
   C:\Windows\System32   (objects in the System32 subfolder of the Windows folder)
   C:\Program Files\   (objects in the Program Files folder)

Figure 14B

╭─ 1406 Example target registry key for integrity monitoring

HKEY_LOCAL_MACHINE\SOFTWARE\Microsoft\Windows NT\CurrentVersion\Winlogon\Shell

Figure 14C

SYSTEMS AND METHODS FOR IMPLEMENTING COMPUTER SECURITY

RELATED APPLICATIONS

This application is a continuation-in-part of U.S. patent application Ser. No. 13/854,513, filed Apr. 1, 2013, entitled "Systems and Methods for implementing Security in a Cloud Computing Environment," which is a continuation of U.S. patent application Ser. No. 13/205,948, filed Aug. 9, 2011, entitled "Systems and Methods for implementing Security in a Cloud Computing Environment," each of which is incorporated by reference herein in its entirety.

TECHNICAL FIELD

The present application relates generally to systems and methods for imposing scalable security in a cloud computing environment.

BACKGROUND

The tremendous scalability, flexibility, and speed of Infrastructure-as-a-Service (IaaS) makes it one of the fastest-growing sectors of the cloud computing markets. IaaS providers combine virtualization technologies with substantial infrastructure to deliver bandwidth, storage, and processing power on-demand and with granular control over scale and costs. The benefits of hosting applications and workloads on cloud servers are enormous, making cloud servers the de facto norm for a rapidly growing set of use cases.

Security and compliance, however, remain major challenges to adoption of public cloud infrastructure services. Usage agreements and documentation squarely make the user of IaaS, not the provider, responsible for protecting servers, applications and data in the cloud—essentially everything from the virtual machine operating system upward in the stack.

One challenge to IaaS is that cloud servers attract e-criminals. Online fraud has grown into a sophisticated underground economy that requires infrastructure on a massive scale. Phishing, password cracking, and denial of service attacks leverage botnets. Botnets are illicit networks built from huge numbers of compromised servers and personal computers. Botnets consist of thousands of "zombies", personal computers infected by malware, which carry out commands on behalf of the botnet operator. These compromised computers can bombard web servers with denial-of-service attacks, fire thousands of password attempts per hour, and participate in dozens of other online cracking activities.

Fraudsters and e-criminals use command-and-control software to coordinate zombie attack execution. Command-and-control very frequently operates from compromised servers, without the server owner's knowledge. Fraudsters demand a constant stream of freshly compromised servers to keep botnets running. An entire underground business known as bot herding has emerged to capitalize on this illicit need.

Bot-herders make their living by building botnets to then sell or rent to other e-criminals. This practice has evolved to the point of Fraud-as-a-Service, the sale of prebuilt botnets on demand, for a few hundred dollars a month. It takes bot herders' time and resources to seek out and compromise vulnerable servers. Economies of scale and cost-benefit apply to a bot herding business just as any other. Compromising an elastic cloud infrastructure environment can return a windfall versus hacking into a traditional hardware server. If a bot-herder is able to place command-and-control software on a virtual machine that later is duplicated through cloning or cloud bursting, the botnet capacity will automatically grow. For stakeholders in cloud hosting environments, the implication is a higher expectation of being targeted for server takeovers, root-kitting and botnet command-and-control insertions.

An additional security concern for IaaS is that servers have more exposure in the cloud. More specifically, servers hosted in public IaaS environments have more exposure to compromise than servers do within the traditional data center, where layers of perimeter controls defend server weaknesses from exploit. Cloud IaaS environments rarely offer the control over network topology required to implement perimeter security strategies. As a result, vulnerabilities on each cloud server are more exposed to compromise than those in a traditional data center.

In a typical private data center environment, security chokepoints and/or network demarcation zones (DMZs) exist; firewalls, intrusion detection systems (IDS) and unified threat management devices easily inspect external traffic from sources such as Internet connectivity. Typically, hardware acceleration within the data center boosts performance and compensates for the processing demands required to inspect and control all network traffic in and out of an organization. Because public IaaS environments rarely offer control over hardware or topology, these control mechanisms are unavailable to enterprises hosting servers there.

Traditional perimeter security depends heavily on control over network factors like IP addressing, physical topology and routing. Customers of cloud IaaS have far less of this control; the cloud provider usually dictates network addressing and routing. Server IP addresses are unpredictable, creating serious complications in configuring security mechanisms. Public IaaS environments also typically segment network traffic at the virtual machine level, meaning the only traffic a server can see is its own. It is not possible to use network-level intrusion detection systems, intrusion prevention system or wire-level unified threat management mechanisms in this environment. The performance implications of each cloud server performing traffic inspection at the wire level are staggering, especially given the lack of hardware control. Additionally, the wire-level access to network traffic required of network intrusion detection systems is rarely, if ever, afforded to customers of cloud servers; in multi-tenant cloud environments, such access is impossible since multiple customers share the same network, and allowing access to operate a network IDS would expose multiple customers' network traffic to capture.

Even in a traditional data center with perimeter defenses in place, server-level security such as hardening, secure application configuration, and patch management are important. In the cloud, where front-line defenses are extremely limited, server-level security protection is important. Cloud servers are largely on their own to protect themselves. Strong and highly automated host-based controls that implement all needed capabilities at the host level are important.

An additional security concern for IaaS is that cloud elasticity multiplies attack surfaces. Elasticity is a key differentiator distinguishing IaaS from other infrastructure hosting models. Servers are no longer boxes mounted to racks bolted to the floor. With virtualization and cloud technologies, servers are now files and metadata that can be instantly copied, migrated, and stored offline for later reactivation. Uncontrolled copies of virtual servers and their content can be maliciously or accidentally created nearly instantly; such copies can easily be re-activated in environments also uncontrolled by the server owner. Therefore, only security that is implemented within (and therefore is copied and moves with) a virtual computer is able to protect that virtual computer without regard for its operating location.

Cloud elasticity provides companies with the ability to cloudburst, expanding the number of servers and available computer power within minutes. However, this significantly increases the risk of compromise. The problem is quite simply that as a virtual server duplicates so do its vulnerabilities and exposures. Given the speed with which servers can multiply, this issue can increase the attackable surface area of a cloud server farm dramatically within minutes.

Inactive machine images or snapshots are virtual machines that are saved for later reactivation or as a template for new servers. While this capability is clearly useful, offline server images, being inactive, do not get updates regarding newly discovered vulnerabilities, policy changes, or modification to user accounts and access rights. When a hibernated server is reactivated, there will be access privileges, software vulnerabilities, and outdated configurations that expose it to immediate compromise.

When adopting a cloud-hosting model, system administrators and other stakeholders should be aware of and account for these issues. One incorrectly configured server, either created recently or resurrected from storage, could multiply during cloning and cloud-bursting operations to become the "typhoid Mary" of the cloud farm.

Another challenge to IaaS arises during development of application code in cloud hosting environments. Many organizations, like small businesses and autonomously-operating business units, turn to cloud hosting for application development Public cloud hosting reduces barriers to application development, increasing speed to market for technology related products. Special infrastructure skills, network configuration and hardware setup time are minimal. This is an attractive proposition, especially for business and technology managers frustrated with real or perceived delays and "red tape" associated with infrastructure setup. Sometimes central information technology organizations sanction cloud-based development efforts; in some instances, individual business units charge ahead independently. At some point, all successful development projects go into production. Sometimes the application continues to run in the public cloud environment. Often the application code comes back in-house with the cloud server in a ready-to-run virtual machine image.

If cloud servers used for development are not secured properly, undesired results may occur. These servers are highly exposed, and often the dynamic nature of application development masks signs of intrusion. Compromise impact could include code theft or insertion of malicious functionality into the new application. Any live data used for development purposes, a poor but disturbingly frequent practice, could be at risk and compromised with the server. If rootkits or other malware are dropped onto the cloud server, that malware could come back to the enterprise data center, making a cloud server into a powerful and dangerous Trojan horse.

As the above background details, clearly there is a new set of exposures and risks associated with hosting applications, data and workloads in public IaaS environments. Existing technologies that secure computers are not adequate at addressing such exposures. For instance, hardware based security devices cannot be used by a virtual machine, because virtual machine owners have no ability to deploy hardware. In many public cloud infrastructure hosting environments, the owner of the virtual machine has absolutely no control over hardware in any manner. Server security strategies that depend on creating network perimeter controls are also inadequate because virtual machine owners do not have enough control over the networking environment to implement perimeters. Server security strategies that focus on putting security controls at the host level (host-based security) are also ineffective because existing host-based security technologies almost exclusively perform computation on the computer being protected, which consumes large amounts of computing, storage and other resources on each individual computer. Placing multiple host-based security technologies on a single virtual machine would cause untenable levels of resource consumption on that computer, rendering it unsatisfactory at performing its actual computing function.

The issues above make it clear that improvements in server security management are needed; specifically creation of an elastic security management capability for virtual machines that does not impact the performance of the virtual machine being protected and is able to implement security controls that move with the virtual machine. Conventional perimeter-oriented methods of protection that have worked for years are highly problematic or completely untenable in these environments. The dynamic nature of public and hybrid cloud server farms further complicates matters. The lack of options to protect servers in high-risk public clouds can impede companies from embracing public IaaS and thereby realizing the benefits of IaaS. Thus, there is a need in the art for security measures that secure IaaS servers in an automated, portable, and elastic manner.

SUMMARY

The present disclosure provides security measures that secure virtual computers, especially those in virtualized or cloud-computing (IaaS) environments in an automated, portable, and elastic manner. The present disclosure addresses the needs in the art by making novel use of a system including an agent executive that operates within a virtual machine that securely interoperates with a remote grid computer system specifically optimized for security computation. The aforementioned system provides for security, compliance and integrity of virtual machines by providing related management and automation functions, non-limiting examples of which include virtual machine firewall management, software vulnerability detection, configuration compliance monitoring, system integrity monitoring, detection of intrusion attempts and proactive intervention to prevent intrusion attempts and/or correct vulnerable virtual machine states.

The system depicted in this disclosure provides for dramatic advances in the art, specifically in the methods by which such security, compliance and integrity management functions can be automatically monitored, maintained and managed centrally in a manner that can scale from few to many virtual machines; in the capability to automatically and securely provision and de-provision virtual machines that are cloned, suspended, re-activated and/or moved frequently and in large numbers; in the capability to centrally manage virtual computers that are operating concurrently in a plurality of data centers, collocation providers, cloud hosting providers, and/or Infrastructure-as-a-Service (IaaS) providers; and in the capability to implement secure, reliable communication of management capabilities that can operate in and across untrustworthy or hostile networking and hosting environments.

The fundamental operation of the system includes the initialization of the agent executive upon first execution; an initial and ongoing process to verify the agent executive integrity; and an ongoing cycle in which the agent executive retrieves commands from the remote grid computer system, executes those commands, returns information to the remote grid computer as needed, and the analysis of returned information by the remote grid computer. Based on the remote grid computer's analysis of information retrieved from the agent, additional commands may be issued to the agent executive to implement needed changes to the virtual computer on which the agent operates. Additionally, the agent executive may autonomously perform scheduled actions that are independent from the remote grid computer.

When first executed, the new agent executive must be initialized. The agent executive acquires an API key from a user or by automated means. The agent executive communicates this API key to a remote grid computer system, which creates and assigns a new unique agent identity token using a cryptographic token generation protocol that generates agent identity tokens. The remote grid computer system provides the agent executive with the agent identity token. Thereafter, the agent executive and the remote grid computer system are able to create and consume messages to and from one another in a secure manner, using the agent identity token and corollary grid identity material to mutually encrypt, decrypt, sign, authenticate and verify message contents, non-limiting examples of which include status information, command, and data collected from the virtual machine.

Once the new agent executive is initialized and the integrity of the agent executive is assured, it can be used to collect information specified by the grid computer system to retrieve many types of security-oriented technical information related to any program, data structure, process, or status associated with the virtual machine. To this end, the agent executive collects commands that perform such checks based on messages retrieved from a command queue that is hosted by the grid computer system and is uniquely associated with the agent executive. The agent executive performs the commands issued by the grid computer system and returns a result status and/or requested information about the virtual machine to the grid computer system.

The grid computer system, upon receiving the result status and/or requested information, performs analysis of the status and/or information against sets of rules associated with the virtual machine, but not accessible to the virtual machine, in order to evaluate the security, compliance and integrity of any program, data structure, process, or status associated with the virtual machine. In addition, the grid computer system may issue commands to the agent executive to modify configuration parameters on the virtual machine on which the agent executive operates; such commands would implement protective or reactive modifications to elements directly composing or resident upon the virtual machine, non-limiting examples of which include processes, network services, user accounts and privileges, operating system configuration, application configurations, firewall rules, files, directories, active sessions, log information, and installed software and/or utilities.

Of particular note, the grid computer system does not send these commands directly to the agent executive. Rather, the agent executive reads the commands from a command queue located on the remote grid computer at predetermined intervals and executes the commands once read from the command queue. In this way, the security and integrity of the agent executive is strongly protected from unauthorized access or operational disruption even in an unsecure environment, since no externally accessible network port or service is available on the agent executive to which a potentially detrimental or malicious entity or process might connect and potentially compromise the agent executive's operation.

One type of command set that may be used imposes an operating system security configuration policy for a virtual machine. In this example, the grid computer system issues commands to the agent executive periodically (e.g., every minute, every five minutes, every ten minutes, each hour, each day, etc.) or on some other predetermined basis (e.g., by a schedule) or non-predetermined basis (e.g., by an ad-hoc instruction from the operator) that instructs the agent executive to collect information from the virtual machine that relates to the security of the virtual machine, non-limiting examples of such information including file system permissions, process ownership, open network ports, bindings of processes to network services, user privileges, password strength, configuration settings, installed software, log entries, firewall rules, presence of security controls, and presence of certain data types such as credit-card numbers. The agent executive collects these commands from the command queue, executes the commands to collect needed information, and securely returns this information to the grid computer system.

The grid computer system verifies the authenticity and integrity of the data using cryptographic means, subsequently analyzing the information collected using rules stored on the grid computer system to evaluate the state of security, compliance and integrity of the virtual machine. If the grid computer system determines there is a state of vulnerability or non-compliance on the virtual computer, the grid computer system posts corrective action, in the form of commands to the command queue uniquely associated with the agent executive. The agent executive securely retrieves and then performs these commands and returns the success or failure state to the grid computer system. Based on this state, the grid computer system may take additional steps to remediate a state of vulnerability or non-compliance, up to termination of the virtual machine to absolutely prevent potential compromise.

This process of reading commands and returning information to the grid computer system in order to evaluate and, as needed, remediate virtual computer compliance, security and integrity repeats itself to provide ongoing protection and compliance of the virtual machine. The present disclosure provides additional embodiments for ensuring security in instances where virtual machines are cloned and instances where previously run virtual machines have been restarted after an arbitrary period of inactivity.

First Embodiment, from Point of View of a Server Hosting a Virtual Machine Running an Agent Executive In this exemplary first embodiment, a server computer system comprises one or more processing units and a memory coupled to at least one of the one or more processing units. The memory stores a virtual machine. An agent executive runs within the virtual machine. The agent executive is executed by at least one of the one or more processing units and comprises instructions for obtaining an agent API key from a user when the agent executive is executed a first time. The agent executive further comprises instructions for communicating the API key to a remote grid computer system in a first part of a synchronous process. The agent executive receives, in a second part of the synchronous process and responsive to the first part of the synchronous process, an agent identity token from the remote grid computer system. The remote grid computer system generates the agent identity token through a cryptographic token generation protocol. The agent executive stores the agent identity token in a secure data store associated with the agent executive. The agent executive collects information on the server computer system for an evaluation of security, compliance and integrity of the agent executive using a plurality of agent self-verification factors. The agent executive, as identified by the agent identity token, encrypts the information for confidentially. The agent executive also digitally signs the information for integrity and authenticity prior to communicating the information to the remote grid computer system as part of an asynchronous process.

In some instances, the agent executive further comprises instructions for querying a command queue on the remote grid computer system, as part of an asynchronous process, for one or more commands, where the command queue is accessed based upon an identity of the agent identity token. Once retrieved, the commands are executed by the agent executive. The commands are encrypted for confidentially and digitally signed for integrity and authenticity before transit. In some instances, a command in the one or more commands is a firewall policy for the virtual machine, a corrective or proactively protective action, a request to recollect the information on the server computer system for an evaluation of integrity of the agent executive using a plurality of agent self-verification factors, or a request to terminate the virtual machine. In some instances, the one or more commands comprise a command set for checking a status of a data structure accessible to the virtual machine or for checking a status of a process running on the virtual machine. In some instances, the one or more commands comprise a command set for checking the status of a setting associated with a file stored in a memory accessible to the virtual machine, a setting of a directory stored in a memory accessible to the virtual machine, or an existence or a status of a process running on the virtual machine. In some instances, the one or more commands comprise a command set for checking a password associated with a user or with a group of users of the virtual machine, for validation of a name-value pair in a file in a memory accessible by the virtual machine, or for checking a status of a network communication port that is associated with the virtual machine.

Second Embodiment, from the Perspective of a Grid Computer System in which the Agent Executive has No Preexisting Agent Identity Token In this exemplary second embodiment, a grid computer system comprises one or more processing units and a memory, coupled to at least one of the one or more processing units. The memory stores a grid node that is executed by at least one of the one or more processing units. The grid node comprises instructions for receiving, in a first part of a synchronous process, an API key from an agent executive running on a virtual machine which, in turn, is running on a computer that is remote to the grid computer system. The grid node determines, in a second part of the synchronous process, whether the API key is a valid API key. The grid node generates, in a third part of the synchronous process, an agent identity token through a cryptographic token generation protocol key when the API key is deemed valid. The grid node communicates, in a fourth part of the synchronous process and responsive to the first part of the synchronous process, the agent identity token to the virtual machine running on the remote computer. The grid node receives encrypted and digitally signed information from the virtual machine from an evaluation of the integrity of the agent executive based upon a plurality of agent self-verification factors. This receiving comprises decrypting the information using the agent identity token to form decrypted information and verifying the signature used to sign the received information. The grid node verifies the integrity of the agent executive based on the decrypted information.

In some instances, the grid node creates, as a function of the agent identity token, a command queue on the grid computer system, where the command queue is unique to the agent executive. Then the grid node posts to the command queue one or more commands to be executed by the agent executive. These one or more commands can be, for example, any of the commands or command sets described above in the first embodiment.

Third Embodiment, from the Point of View of a Grid Computer System in which the Agent Executive has a Preexisting Agent Identity Token In this exemplary third embodiment, a grid computer system comprises one or more processing units and a memory, coupled to at least one of the one or more processing units. The memory stores a grid node. The grid node is executed by at least one of the one or more processing units. The grid node comprises instructions for receiving an alert from a first agent executive running on a first virtual machine running on a computer that is remote to the grid computer system. The alert comprises (i) an indication that the first agent executive has started running on the first virtual machine and (ii) a first agent identity token associated with the first agent executive. The grid node determines whether the first agent identity token is valid. The grid node also determines whether the first agent identity token is being used by a second agent executive running on a second virtual machine. The grid node generates a second agent identity token through a cryptographic token generation protocol when (i) the first agent identity token is valid but is being used by a second agent executive running on a second virtual machine. Once created, the second agent identity token is communicated to the first virtual machine. Thereafter, the grid node receives encrypted and digitally signed information from the first virtual machine from an evaluation of the integrity of the first agent executive based upon a plurality of agent self-verification factors. The grid node decrypts the encrypted information in order to form decrypted information and verifies the signature. Then the grid node determines the integrity of the first agent executive based on the decrypted information.

In some instances, the grid node further comprises instructions for creating, as a function of the second agent identity token, a command queue on the grid computer system, where the command queue is unique to the first agent executive. The grid node posts one or more commands to be executed by the first agent executive to this command queue. These one or more commands can be, for example, any of the commands or command sets described above in the first embodiment.

In some instances, the grid node applies the information received from the first agent executive against one or more rules stored on the grid computer system. When such a rule fails, the grid node, in some instances, posts a corrective or proactively protective action to the command queue on the grid computer system that is uniquely associated with the first agent executive.

Some embodiments include file integrity monitoring. To use this feature, a user identifies what objects will be monitored (e.g., files, directories, and/or Windows™ registry keys). Baseline data is collected and stored at the grid computer system. The monitored objects are then periodically scanned by the agent executive at the computing devices (e.g., servers) where the monitored files are located. The scanned results are transmitted to the grid computer system, which performs a comparison to the baseline data. Differences between the baseline data and the current data are identified, and appropriate actions are taken (e.g., notifying a relevant person immediately for differences in critical files).

In some embodiments, a single computing environment is cloned many times (e.g., from a "golden image"), so a baseline created from the golden image can be applied to all of the cloned computer systems. For example, a server system may instantiate hundreds or thousands of virtual machines with the same operating system and active software applications. Each of the virtual machines can use the same security policy and validate against the same baseline data.

Computer Program Product Embodiments.

The present disclosure further provides computer program product embodiments that incorporate the instructions of any of the embodiments described above into a computer program product for use in conjunction with a computer system. Such computer program products comprise a tangible computer readable storage medium and a computer program mechanism embedded therein. The computer program mechanism comprises the instructions of any of the embodiments described above.

BRIEF DESCRIPTION OF THE DRAWINGS

FIGS. 14A-14C provide examples of target objects for integrity monitoring in accordance with some embodiments.

Like reference numerals refer to corresponding parts throughout the several views of the drawings.

DETAILED DESCRIPTION

Figure 1A:
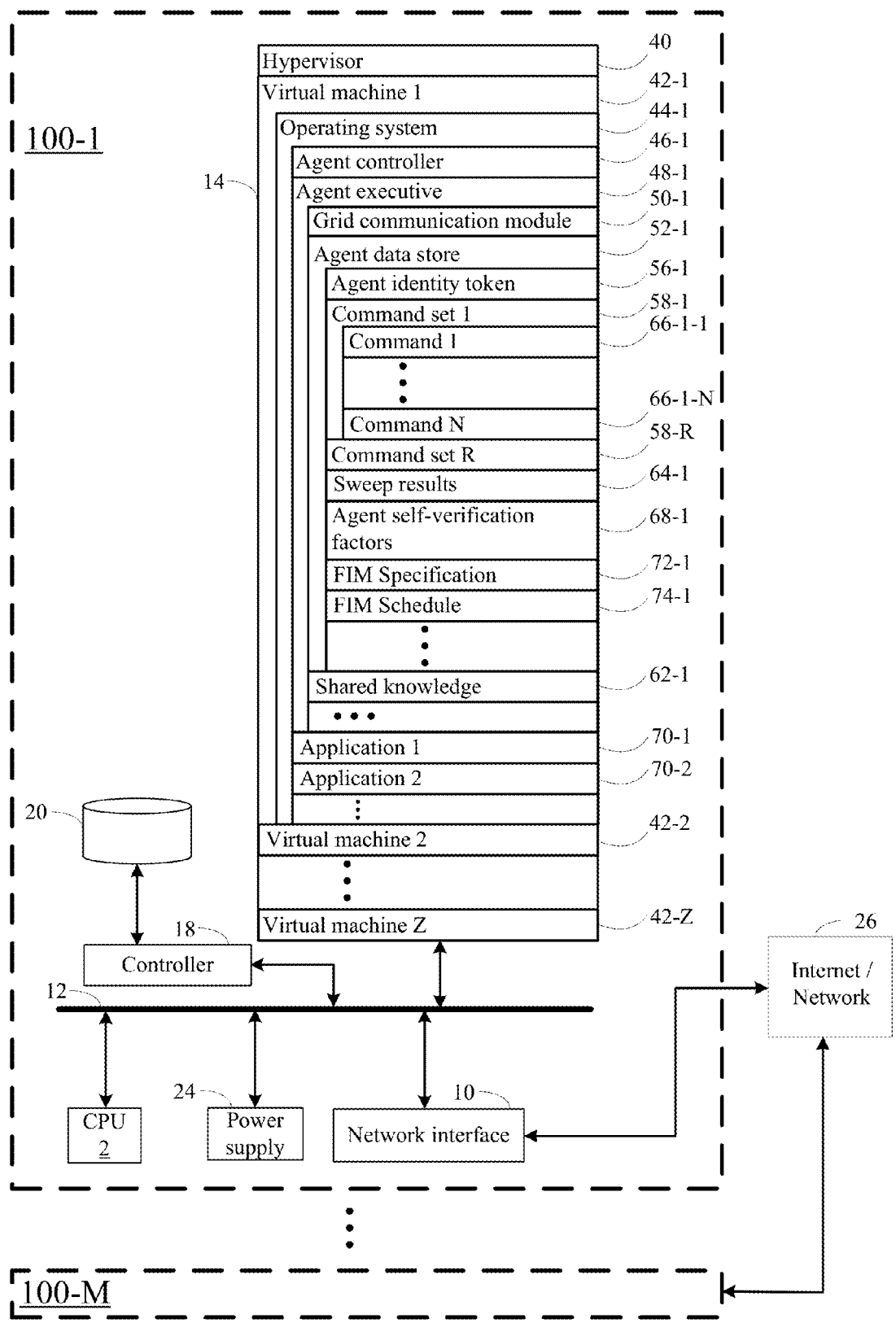
FIGS. 1A-1B illustrate a system in accordance with the present disclosure.
Figure 1B:
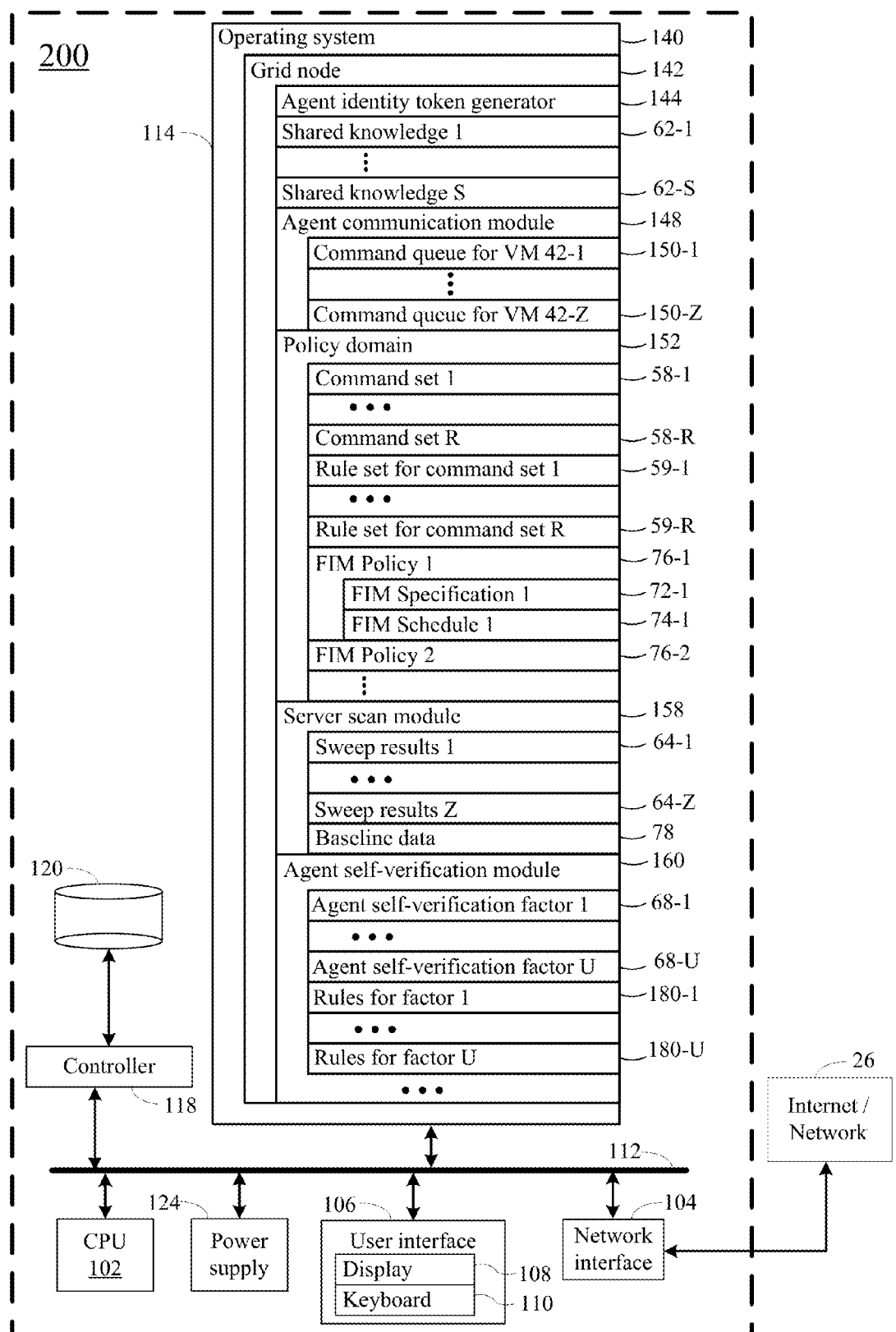

A detailed description of a system in accordance with the present disclosure is described in conjunction with FIG. 1A. As such, FIGS. 1A and 1B collectively illustrate the topology of an environment in accordance with the present disclosure. In the topology, there is a server computer 100 (FIG. 1A) and a grid computer system 200 (FIG. 1B). Of course, other topologies are possible, for instance, grid computer system 200 can in fact be formed from several computers that are linked together in a network. Further, there may be any number of server computers like that of the server computer 100 and functioning in the same manner as the server computer 100, where each such server computer is serviced by the grid computer system 200. Moreover, typically, there are hundreds, thousands, hundreds of thousands of server computers 100 or more. The exemplary topology shown in FIGS. 1A-1B merely serves to describe the features of an embodiment of the present disclosure in a manner that will be readily understood to one of skill in the art.

The server computer 100 will typically have one or more processing units (CPU's) 2, a network or other communications interface 10, a memory 14 (e.g., random access memory), one or more magnetic disk storage and/or persistent devices 20 optionally accessed by one or more controllers 18, one or more communication busses 12 for interconnecting the aforementioned components, and a power supply 24 for powering the aforementioned components. Data in memory 14 can be seamlessly shared with non-volatile memory 20 using known computing techniques such as caching. Memory 14 and/or memory 20 can include mass storage that is remotely located with respect to the central processing unit(s) 2. In other words, some data stored in memory 14 and/or memory 20 may in fact be hosted on computers that are external to the server computer 100 but that can be electronically accessed by the server computer 100 over an Internet, intranet, or other form of network or electronic cable (illustrated as element 26 in FIG. 1A) using network interface 10.

Memory 14 preferably stores a hypervisor 40 for initiating hardware virtual machines 42 and one or more hardware virtual machines 42. There may be any number of hardware virtual machines 42 running on the server computer 100. In some instances, there is only one hardware virtual machine 42 running on the server computer 100. In some instances, there are two or more, three or more, five or more, or ten or more hardware virtual machines 42 running on the server computer 100. In some instances, a single virtual machine 42 is running on multiple server computers 100. Each hardware virtual machines 42 preferably comprises: an operating system 44 that includes procedures for handling various basic system services; an agent controller 46 that is always running when the virtual machine 42 is running, the agent controller serving to ensure that an agent executive 48 is running on the virtual machine 42; where the agent executive 48 provides security in a cloud computing environment.

In preferred embodiments, each agent executive 48 comprises:
   a grid communication module 50 that is used for communicating with the grid computer system 200 via one or more communication networks 26, such as the Internet, other wide area networks, local area networks (e.g., a local wireless network can connect the server computer 100 to the grid computer system 200), metropolitan area networks, and so on; and
   an agent data store 52 or instructions for accessing an agent data store 52, the agent data store 52 storing factors 68 for verification, commands 58, and other data that is used to provide security for virtual computers in a cloud computing environment.

In preferred embodiments, the agent data store 52 stores:
   an agent identity token 56 that is uniquely associated with the agent executive 48;
   one or more command sets 58, each command set 58 comprising one or more commands 66 that are run by the agent executive 48;
   sweep results 64 that are collected by agent executive 48 in response to commands 66 and/or agent self-verification factors 68; and
   agent self-verification factors 68 that are used to verify the integrity of the corresponding agent executive 48.

Memory 14 further comprises shared knowledge 62 that is shared with grid computer system 200, the shared knowledge serving to encrypt, decrypt, digitally sign and/or verify data and messages that are communicated between the server computer 100 and the grid computer system 200 as disclosed in further detail below. Direct communication from the remote grid computer system 200 to the agent executive 48 is not possible because agent executive 48 cannot accept a network connection from any device anywhere. Agent executive 48 has no open network communication ports.

The operating system 44 within each virtual machine 42 also runs one or more user applications 70, such as the first application 70-1 and the second application 70-2 illustrated in FIG. 1A. In some embodiments, one or more of the applications 70 are applications in development.

Although not stored in agent data store 52 or anywhere else on computer 100, there is an agent API key that is uniquely associated with an organization that controls a respective agent executive 48 or with a policy domain when a single organization desires to implement multiple policy domains, each of which is intended to control a distinct set of one or more agent executives 48.

As will be understood by one of skill in the art, there is individual persistent storage (e.g. of type 20) associated 1:1 with each virtual machine 42 residing on server 100. Such storage is where the virtual machine 42 operating systems and files are stored and accessed, and in turn is where the agent binaries and encrypted databases (e.g., agent data store 52) are stored and accessed.

In operation, agent data store 52 is stored in memory 20, although some agent data is held in memory 14 of the virtual computer during operation.

One or more server computers 100 are able to establish a connection via Internet/network to grid computer system 200. FIG. 1A illustrates the connection to only one such server computer 100. In typical embodiments, a grid computer system 200 comprises one or more computers. For purposes of illustration in FIG. 1B, the grid computer system 200 is represented as a single computer that includes all of the functionality of the grid computer system 200. However, the disclosure is not so limited. The functionality of the grid computer system 200 may be spread across any number of networked computers and/or reside on each of several networked computers. One of skill in the art will appreciate that a wide array of different computer topologies are possible for the grid computer system 200 and all such topologies are within the scope of the present invention. Turning to FIG. 1B with the foregoing in mind, an exemplary grid computer system 200 comprises:
   one or more processing units (CPU's) 102;
   a network or other communications interface 104;
   a memory 114;
   optionally, one or more magnetic disk storage and/or persistent storage devices 120 accessed by one or more optional controllers 118;
   a user interface 106, the user interface 106 including a display 108 and a keyboard or keypad or other data entry device 110;
   one or more communication busses 112 for interconnecting the aforementioned components; and
   a power supply 124 for powering the aforementioned components.

It will be appreciated that in typical embodiments, user interface 106, display 108, and other data entry devices 110 are not part of a grid computer system. In fact, in typical embodiments, the grid computer system is a virtual machine itself.

In some instances, data in memory 114 can be seamlessly shared with optional non-volatile memory 120 using known computing techniques such as caching.

The memory 114 preferably stores:
   an operating system 140 that includes procedures for handling various basic system services and for performing hardware dependent tasks; and
   a grid node 142 for providing security in a cloud computing environment.

Typically, a grid node 142 comprises:
   an agent identity token generator 144 for generating an agent identity token 56 using a cryptographic token generation protocol when an agent API key provided by an agent executive 48 is deemed valid. The agent identity token generator 144 is sometimes referred to as the token generation module;

shared knowledge 62 for each of one or more agent executives 48 running on one or more remote server computers 100, such shared knowledge enabling encryption of information that is exchanged between the agent executives 48 and the grid computer system 200;

an agent communication module 148 that is used to communicate commands to one or more virtual machines 42 running on one or more remote server computers 100, the agent communication module 148 including a command queue 150 for each such virtual machine 42, whereby the agent communication module 148 posts commands for a respective agent executive 48 to the command queue 150 that uniquely corresponds to the virtual machine 42 on which the respective agent executive 48 runs;

a policy domain 152 comprising one or more command sets 58 and one or more rule sets 59, where for each command set 58 there is a corresponding rule set 59, each command set 58 including one or more commands, where each such command directs an agent executive 48 to acquire information or perform a task and report back to the grid computer system 200 the status of the task and where each rule set 59 is for processing information provided by an agent executive 48 to the grid computer system 200 upon completion of a corresponding command set 58;

a server scan module 158 which collects information and/or the status of completed tasks upon completion of a command set 58 and stores such data as sweep results 64, each such sweep result uniquely corresponding to a hardware virtual machine 42 serviced by the grid computer system 200. The server scan module 158 is sometimes referred to as the integrity validation module; and an agent self-verification module 160 which keeps an up-to-date list of the agent self-verification factors 68 that are used to verify an agent executive 48 running on each virtual machine 42 serviced by the grid computer system 200 as well as rules 180 for processing these factors.

Agent self-verification module 160 comprises agent self-verification corrective command sets and agent self-verification failsafe commands in addition to agent self verification factors 68. Agent self-verification corrective command sets and agent self-verification failsafe command sets comprise the actual commands used to attempt correct an integrity failure, and in the event that self-correction fails, the failsafe actions to be taken (e.g., alert an administrator, shut down the agent executive 48, shut down the virtual machine 42, etc.).

The agent identity token 56 is uniquely associated with an agent executive 48. As disclosed below, the agent identity token 56 is the data by which the uniquely associated agent executive 48 is identified and authenticated to the grid computer system 200. The agent identity token 56 along with shared knowledge 62 is used (i) by the grid communication module 50 to encrypt and sign any message sent to the grid computer system 200, (ii) the agent communication module 148 to decrypt, authenticate the sender of, and verify the integrity of any message received from an agent executive 48, (iii) the agent communication module 148 encrypting and signing any message to an individual agent executive 48; and (iv) the grid communication module 50 to decrypt, authenticate the sender of, and verify the integrity of any message received from the grid computer system 200.

Initiation of a Hypervisor 40, an Agent Controller 46, and an Agent Executive 48 on a Server Computer 100.

Figure 2:
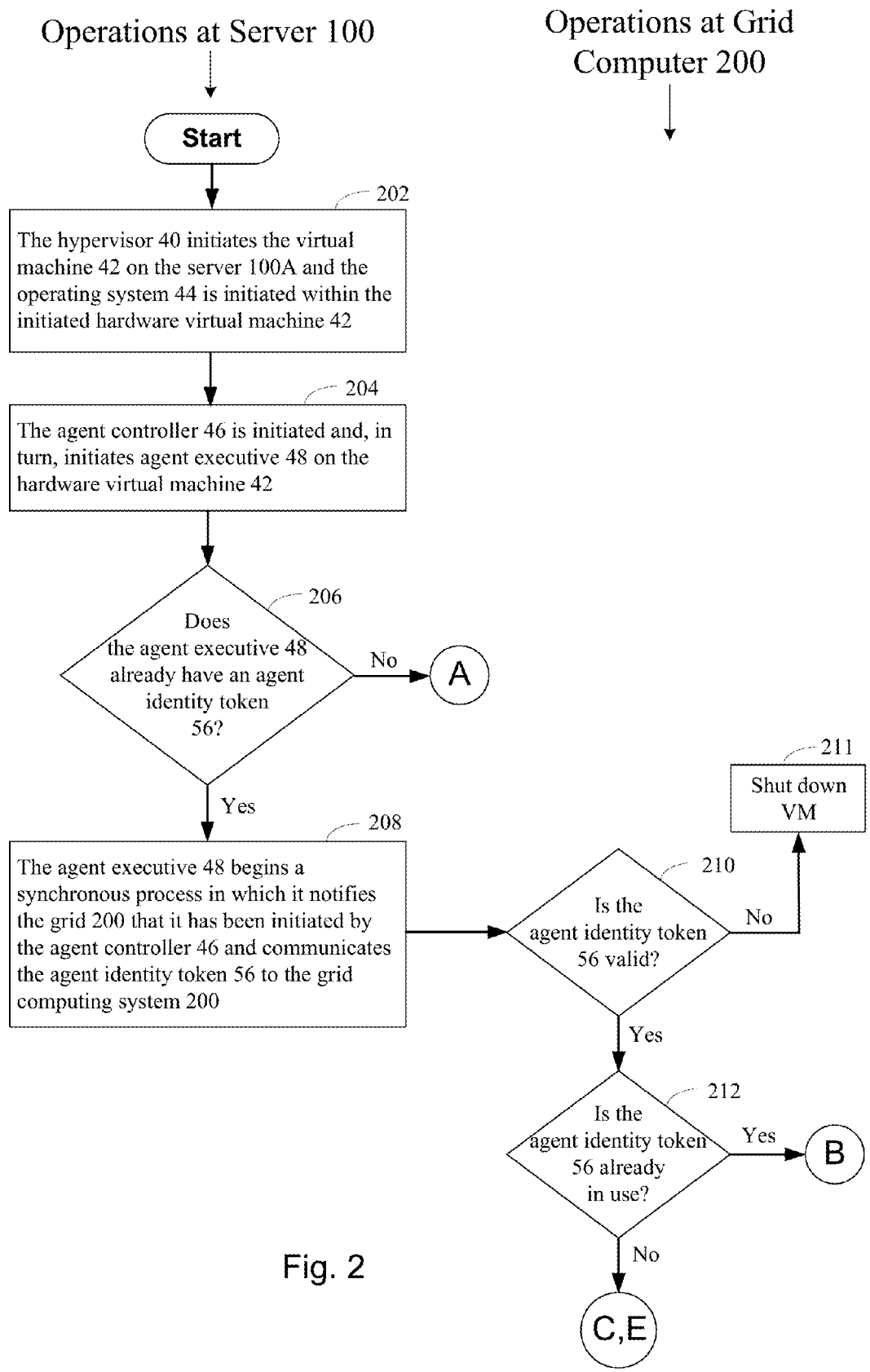
FIG. 2 illustrates the initiation of a hypervisor, agent controller, and agent executive, in accordance with an embodiment of the present disclosure in which the agent executive may or may not have an agent identity token.

FIG. 2 illustrates how a server computer 100 is initiated in accordance with a first embodiment of the present disclosure.

Block 202.

In block 202, the hypervisor 40 initiates a virtual machine 42 on the server computer 100 and an operating system 44 is initiated within the initiated virtual machine 42. The hypervisor 40, also called a virtual machine manager (VMM), is any one of many hardware virtualization techniques that allow multiple operating systems 44 to run concurrently on the server computer 100. The hypervisor 40 presents to each of the guest operating systems 44 a virtual operating platform and manages the execution of such operating systems. Multiple instances of a variety of operating systems 44 may share the virtualized hardware resources. Commercial embodiments of the hypervisor 40 include, but are not limited to, OPENSTACK, EUCALYPTUS, VMWARE ESXI, CITRIX XENSERVER, MICROSOFT HYPER-V HYPERVISOR, SUN'S LOGICAL DOMAINS HYPERVISOR, and HP's INTEGRITY VIRTUAL MACHINES. Examples of operating systems 44 include, but are not limited to UNIX, OPEN VMS, LINUX, and MICROSOFT WINDOWS.

Block 204.

Once the operating system 44 is running on a virtual machine 42, an agent controller 46 is initiated. The agent controller's primary responsibility is to ensure that an agent executive 48 is running on the virtual machine 42 at all times. Thus, in block 204, the agent controller 46 initiates the agent executive 48 on the hardware virtual machine 42.

Block 206.

In block 206, a determination is made by the agent executive 48 as to whether it already has an agent identity token 56 assigned to it. In some instances, an agent executive 48 may already have an agent identity token assigned to it if the virtual machine 42 corresponding to the agent executive 48 had been running before and had stopped running, because of a power outage or computer hardware failure for example, but is now once again running. In some instances, an agent executive 48 may already have an agent identity token 56 assigned to it if the virtual machine 42 corresponding to the agent executive 48 is a cloned copy of another virtual machine 42 that is also running. If the agent executive 48 does not have agent identity token 56 (206—No), then process control passes to block 302 of FIG. 3A, which describes how an API key is obtained. If the agent executive 48 does have an agent identity token 56 (206—Yes), then process control passes to block 208.

Block 208.

In block 208, the agent executive 48 begins a synchronous process in which it notifies the grid computer system 200 that the agent executive 48 has been initiated by the agent controller 46. Further, as part of this synchronous process, the agent executive 48 communicates the agent identity token 56 to the grid computing system 200.

Block 210.

In block 210, the grid computer system 200 receives the agent identity token 56 from the server computer 100 and determines whether it is valid. This is done by checking the agent identity token 56 against a list of such tokens that is maintained by the grid computer system 200 in memory 114 and/or memory 120 or that is otherwise accessible to the grid computer system 200. If validation is successful in block 210 (210—Yes), process control passes to block 212. If validation is not successful in block 210 (210—No), the agent executive 48 is notified of this failure and process control passes to block 211.

Block 211.

In block 211, a synchronous instruction is sent from the grid computer system 200 to the agent executive 48 to shut it down. Optionally, an alert is sent to the user to advise that there was an attempt to utilize an invalid agent identity token 56.

Block 212.

Block 212 is reached if agent executive 48 is operating with a valid agent identity token 56. Block 212 is necessary to accommodate cloud bursting in which multiple virtual machines 42, termed children virtual machines, are concurrently executed, where each such child virtual machine 42 is based upon a common parent virtual machine 42 that may still be executing or that may be an inactive virtual machine image upon which agent executive 48 has been previously installed and configured. Such cloud bursting processes have the benefit of providing dynamic servicing of loads that vary in computational intensity over time. For instance, in some embodiments, the parent virtual machine 42 hosts one or more retail modules (not shown in FIG. 1A) that service retail transactions over the Internet. During times of peak demand, such as for sales or during the holidays, the demand on the one or more retail modules increases. To service such demand, multiple children virtual machines 42 may each be generated based on the already implemented parent virtual machine 42. In such instances, each child virtual machine 42 will initially have the same agent identity token 56. In order to uniquely identify and provide adequate security to each of the child virtual machines 42, each such child virtual machine 42 is provided with new a unique agent identity token 56. Thus, if a determination is made that agent identity token 56-1 is a duplicate of an already active agent identity token (one that is being used by an another activated agent executive 48) (212—Yes), then process control passes to block 320 of FIG. 3B. If a determination is made that agent identity token 56-1 is not a duplicate of an already active agent identity token (212—No), then the determination is made that this executive agent 48 is associated with a previously deactivated virtual machine 42 that has been re-activated and process control passes either to block 409 (FIG. 4C) in order to self-verify the virtual machine 42 or, if the agent executive of the virtual machine is already validated, to step 502 (FIG. 5) to begin a sweep.

Processes by which an Agent Executive can Acquire a Unique Agent Identity Token in Accordance with the Present Disclosure.

Figure 3A:
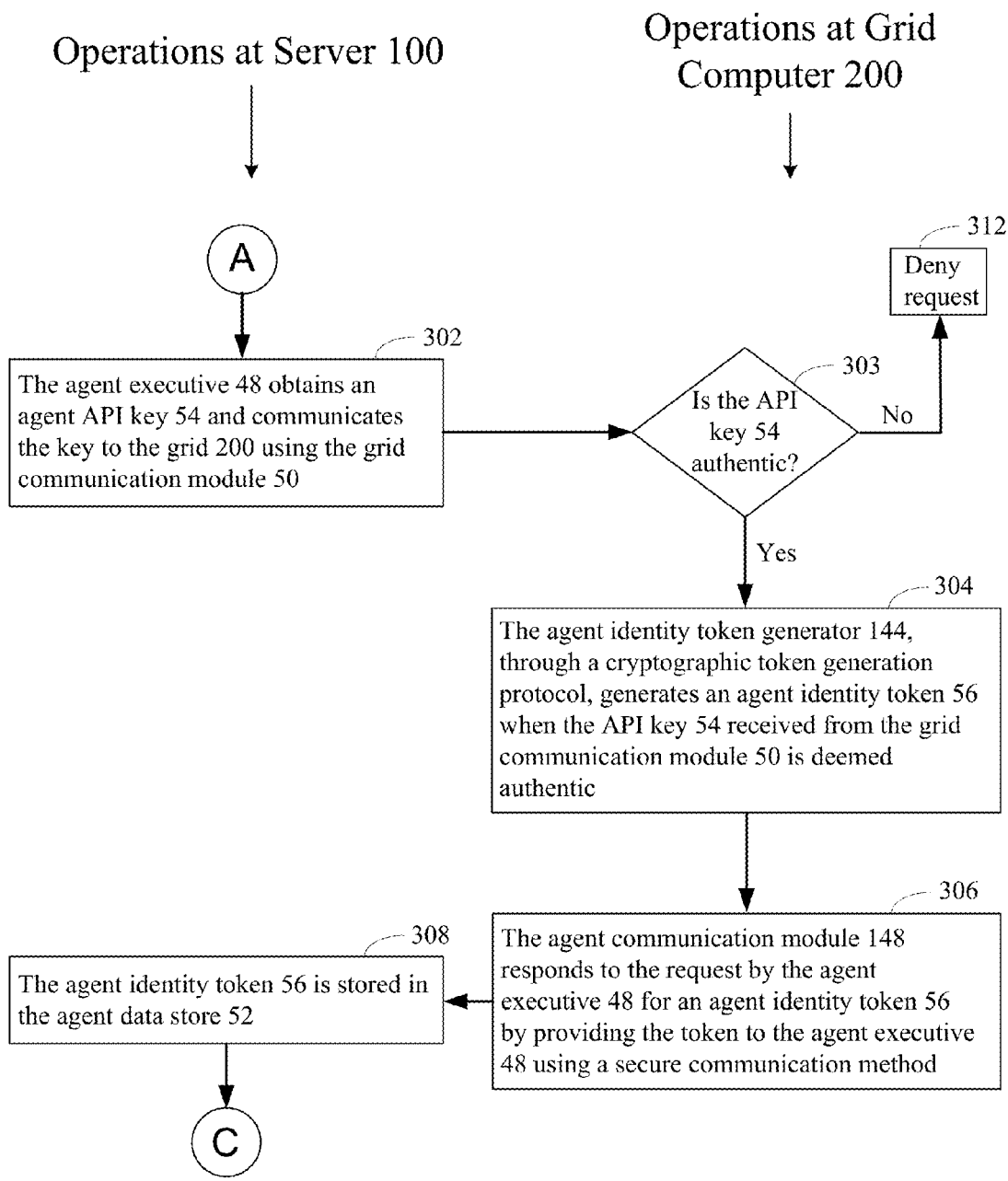
FIGS. 3A-3B illustrate processes by which an agent executive can acquire a unique agent identity token in accordance with the present disclosure.
Figure 3B:
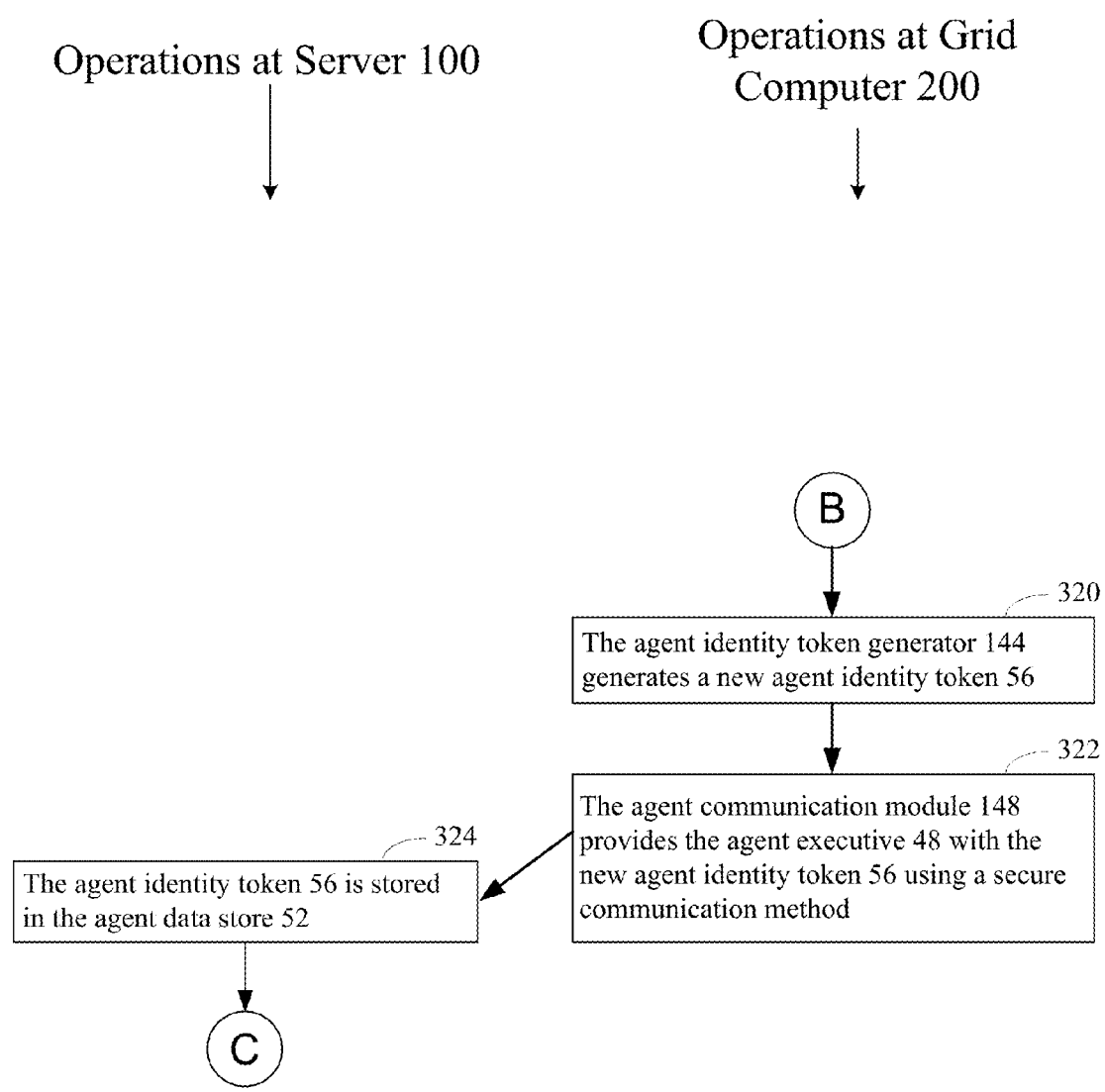

FIG. 3 illustrates processes by which agent identity tokens 56 are generated in accordance with the present disclosure. A first process, exemplified by blocks 302 through 308 in FIG. 3A, is used when an agent executive 48 does not have an agent identity token 56 (206—No). A second process, exemplified by blocks 320 through 324 in FIG. 3B, is used when a first agent executive 48 has an agent identity token 56 but the agent identity token is already being used by an active virtual machine 42 that was initiated before the virtual machine 42 associated with the first agent executive 48 was executed (212—Yes).

Block 302.

Agent executive 48 does not have an agent identity token 56 when initiated for the first time on a virtual machine 42 to ensure security of the virtual machine 42. If block 302 is reached, this means that the agent executive 48 does not have an agent identity token 56. In block 302, the agent executive 48 obtains an agent API key. In some embodiments, the agent executive 48 challenges a user for an API key. In typical practice, the user provides the API key manually or via a user-provided script when the agent executive 48 is started for the first time. Regardless of how the API key is obtained it is communicated to the grid computer system 200 using the grid communication module 50 and process control passes to block 303.

Block 303.

In block 303, a determination is made as to whether the API key is authentic. If so (303—Yes), process control passes to block 304. If no (303—No), process control passes to block 312 where the request for an agent identity token 56 is denied. The user is notified of this failure.

Block 304.

In block 304, an agent identity token generator 144 (also known as the token generation module) operating on the grid computer system 200 generates, through a cryptographic token generation protocol, an agent identity token 56 when the API key received from the grid communication module 50 in block 302 is deemed valid. Any one of a number of cryptographic token generation protocols may be used to generate the agent identity token 56 from the API key. In some embodiments, the token 56 includes a cryptographic key and/or information that will be used as shared knowledge 62.

Block 306.

In block 306, the agent communication module 148 responds to the request by the agent executive 48 for an agent identity token 56 by providing the token to the agent executive 48 using a secure communication method.

Block 308.

In block 308, the agent identity token 56 is stored in the agent data store 52 and process control passes to block 409.

Block 320.

Block 320 begins another process by which a first agent executive 48 may acquire an agent identity token 56. Block 320 is reached in those instances where the first agent executive 48 actually has a valid agent identity token 56, but the agent identity token 56 is already being used by a second active agent executive 48 of a second virtual machine 42 (parent virtual machine) that was initiated at an earlier date than the first virtual machine (212—Yes) (child virtual machine). In such instances, a new agent identity token 56 is generated for the child virtual machine through a cryptographic token generation protocol.

Block 322.

In block 322, the agent communication module 148 responds to the request by the agent executive 48 for an agent identity token 56 by providing the token to the agent executive 48 using a secure communication method such as the methods disclosed in the section entitled "Message Security Protocol" below.

Block 324.

In block 324, the agent identity token 56 is stored in the agent data store 52 for later use and process control passes to block 409. In preferred embodiments, agent identity token 56 is stored in a persistent data store (e.g., agent data store 52) maintained by agent executive 48. In preferred embodiments, this persistent data store is encrypted at all times using the Advanced Encryption Standard (AES) in Cipher Block Chaining (CBC) mode utilizing a 256-bit key length as described in Federal Information Processing Standards (FIPS) Publication 197, Nov. 26, 2001. In such embodiments, the key and initialization vector required by the agent executive 48 to access encrypted information in the persistent data store, including but not limited to the agent identity token 56, is calculated using multiple data values some based on shared knowledge 62 and some dynamically generated on a one-time basis, that are provided by the remote grid computer 200. This calculation involves agent executive 48 invocation of one of a plurality of possible dynamic key generation protocols, a non-limiting example of which is the Dynamic Symmetric Key Provisioning Protocol (DSKPP) (tools.ietf.org/search/rfc6063) in a draft status with the IETF at the time of this disclosure.

Message Security Protocol.

The processes illustrated in FIG. 3B provide methods for securing an agent identity token 56 in agent data store 52. As discussed in further detail below, FIGS. 4A-4D through 6A-6B illustrate exemplary processes directed to verifying the integrity of virtual machine 42 and performing services for virtual machine 42 (e.g., imposition of a firewall) that require assignment of a unique agent identity token 56 to the virtual machine 42. These exemplary processes further require communication to take place between agent executive 48 and the grid computer system 200. It is desirable that such communications take place in a manner that provides for message confidentiality and integrity. Further, it is desirable that the agent executive 48 and remote grid computer 200 be mutually able to authenticate the source of a message for the purposes of identification and authorization. To accomplish this, a secure messaging protocol is used. This secure messaging protocol, in combination with an agent executive self-verification process described below in conjunction with FIGS. 4A-4D, and the use of unique agent identity tokens 56, satisfy the need for the agent executive 48 to be able to securely operate and communicate with the remote server computer 100 in a relatively untrusted and/or uncontrolled environment, including the transmission of messages across untrusted and/or uncontrolled network environments.

In some embodiments, after agent executive 48 initialization, any message of any type that is generated by the grid computer system 200 to send to the agent executive 48, or by an agent executive 48 to send to the grid computer system 200, is protected from unauthorized disclosure, corruption, replay or spoofing using the disclosed message security protocol. As described in further detail below, the sender of a message assures message authenticity and integrity by utilizing a hash-based message authentication code (HMAC) functionality, in combination with dynamically generated key based on shared secret knowledge between the sender and receiver, to generate a keyed message digest of the message payload. This digest is added to the original message payload, which is then encrypted utilizing the message confidentiality functionality described below, utilizing a dynamically generated key based on shared secret knowledge between the sender and receiver.

The resulting ciphertext is transmitted to the receiver using a mutually authenticated, encrypted network tunnel. In some embodiments, this transmission is secured using an SSL/TLS protocol. TLS and SSL encrypt the segments of network connections above the transport layer using asymmetric cryptography for transmission confidentiality and a keyed message authentication code for transmission integrity and reliability (see RFC 5246 or en.wikipedia.org/wiki/Secure_Sockets_Layer).

The receiver of the message first decrypts the ciphertext after re-creating the symmetric encryption key based on shared secret knowledge between the sender and receiver. If the sender asserted as part of the transmission metadata did not actually send the message, then the shared secret knowledge will be incorrect and the ciphertext will not be successfully decrypted into a meaningful data structure. In such cases the message will be ignored and the receiver may take actions including triggering mechanisms to generate an alert to a possible attempt to compromise security. If the ciphertext is successfully decrypted, the receiver then attempts to further verify authenticity and integrity of the message by re-generating the asserted HMAC message digest included with the message using a key re-generated based on shared secret knowledge between the sender and receiver. The message digest generated by the receiver will not match the asserted message digest and the message will be considered inauthentic and/or corrupted by the receiver if the sender asserted as part of the transmission metadata did not actually generate the HMAC message digest of the message, or if the message has been changed in any fashion since generation of the HMAC digest. In such cases, the message will be ignored and the receiver may take actions including triggering mechanisms to generate an alert to a possible attempt to compromise security. If the decipherment and message authentication/integrity checks are both successful, the receiver will process the message.

Message Authenticity and Integrity.

In order to ensure the authenticity and integrity of such communications, one of a plurality of possible hash-based message authentication code (HMAC) functions is used (see, for example, IETF RFC 2104, "HMAC: Keyed-Hashing for Message Authentication"). These HMAC functions utilize one or more secure hashing algorithms such as SHA-224, SHA-256, SHA-384, or SHA-512, as defined more fully in Federal Information Processing Standards Publication 180-3 ("Secure Hash Standard (SHS)"), October 2008. In this messaging security protocol functionality, secret key material used to implement the HMAC is derived by means of a dynamic key generation algorithm mutually known to both the agent executive 48/grid communication module 50 and the remote grid computer system 200. Such key generation utilizes a plurality of encryption, hashing and randomization protocols, non-limiting examples of which include AES-256-CBC, the SHA-224 hashing algorithm, and/or the SHA-256 hashing algorithm. In some embodiments, such algorithms are combined into a multi-pass protocol that use as inputs key materials and/or initialization vectors generated from shared knowledge 62 between the grid communication module 50 and the remote grid computer system 200 and values derived from pseudo-random number generation protocols. This algorithm generates secret key material of preferable length no less than 1024 bits, implementing a cryptographic keyspace of a size making it computationally infeasible to check each possible key by brute force. Prior to encryption, this secret key material is used as input to one of a plurality of HMAC implementations such as HMAC-SHA-224, HMAC-SHA-256, HMAC-SHA-384, or HMAC-SHA-512 (see FIPS 180-3). The effect of this combination of cryptographic techniques is implementation of a keyed message digest universally unique to each individual message, with the keyed message digest ensuring that a message may be authenticated and verified for integrity only by the grid computer system 200 and the individual, universally unique agent executive 48/grid communication module 50 that generated a message or for which a message was intended.

Message Confidentiality.

In some embodiments, confidentiality of messages shared between the agent executive 48 and the remote grid computer 200 is assured utilizing encryption of message payload with AES in CBC mode utilizing a 256-bit key length. The symmetric key used for encryption is derived by means of a dynamic key generation algorithm mutually known to both the agent executive 48 and the remote grid computer system 200. This key generation algorithm utilizes one of a plurality of encryption, hashing and randomization protocols, non-limiting examples of which include AES-256-CBC, the SHA-224 hashing algorithm, and the SHA-256 hashing algorithm. In some embodiments, these algorithms are combined into a multi-pass protocol that use as inputs key materials and/or initialization vectors generated from shared knowledge 62 between the agent executive 48 and the remote grid computer system 200, values derived from pseudo-random number generation protocols, and the agent identity token 56. This algorithm generates secret key material of length preferably no less than 1024 bits, implementing a cryptographic keyspace of a size making it computationally infeasible to check each possible key by brute force. The effect of this combination of cryptographic techniques is implementation of a message confidentiality system in which neither cryptographic key materials nor message payloads are transmitted through or stored within non-controlled, non-secure environments as cleartext, and message delivery in the form of ciphertext that may be decrypted into meaningful and usable cleartext only by the grid computer system 200 and the individual, universally unique agent executive 48 that generated a message or for which a message was intended.

Process for Verifying the Integrity of an Agent Executive 48 Using a Grid Computer System 200.

FIGS. 4A-4D illustrate processes by which the integrity of an agent executive 48 can be verified using a grid computer system 200 in accordance with the present disclosure once the agent executive 48 has a valid agent identity token 56.

Figure 4A:
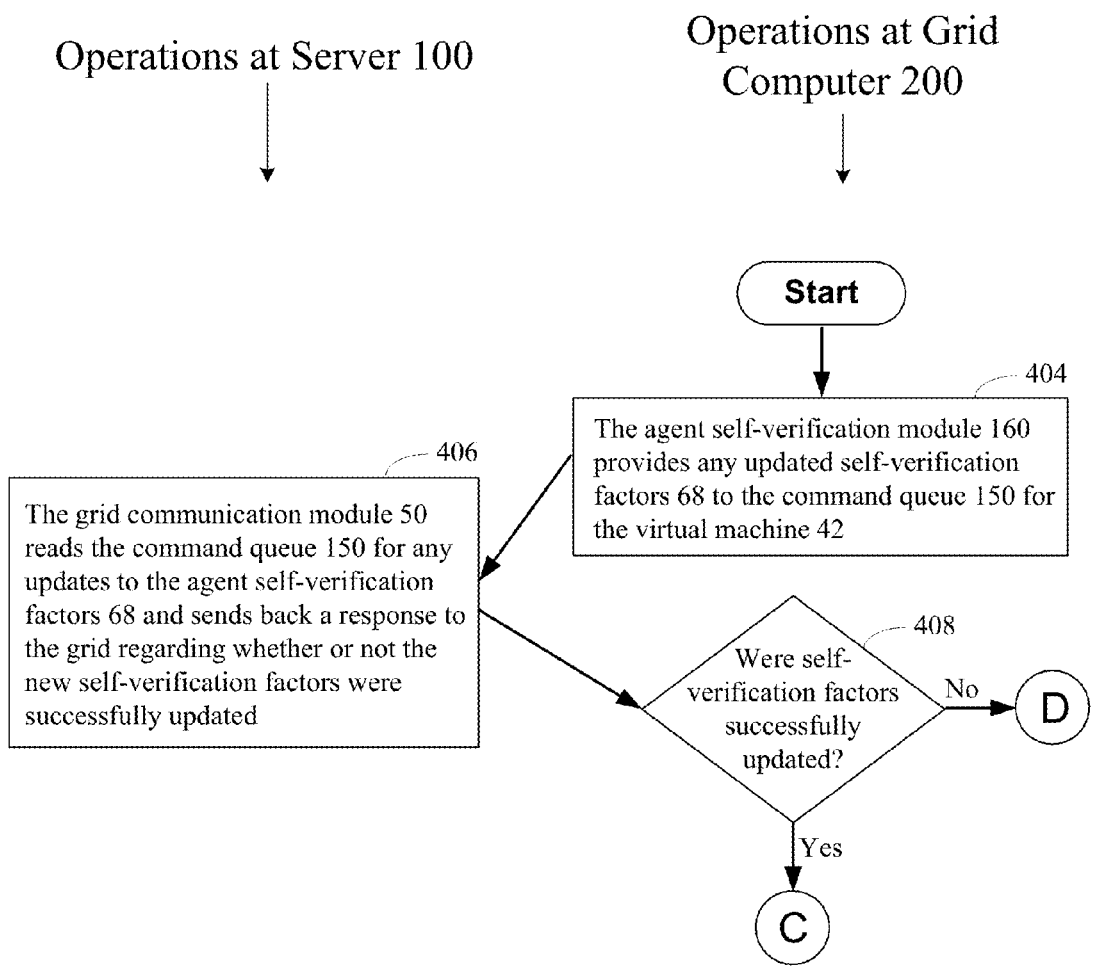
FIGS. 4A-4D illustrate a method in which the integrity of an agent executive can be verified using a grid computer system in accordance with the present disclosure.
Figure 4B:
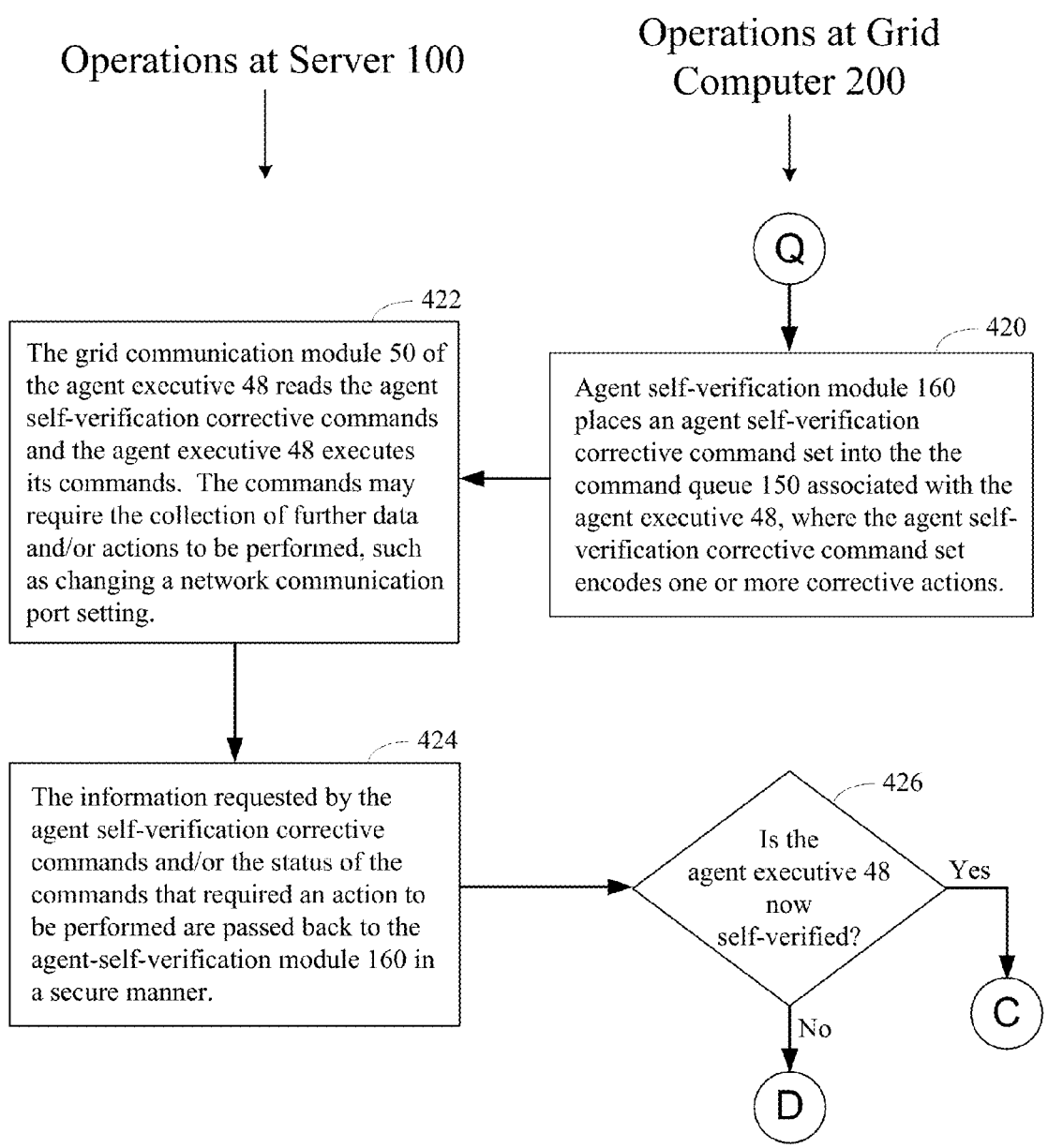
Figure 4C:
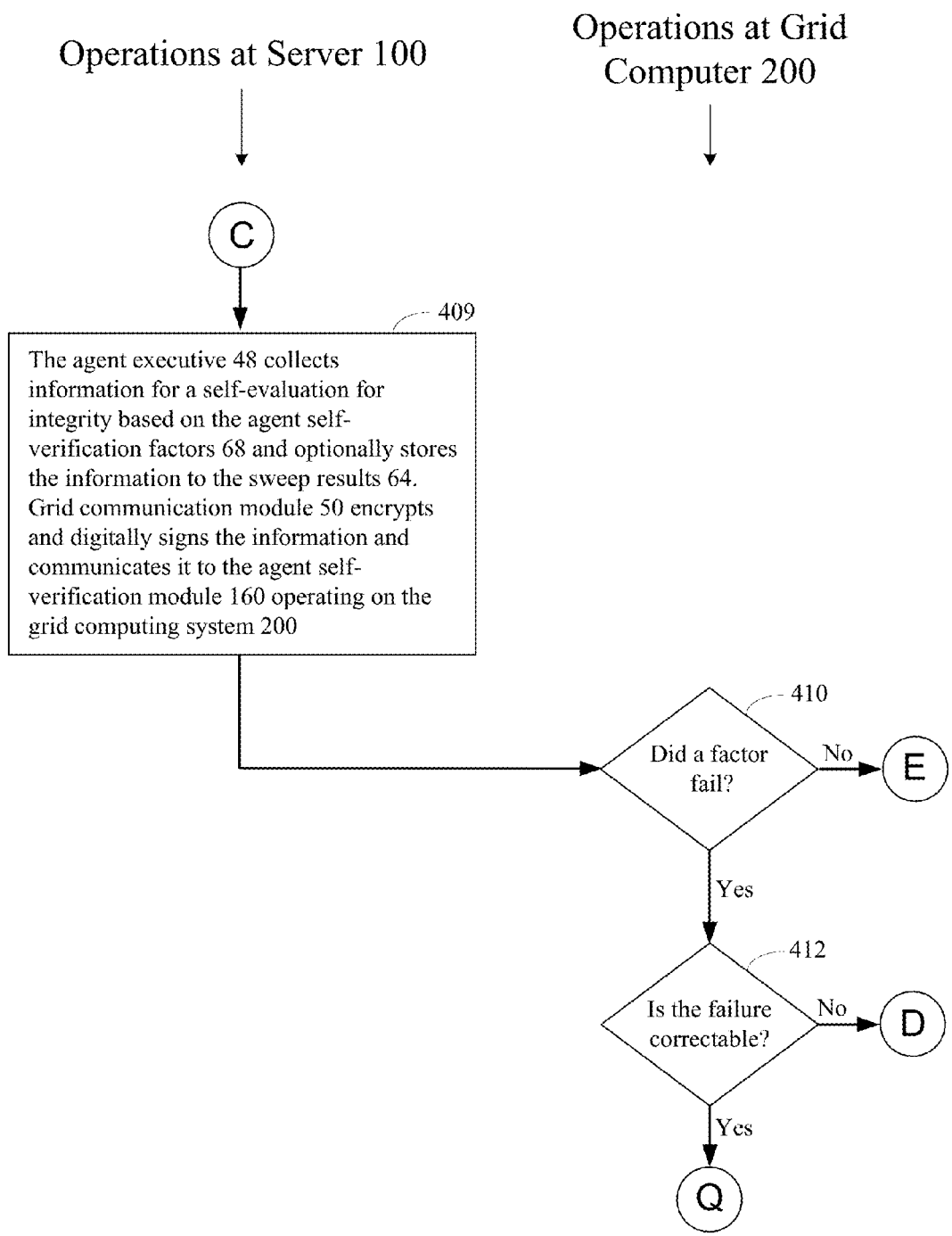
Figure 4D:
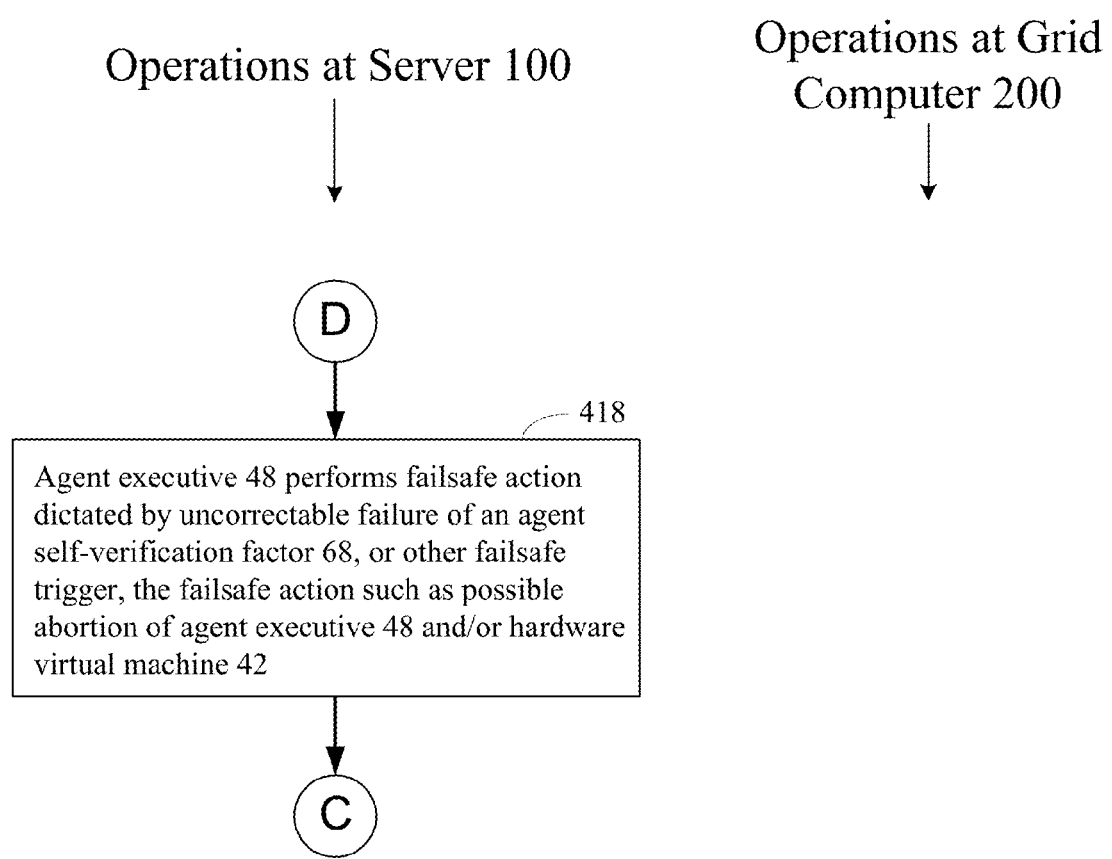

What is depicted in FIGS. 4A, 4C, and 4D are two separate processes that run independent of each other. The first process, blocks 404 through 408, serves to update self-verification factors 68 in the virtual machine 42 affected by a policy. Thus, the processes in FIGS. 4A, 4C, and 4D are executed, for each virtual machine 42 affected by agent self-verification factors 68, whenever a grid computer system 200 administrator changes such self-verification factors 68. Typically, such self-verification factors 68 form part of a policy that encompasses one or more virtual machines 42. In such instances, when the grid computer system 200 administrator changes self-verification factors 68 within such a policy, the process depicted by blocks 404 through 408 is run for each virtual machine 42 affected by the policy.

Block 404.

In block 404 the agent self-verification module 160 operating on the grid computer system 200 provides any updated self-verification factors 68 to the command queue 150 for the virtual machine 42. The posting of such factors to the command queue 150 for the virtual machine 42 is advantageous because, for security purposes, the agent executive 48 cannot accept a network connection from any device or process, regardless of whether any such device or process is running within the virtual machine 42, including the agent self-verification module 160. Thus, in order to communicate with the agent executive 48, the agent self-verification module 160 posts the factors to the command queue 150 for retrieval by the virtual machine 42. Block 404 represents a process that is quite apart from, and independent of any self-verification process for any given virtual machine 42. Whenever the self-verification factors 68 on the grid are updated for any reason, commands are put on the command queues 150 for any and all agent executives 48 that are in the scope for the changes.

Block 406.

In block 406, the grid communication module 50 reads the command queue 150 for the updates to the agent self-verification factors 68. The grid communication module sends back a response to the grid computer system 200 regarding whether or not the new self-verification factors 68 were successfully updated.

Block 408.

In block 408, a determination is made as to whether the update of the self-verification factors was successful. If so (408—Yes), process control passes to block 409. If not (408—No), process control passes to block 420 in order to perform failsafe actions.

Block 409.

Block 409 begins the process of self-verification. In block 409, the agent executive 48 collects information for a self-evaluation for integrity of the agent executive 48 as dictated by the agent self-verification factors 68. While the agent executive 48 collects the information requested by the agent self-verification factors 68, the agent executive 48 does not actually use the information to determine the integrity of the agent executive 48. Typically, the agent executive 48 stores the information in the agent data store 52. Regardless of whether the information is stored in data store 52, the information is encrypted and signed by the agent executive 48, as identified by the agent identity token 56 associated with the agent executive, and communicated using a secure message security protocol such as the one described in the section above entitled "Message Security Protocol", to the agent self-verification module 160 operating on the grid computer system 200.

Block 410.

In block 410, the agent self-verification module 160, operating on the grid computer system 200, makes a determination as to whether any of the self-verification factors 68 have failed. This is done by comparing the information collected in block 408 to one or more associated self-verification rules in the set of self-verification rules 180. If a factor has failed, (410—Yes), then process control passes to block 412. Otherwise (410—No), the agent executive 48 is confirmed to be intact and process control passes to block 502 of FIG. 5.

Block 412.

In block 412, a determination is made as to whether the failure detected in block 410 is correctable. If so (412—Yes), process control passes to block 420 of FIG. 4B. If the failure detected is not correctable (412—No), either because (i) the failure was detected on a previous cycle and the agent self-verification corrective commands of FIG. 4B were not able to correct the problem during this previous cycle, or (ii) the initial pass through block 412 determined that the failure was not correctable, process control passes to block 418 in order to initiate failsafe action.

Block 418.

In block 418, the agent executive 48 performs a failsafe action dictated by uncorrectable failure of an agent self-verification factor 68 including possible abortion of agent executive 48 and/or hardware virtual machine 42. In practice, although not illustrated in FIGS. 4A, 4B, and 4C, the manner in which failsafe action is taken in some embodiments is for agent self-verification module 160 to post agent self-verification failsafe commands to the command queue 150 associated with the agent executive 48, where the agent self-verification failsafe commands encode one or more failsafe actions. As such, agent self-verification failsafe commands include commands which will, for example, alert an administrator, shut down the agent executive 48, shut down the virtual machine 42, or some combination of the above. Moreover, other examples of failsafe actions including alerting the user by e-mail, setting the state of the agent to "requires attention" in the grid computer system 200, starting a forensic data collection automatically, updating firewall rules or other security configuration parameters, etc. Multiple failsafe actions can be triggered.

Block 420.

Turning to FIG. 4B, block 420 is reached if a determination is made that a self-verification factor has failed but that such failure may be correctable. In such instances, agent self-verification module 160 will place an agent self-verification corrective command set into the command queue 150 associated with the agent executive 48, where the agent self-verification corrective command set encodes one or more corrective actions. As such, agent self-verification corrective commands include commands which will, if successfully implemented, cause the agent executive 48 to become valid.

Block 422.

The grid communication module 50 of the agent executive 48 reads the agent self-verification corrective commands and the agent executive 48 executes its commands. The commands may require the collection of further data and/or actions to be performed, such as changing a network communication port setting.

Block 424.

In some instances, after the agent self-verification corrective commands are executed, the information requested by the agent self-verification corrective commands and/or the status of the commands that required an action to be performed are passed back to the agent-self-verification module 160. As in all instances where information is passed between the server 100 to the grid computer system, such information is encrypted and signed by the agent executive 48, as identified by the agent identity token 56 uniquely associated with the agent executive using, for example, the secure communication methods disclosed in the section entitled "Message Security Protocol" above.

Block 426.

If the agent-self-verification module 160 is satisfied with the information received (426—Yes), then the agent executive 48 is deemed corrected for the initial failure and process control passes on to block 409 to ensure further correction. If the agent-self-verification module 160 is not satisfied with the information received (426—No), then the agent executive 48 is deemed not corrected for the initial failure and process control passes on to block 418. It will be appreciated that the process illustrated in FIG. 4B can be run in parallel for any number of correctable failures.

Checking the Security, Compliance, and Integrity of Data Structures, Processes, File Systems, or States Associated with a Virtual Machine Using a Grid Computer System.

Figure 5:
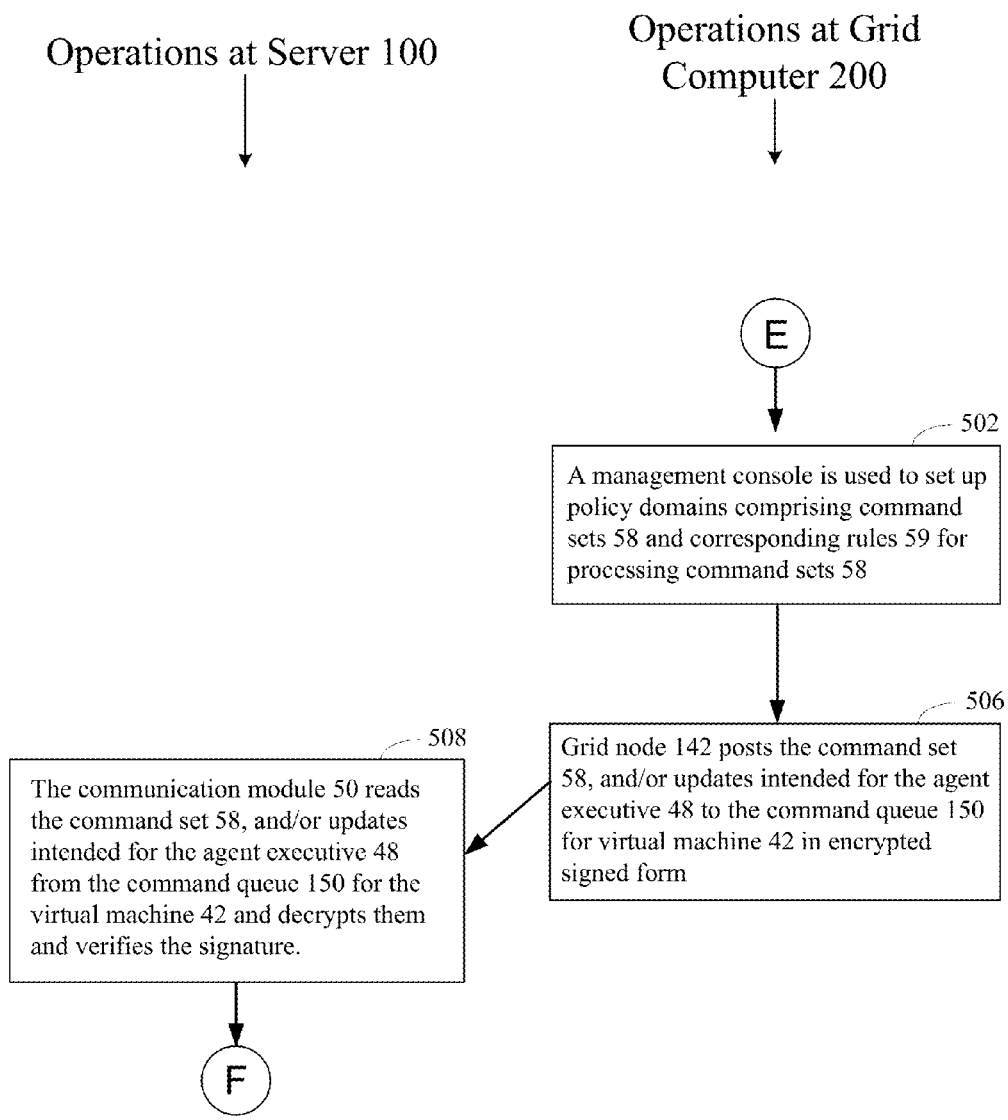
FIG. 5 illustrates a method by which custom command sets that check the integrity of various data structures, processes, file systems, or states associated with a virtual machine, as well as other optional information, can be created using a grid computer system and communicated in a secure manner to a server computer in accordance with the present disclosure.

FIG. 5 illustrates a method by which custom command sets 58 that check the security, compliance, and integrity of various data structures, processes, file systems, or states associated with a virtual machine 42 can be created using the grid computer system 200 and communicated in a secure manner to a server computer 100 in accordance with the present disclosure.

Block 502.

In block 502 command sets 58 and corresponding rule sets 59 for processing command sets 58 are set up. In some embodiments, there are two or more command sets 58 for a corresponding virtual machine 42, one for the checking the states of security, compliance and integrity of the operating system 44 running on the virtual machine 42 and the other commands sets for checking the states of security, compliance, and integrity of various programs and/or data structures that are running and/or present on the virtual machine 42 other than the operating system 44.

One or more command sets 58 and their corresponding rule sets 59 constitute a policy domain. The purpose of a policy domain is to establish a specific configuration for each type of virtual machine 42 which will help harden it against and react to prevent attacks. The policy domain consists of a set of commands 58 applied to both the operating system 44 and the applications 70 running on it and a corresponding set of rules 59 to ensure that the commands are appropriately executed. Other commands 58 and corresponding set of rules 59 might be associated with reactive actions designed to prevent a successful attack against virtual machine 42. Groups of virtual machines 42, each running the same operating system 44 and applications 70 can run the same policy domain, greatly reducing the number of command sets 58 that the grid computer system 200 needs. In this way, any rules, commands, scheduling directives and configuration parameters, including firewall rules and configuration directives, may be scoped to affect all virtual machines 42, a single virtual machine 42, or multiple user-defined groups of virtual machines.

In the case of a multi-tenant system, many policy domains 152 reside in grid node 142. If an operator has one or more private instances of grid module 142, there would likely be only one policy domain 152. One API key is associated with each policy domain 152. The API key initially establishes an association between an agent identity token 56 and the policy domain 152.

A management console associated with the grid computer system 200 is used to create, modify, or delete policy domains 152. As such, the management console is used to create, modify, or delete one or more rules (and related commands or actions); to modify the frequency with which sweeps and/or commands are executed by the agent executives 48; and to configure other parameters germane to the module in question (e.g., who should receive e-mail alerts, what kind of issue is considered "critical", etc.). Based on the scope of the creations, modifications, and deletions made in the management console, the grid computer system puts the commands needed to affect the changes into the command queues 150 of all the virtual machines 42 that are within the scope of the policy domain that has been modified.

Each respective command 66 in a command set 58 checks an important configuration of the operating system 44 and/or an application 70 running on the virtual machine 42 to which the respective rule is applicable. The results of the commands 66 are checked against corresponding rules 59. In some embodiments, each command 66 and its corresponding rule 59 are represented by a name (e.g., "cron should always be running") and a description. (e.g., "the cron daemon should always be running"). In some embodiments, there is an indication as to whether the failure of the rule 59 for a command 66 should be considered a critical risk. If a rule is deemed critical, then failsafe action, up to termination of the virtual machine 42, is designated. However, the failure of a general rule 59 (e.g., a rule not directly associated with agent executive 48 self-verification) doesn't necessarily cause termination of agent executive 48 and virtual machine 42. A rule failure can trigger one or more actions that might include commands to attempt to remediate the issue, generating e-mail or other kinds of alerts, simply recording the rule failure, or going to the extreme of shutting down the agent executive 48 and the virtual machine 42 to absolutely contain the compromise.

Moreover, in some embodiments, rules 59 and, indeed commands 66 and/or commands sets 58, may be designated as active or de-activated. Commands 66 for active command sets 58 are executed by agent executive 48 whereas non-active commands 66 are stored by the grid computer system 200 but are not executed by the agent executive 48. Importantly, while commands 66 are communicated to a server computer system 100, for security purposes, the rules 59 used to interpret the results of the commands sets 58 remain on the grid computer system 200 and cannot be accessed by the server computer system 100.

In some embodiments, a command set 58 comprises one or more commands 66 for checking a status of a data structure accessible to the virtual machine 42 or for checking a status of a process running on the virtual machine 42. In some embodiments, a command set 58 comprises one or more commands 66 for checking the status of a setting associated with a file stored in the agent data store 52 (memory) accessible to the virtual machine 42, a setting of a directory stored in the memory accessible to the virtual machine, or an existence or a status of a process running on the virtual machine 42. In some embodiments, a command set 58 comprises one or more commands 66 for checking a password associated with a user or with a group of users of the virtual machine 42. In some embodiments, a command set 58 comprises one or more commands 66 for checking a status of a network communication port that is associated with the virtual machine 42.

In some embodiments, a command set 58 comprises one or more commands 66 for validation of a name-value pair in a file in a memory accessible by the virtual machine 42. For instance, in some embodiments, a rule 59 comprises a configuration file path (e.g., "/etc/httpd/httpd.conf", an optional configuration file section, a configuration item (first component of the name-value pair, e.g., "User"), a desired value (second component of the name-value pair, e.g., "nobody"), an optional configuration file comment character (e.g., "#"), a configuration item/value delimiter, if any, and a remedial suggestion (e.g., "if this rule fails, the User setting in the Apache configuration file should be changed to 'nobody'"). Thus, in the exemplary rule, if the value for "User" in the Apache configuration file is set to other than "nobody" the rule requires that it be set to "nobody." Thus, in this example, the command 66 for the rule 59 would be to acquire the relevant name-value pair from the file/etc/httpd/httpd.conf form the server computer 100 and the rule 59, operating on the grid computer system 200, would check to see if the name-value pair retrieved by the command 66 is correct (e.g., "User nobody"). If so, the rule passes. If not, the rule fails.

Block 506.

In block 506 the grid node 142 posts the command set 58 and/or updates intended for the agent executive 48 to the command queue 150 for virtual machine 42 in encrypted form. In typical embodiments, this information is encrypted and signed prior to sending it to the server computer 100, for example, in the manner set forth in the section entitled "Message Security Protocol" above.

Block 508.

In block 508 the communication module 50 reads the command set 58 and other updates from the command queue 150 for the virtual machine 42 and decrypts them, for example, in the manner set forth in the section entitled "Message Security Protocol", above. Process control then passes on to block 602 of FIG. 6A.

Execution of Sweeps on the Server Computer 100 and the Analysis of Information Retrieved from Such Sweeps Using Rules Stored on the Grid Computer System 200.

Figure 6A:
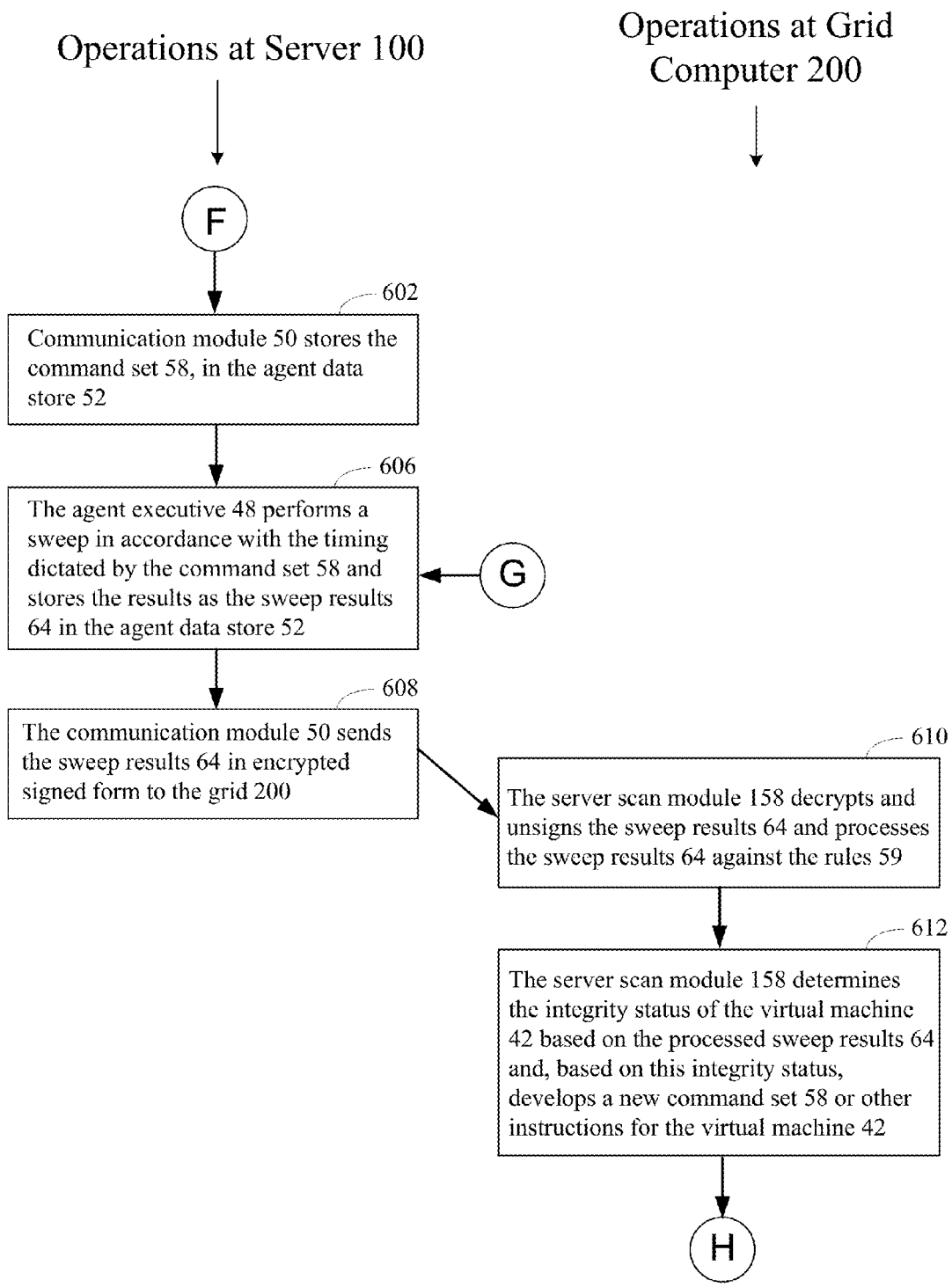
FIGS. 6A-6B illustrate how sweeps are executed on the server computer 100 and the information from the sweeps is communicated to the grid computer system 200 for evaluation against rules 59 and, based on this evaluation, new commands 66 are provided to the server computer 100 by the grid computer system 200 in accordance with the present disclosure.
Figure 6B:
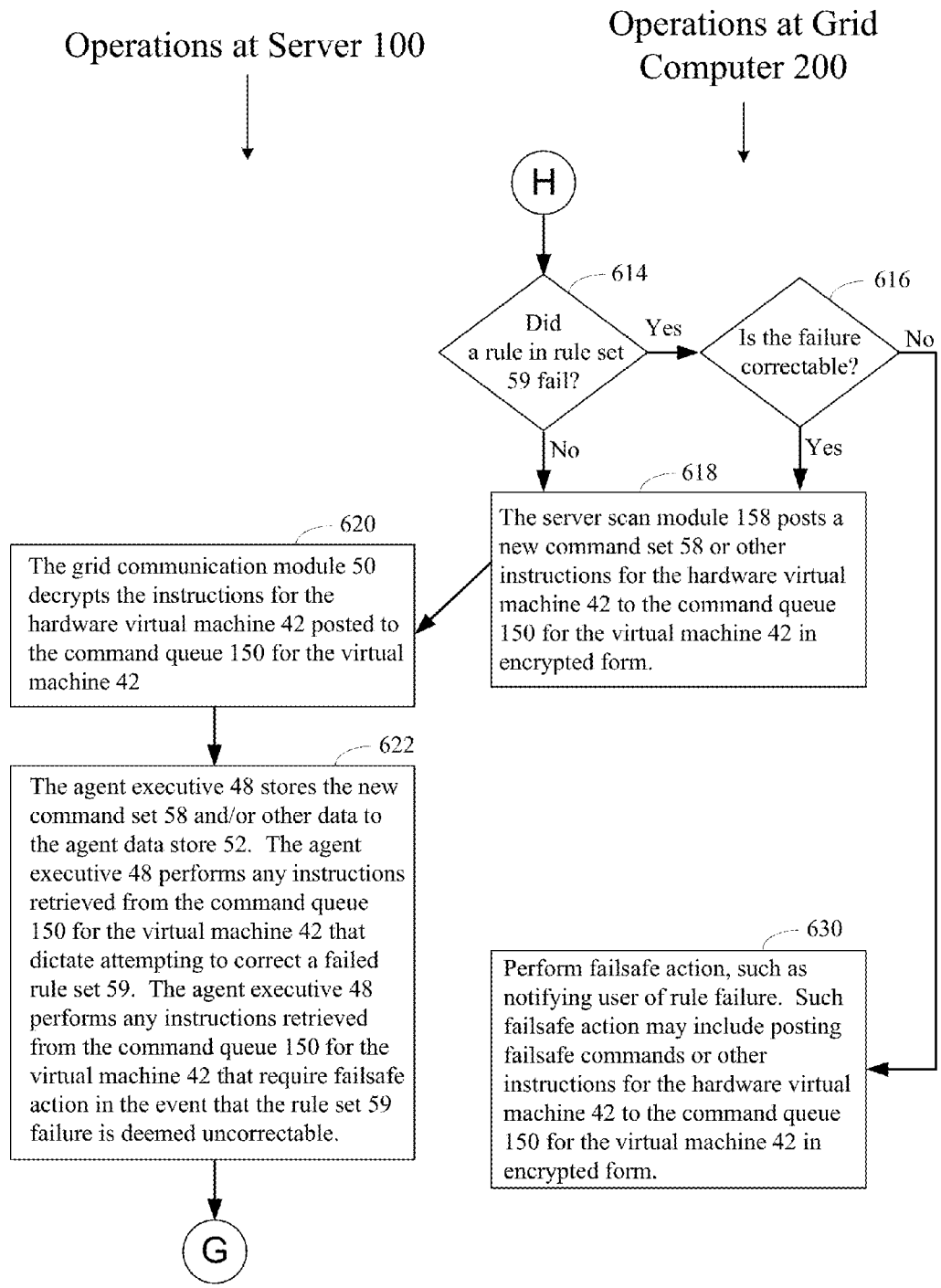

FIG. 6B illustrates an exemplary process for executing a sweep on the server computer 100 and sending the information from the sweep to the grid computer system 200 for evaluation against the rules 59. Based on this evaluation, new commands 66 are provided to the server computer 100 by the grid computer system 200.

Block 602.

In block 602 the communication module 50 stores the command set 58 and/or the updated agent self-verification factors 68 in the agent data store 52.

Block 606.

In block 606, the agent executive 48 performs a sweep in accordance with the timing dictated by the command set 58 and/or the agent self-verification factors 68 and stores the results as the sweep results 64 in the agent data store 52. In some embodiments, block 606 only executes the commands 66 of one or more command sets 58 and does not collect information mandated by the agent self-verification factors 68. In some embodiments, the commands 66 of one or more command sets 58 are executed and the information mandated by the agent self-verification factors 68 is collected. Examples of commands 66 that may be executed in block 606 are described in block 502 and further examples are provided below.

In some embodiments, a command 66 requests that a certain action be taken. In one example, the command 66 may request that a file in a particular directory be deleted. Such a command is an action command. If an action command is executed in block 606, then the status of the command is captured. For instance, in the case where the action command 66 was to delete a file, the command 66 may achieve a status of "1" if the command 66 successfully deleted the file and "0" otherwise. Non-binary status results for action commands 66 are also possible and are within the scope of the present disclosure. Additional non-limiting examples of action commands that may be executed in block 606 include starting or stopping a process in virtual machine 42, deleting, moving or renaming a file, combination of files or directory, altering the privileges of a user of virtual machine 42, changing the time interval for when sweeps in accordance with block 606 are performed, purging a cache, changing the priority of a process running on the virtual machine 42, deleting or adding a user account, reinitializing the virtual machine 42, activating or deactivating a firewall or policy or a rule within a firewall policy, and making changes to configuration parameters within the operating system 44 and application configuration files.

In some embodiments, a command 66 requests that certain information be retrieved from the virtual machine 42. In one example, the command 66 may request that the size of a file in a particular directory be obtained. Such a command is a collection command. If a collection command is executed in block 606, then the information requested by the command is captured. More collection commands are described in greater detail in block 502 above.

Block 608.

In block 608, the communication module 50 sends the sweep results 64 in encrypted form, and signed by the agent executive 48, as identified by the agent identity token 56, to the grid computer system 200 using, for example, the techniques disclosed in the section entitled "Message Security Protocol" above to ensure secure communication of the sweep results 64. In some embodiments, sweep results 64 includes the identity and status of any action command that was executed in block 606 and the data collected by any command that requested information in block 606. In some embodiments, where block 606 also required that information dictated by agent self-verification factors 68 be collected, the sweep results further include the information dictated by the agent self-verification factors 68. It will be appreciated that there is benefit to requiring the agent executive 48 verification from time to time to ensure that the agent executive 48 has not become corrupt. Thus, in some instances of block 606, the information requested by the agent self-verification factors 68 will be collected and this information will be included in the sweep results 64 that are sent to the grid computer system 200 in block 608.

Block 610.

In block 610, the server scan module 158 (also known as the integrity validation module) decrypts and unsigns the sweep results 64 using, for example, the techniques disclosed in the section entitled "Message Security Protocol" above to ensure secure communication of the sweep results 64. The server scan module 158 then processes the sweep results 64 against the rules 59. In one example, a command executed in block 66 required that a cryptographic hash of a particular file resident in the corresponding virtual machine 42 be taken. In such an instance, the rule 59 will compare the cryptographic hash value returned by the rule 59 to a predetermined value and, if the cryptographic hash value returned by the rule 59 does not match the predetermined value, the rule 59 will fail. Advantageously, for security reasons, the exact nature of the rules, such as the predetermined value, are stored on the secure grid computer system 200 rather than sent to the relatively untrustworthy or uncontrolled virtual machine 42.

Block 612.

In block 612, the server scan module 158 determines the states of security, compliance, and integrity of the virtual machine 42 based on the processed sweep results 64 and, based on this integrity status, develops a new command set 58 or other instructions for the virtual machine 42. Blocks 602 through 612 show the power of the present disclosure. Information can be queried or action can be taken by the integrity-verified agent executive 48 using thoroughly authenticated and verifiable commands 66 acting on a relatively unsecure virtual machine 42 and the results of such commands can be analyzed using rules 59 that are in the secure grid computer system 200. In this way, in combination with other aspects of the disclosure, the states of security, compliance and integrity of virtual machine 42 and the programs running on the virtual machine are continuously assessed, analyzed, and improved.

Block 614.

In block 614, a determination is made as to whether a rule in rule set 59 failed. If a determination is made that a rule 59 has failed (614—Yes), then process control passes to block 616. If no rule 59 has failed (614—No), then process control passes directly to block 618.

Block 616.

In block 616, a determination is made as to whether the failure identified in block 614 is correctable. If a rule in rule set 59 failed and the failure is correctable (616—Yes), then process control passes to block 618 where corrective actions are posted to the command queue 150 for the virtual machine 42 or virtual machines 42 for which the rule failed. If the rule failure is deemed not correctable (616—No), then process control passes to block 630 where failsafe action is taken. In some instance, a rule failure is deemed not correctable after corrective actions were attempted by blocks 618 and 620 and such corrective action failed to remove the rule failure.

Block 618.

In block 618, the server scan module 158 posts a new command set 58 or other instructions for the hardware virtual machine 42 to the command queue 150 for the virtual machine 42 in encrypted and signed form. If a rule in rule set 59 failed and the failure is deemed correctable, instructions to attempt correction are posted to the command queue 150 for the virtual machine 42 in encrypted and signed form as well.

If a rule in rule set 59 failed and the failure is deemed correctable then, in practice, the manner in which corrective action is taken in some embodiments is for the server scan module 158 to post a pre-configured or dynamically generated remedial command set 58 to the command queue 150 associated with the agent executive 48, where the remedial command set 58 encodes one or more corrective actions directed to correcting some aspect of the virtual machine 42. Nonlimiting examples of what may be corrected include, but are not limited to, changing a firewall setting, altering a status of a data structure accessible to the virtual machine 42, altering a process running on the virtual machine 42, changing a setting associated with a file stored in a memory accessible to the virtual machine 42, changing a setting of a directory stored in a memory accessible to the virtual machine 42, changing a password associated with a user or with a group of users of the virtual machine 42, resetting or altering a name-value pair in a file in a memory accessible by the virtual machine 42, or changing a network communication port setting that is associated with the virtual machine 42.

Block 620.

Once commands, for example commands designed to correct a self-verification factor 68 failure or rule 59 failure have been posted to the command queue 150 associated with the agent executive 48, the grid communication module 50 of the agent executive 48 reads the command set 58 and decrypts them and verifies the signature. In typical embodiments, the techniques disclosed in the section entitled "Message Security Protocol" above are used to communicate this information to the agent executive 48.

Block 622.

In block 622, the agent executive 48 stores the new command set 58 and/or other data to the agent data store 52. The agent executive 48 performs any instructions retrieved from the command queue 150 for the virtual machine 42 that dictate attempting to correct failed rules in rule set 59. Once block 622 is completed, process control passes back to block 606 and another iteration of the loop beginning at this block is performed in accordance with the periodic interval or schedule dictated by a command set 58 or by the agent executive 48 itself.

Block 630.

Block 630 is reached if a failsafe action needs to be taken because one or more rules in rule set 59 have failed. Such failsafe action may include one or more actions. Such one or more actions may include notifying the user of the failure and/or the posting of failsafe instructions to the command queues 150 for the virtual machines 42 on which the rule in the rule set 59 failed. If such instructions are posted on queues 150 of affected virtual machines 42, in subsequent steps not illustrated in FIG. 6B, such failsafe instructions are read by the virtual machines 42 and executed by the agent executives 48 of the affected virtual machines 42. Depending on the nature of the failsafe action, process control may (i) pass back to block 606 and another iteration of the loop beginning at this block is performed in accordance with the periodic interval or schedule dictated by a command set 58 or by the agent executive 48 itself or (ii) termination of the affected virtual machines 42 initiated.

Figure 7:
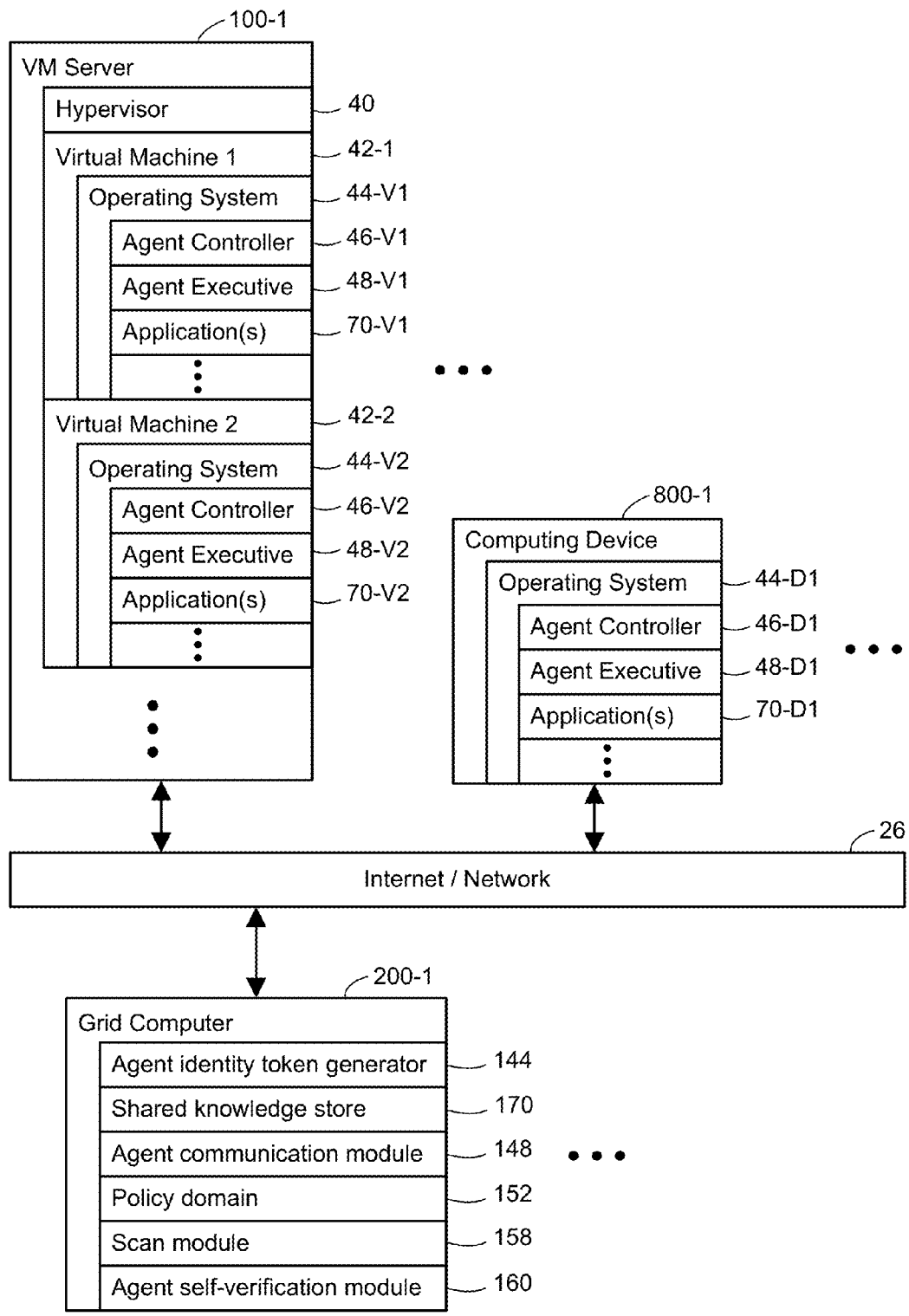
FIG. 7 is a block diagram illustrating conceptually the context in which some embodiments operate.

FIG. 7 illustrates conceptually an environment in which some embodiments operate. As illustrated, the environment may include zero or more virtual machine servers 100, such as VM Server 100-1. As used herein, a virtual machine server 100 may also be referred to as a server computer, a server, or a server system. As described above with respect to FIG. 1A, a virtual machine server 100 includes a hypervisor 40, which instantiates virtual machines 42, such as virtual machines 42-1 and 42-2. Each virtual machine 42 runs an operating system 44, such as the first operating system 44-V1 for the first virtual machine 42-1 and the second operating system 44-V2 for the second virtual machine 42-2. Note that each virtual machine 42 has its own instance of an operating system, and the operating systems need not be the same (e.g., the first operating system 44-V1 may be Linux®, and the second operating system 44-V2 may be Microsoft® Windows®).

Each operating system runs an agent controller 46 and an agent executive 48. The agent executive 48 is also referred to as a security control module 48. The task of the agent controller is to guarantee that the security control module 48 remains running at all times. Also running within each operating system 44 are one or more applications 70, such as the first applications 70-V1 running in the first operating system 44-V1 and the second applications 70-V2 running in the second operating system 44-V2. Each application 70 typically includes many distinct files, such as executable programs, configuration files, and data files.

Some embodiments also include computing devices 800 that are not running virtual machines 42. For example, a first computing device 800-1 runs an operating system 44-D1, and within the operating system are running an agent controller 46-D1 and an agent executive (security control module) 48-D1. An agent controller 46 and an agent executive 48 perform the same security monitoring and control whether they are running on a virtual machine server 100 with many virtual machines or running on an individual computing device.

The virtual machine servers 100 and computing devices 800 communicate over network(s) 26 (e.g., the Internet and/or a corporate LAN) to one or more grid computers 200 (also referred to as security servers). As described above with respect to FIG. 1B, a grid computer 200 includes an agent identity token generator 144, a shared knowledge store 170, an agent communication module 148, a policy domain 152, a scan module 158, and an agent self-verification module 160.

A grid computer 200 can provide security for many individual virtual machines 42 or computing devices 800. In addition, virtual machines 42 running on a single virtual machine server 100 may be serviced by two or more distinct grid computers 200. For example, some embodiments spread out the processing load from the agent executives across multiple grid computers 200 in order to provide better load balancing.

As described above, the grid computers 200 cannot initiate communication with an agent executive 48 running on a virtual machine 42 or computing device 800 because the agent executive should not have open network ports. Instead, the agent executives initiate communication with the appropriate grid computer 200 to send information and/or retrieve information (e.g., retrieve commands from a designated command queue 150).

Figure 8:
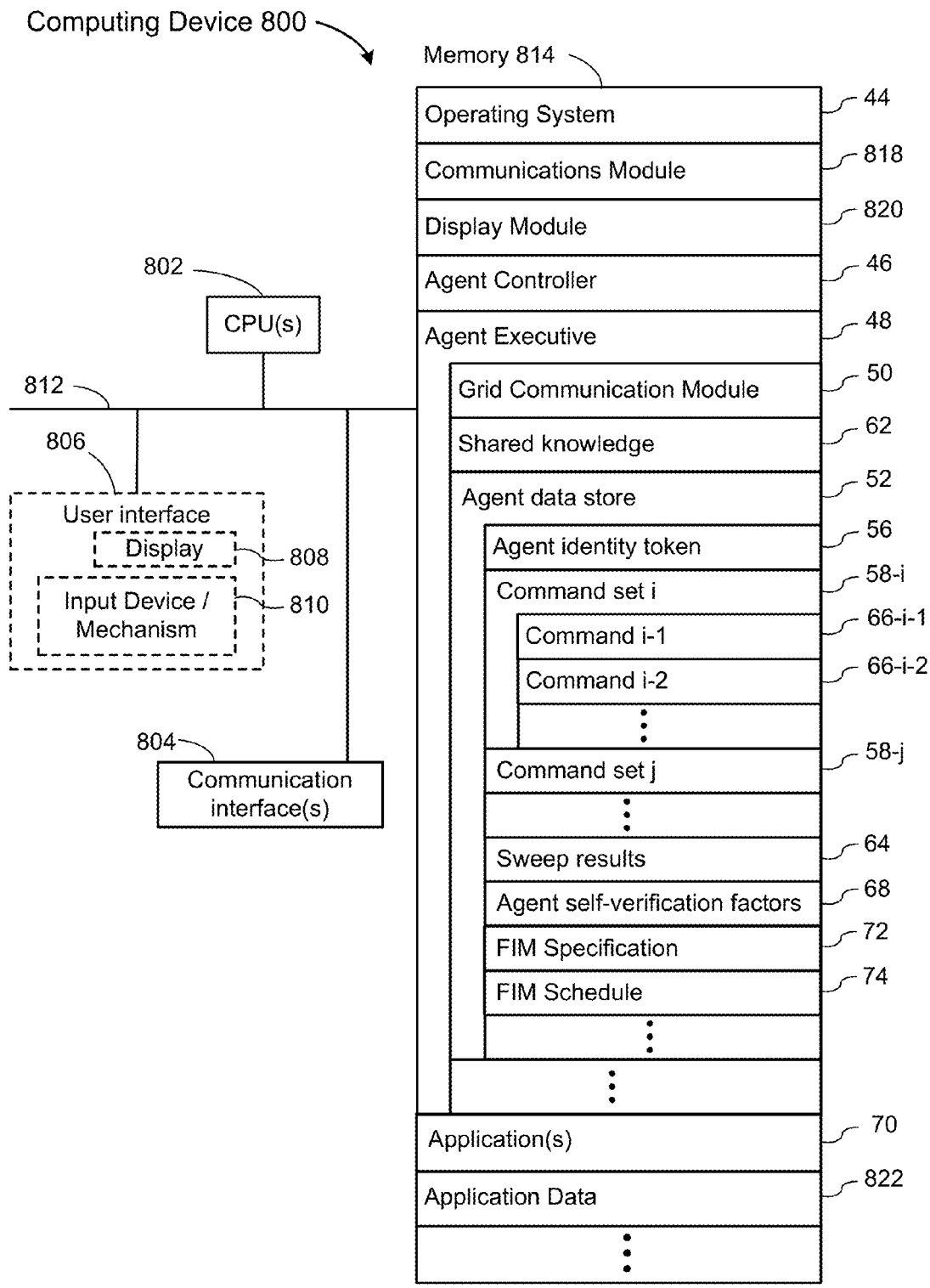
FIG. 8 is a block diagram illustrating a computing device in accordance with some embodiments.
Figure 9A:
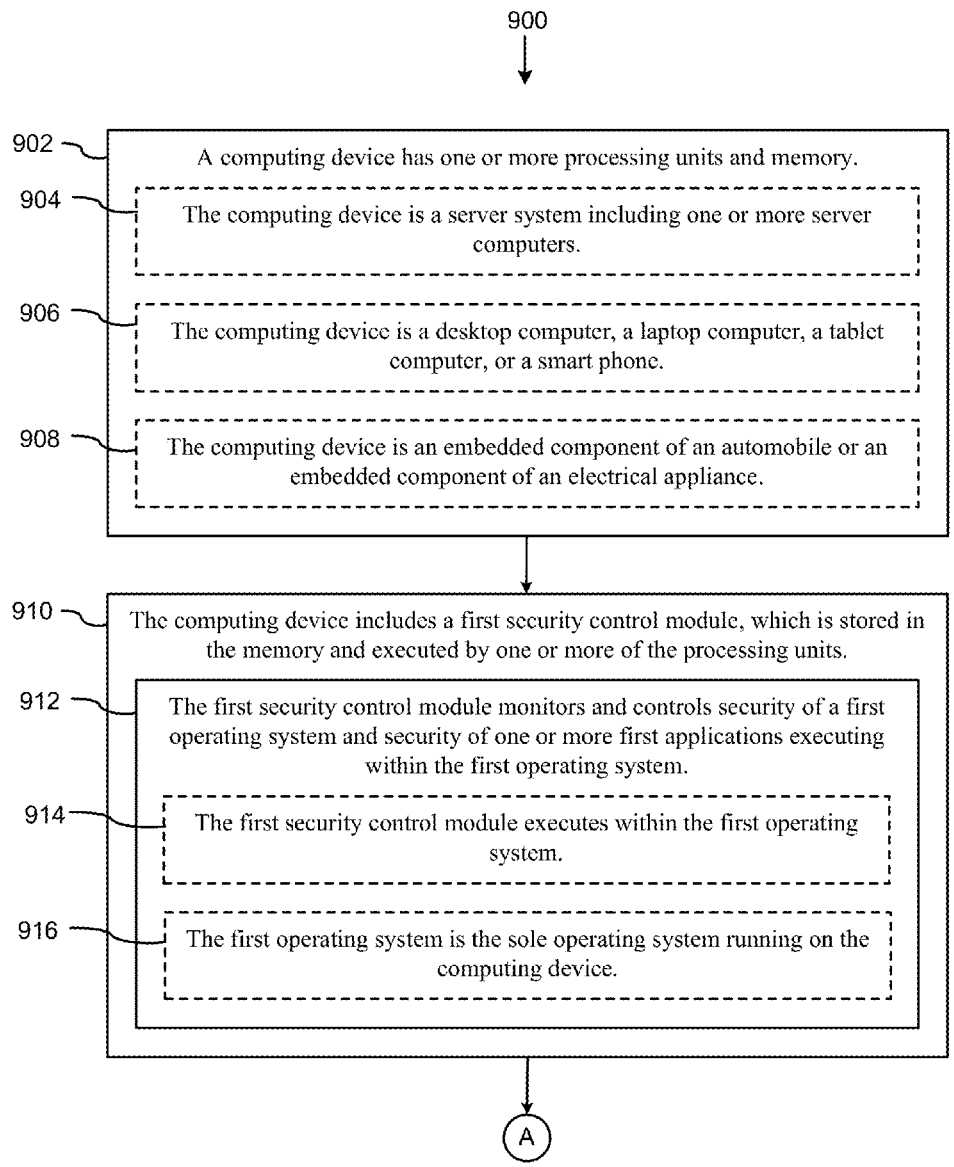
FIGS. 9A-9E provide a process flow for implementing security on a computing device (e.g., server system 100 or computing device 800) in accordance with some embodiments.
Figure 9B:
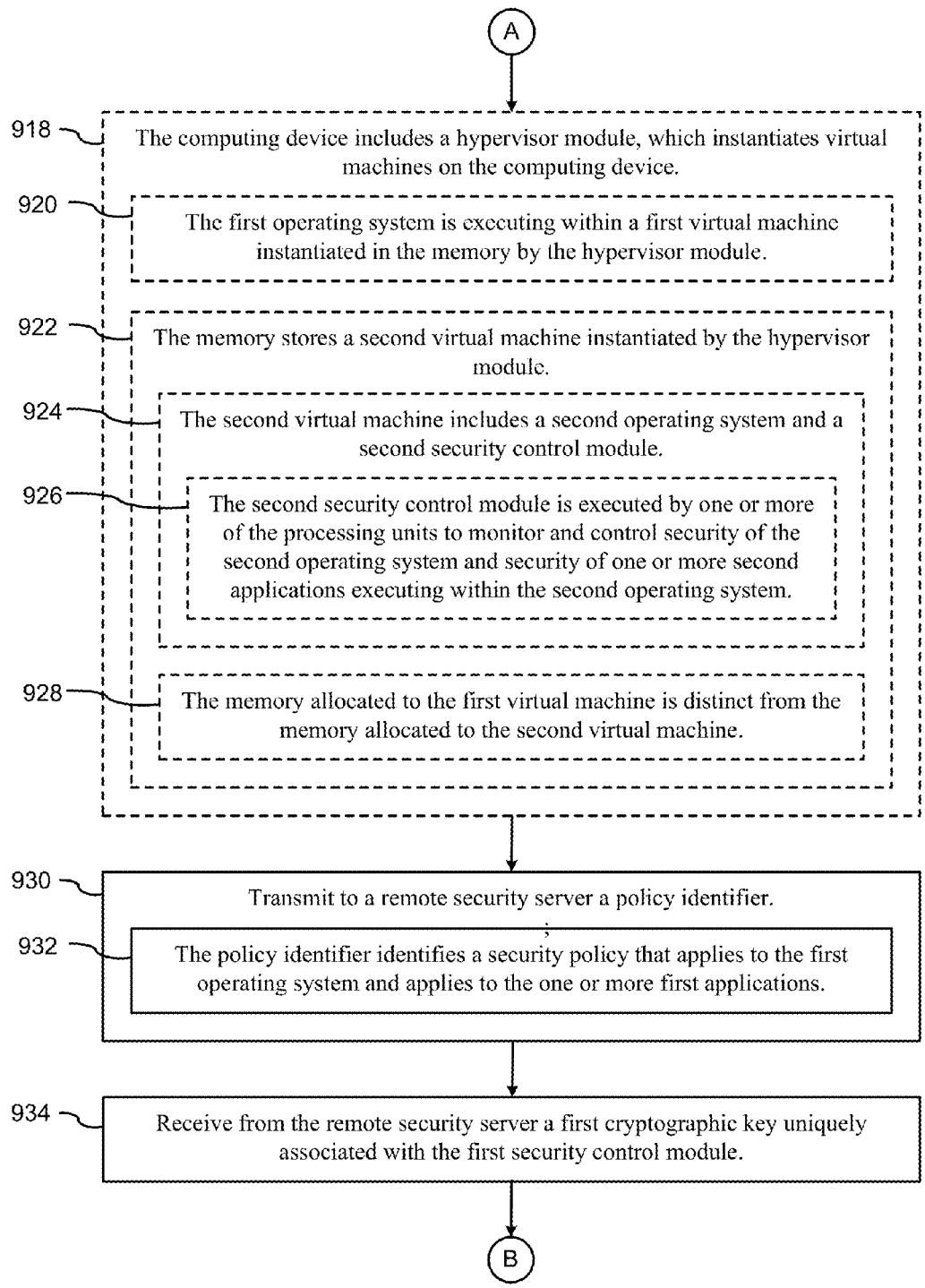
Figure 9C:
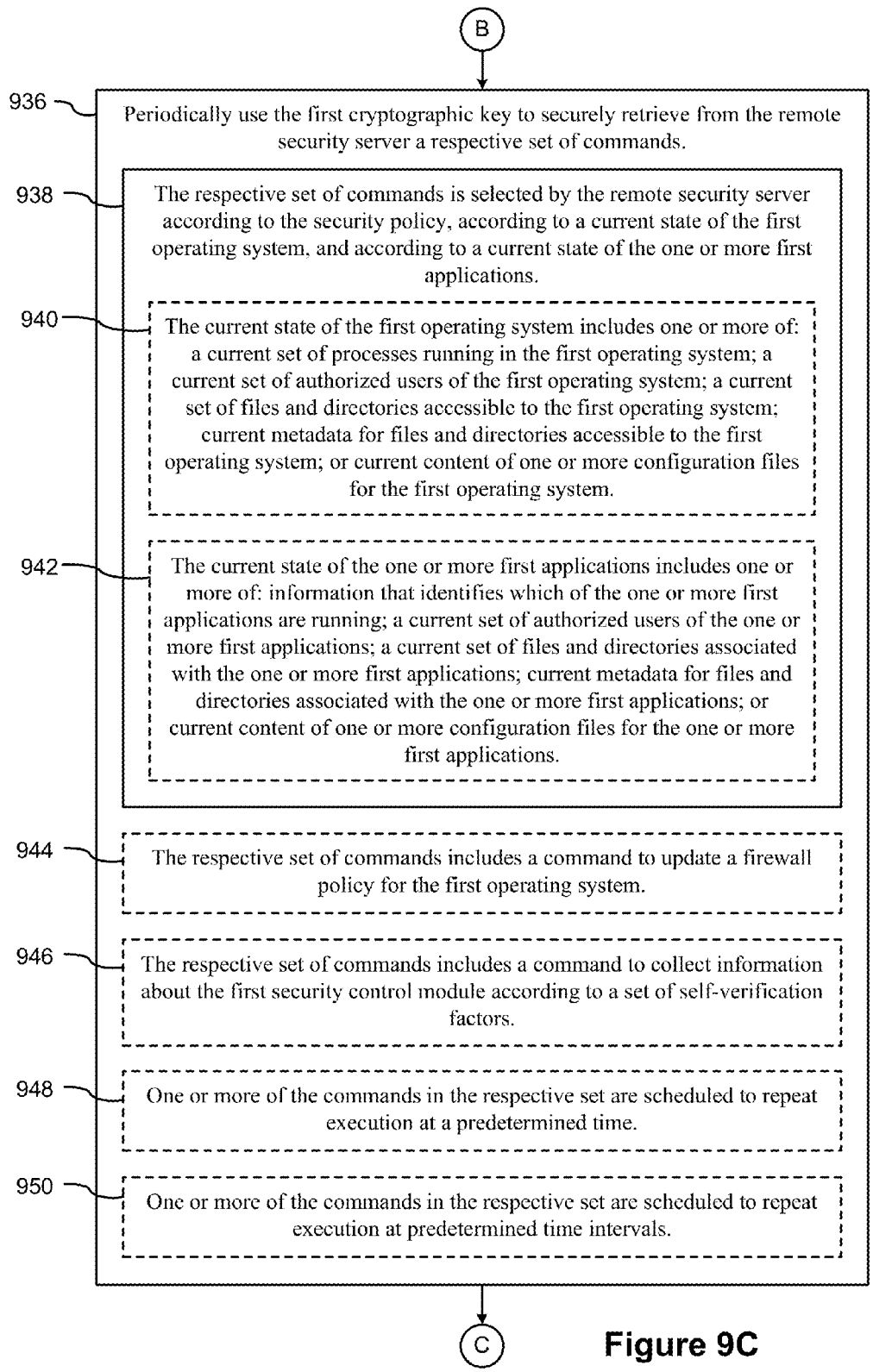
Figure 9D:
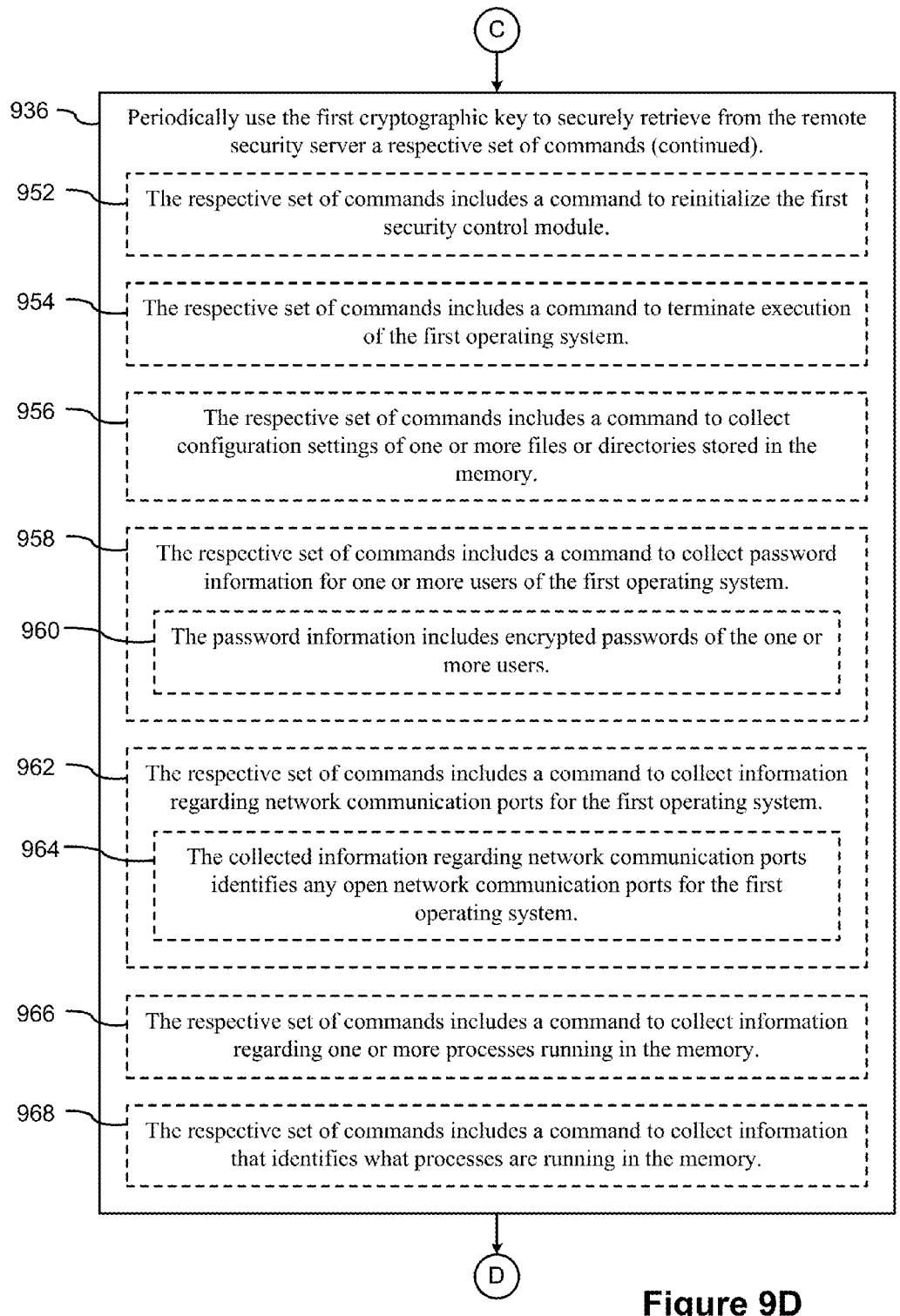
Figure 9E:
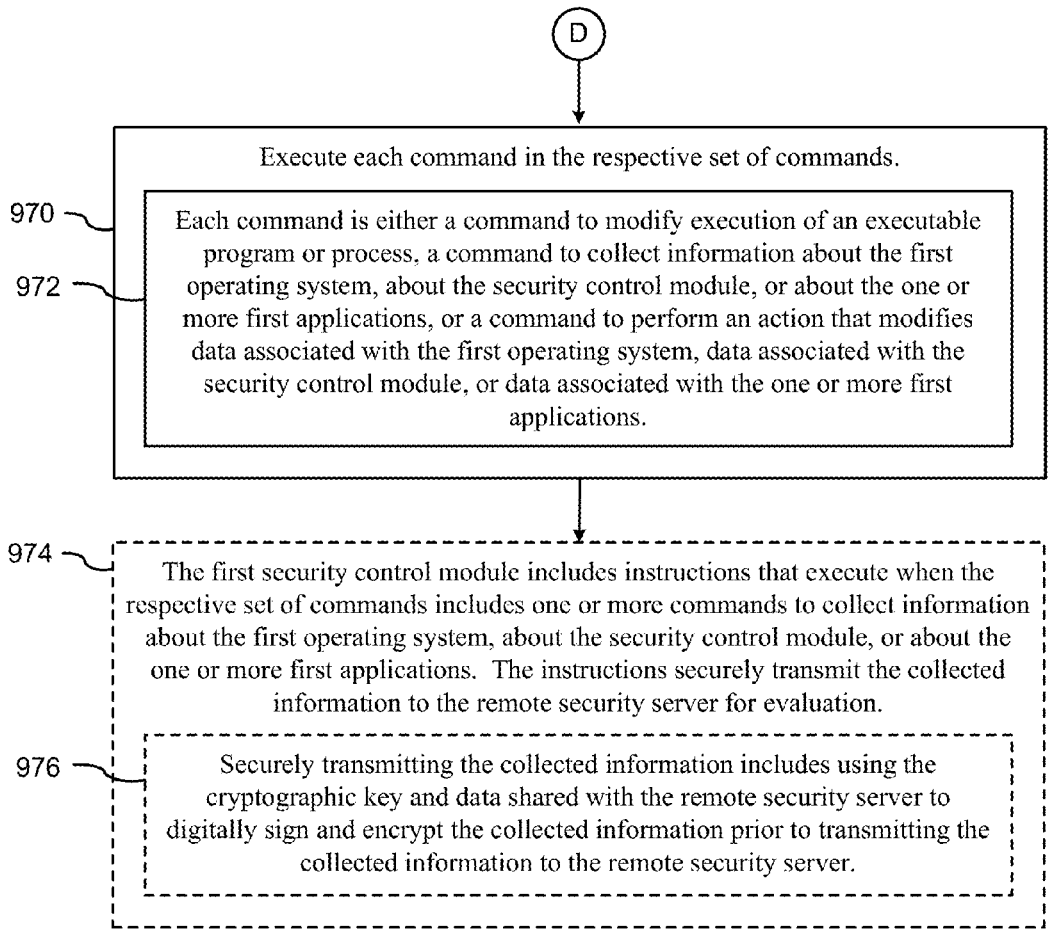
Figure 10A:
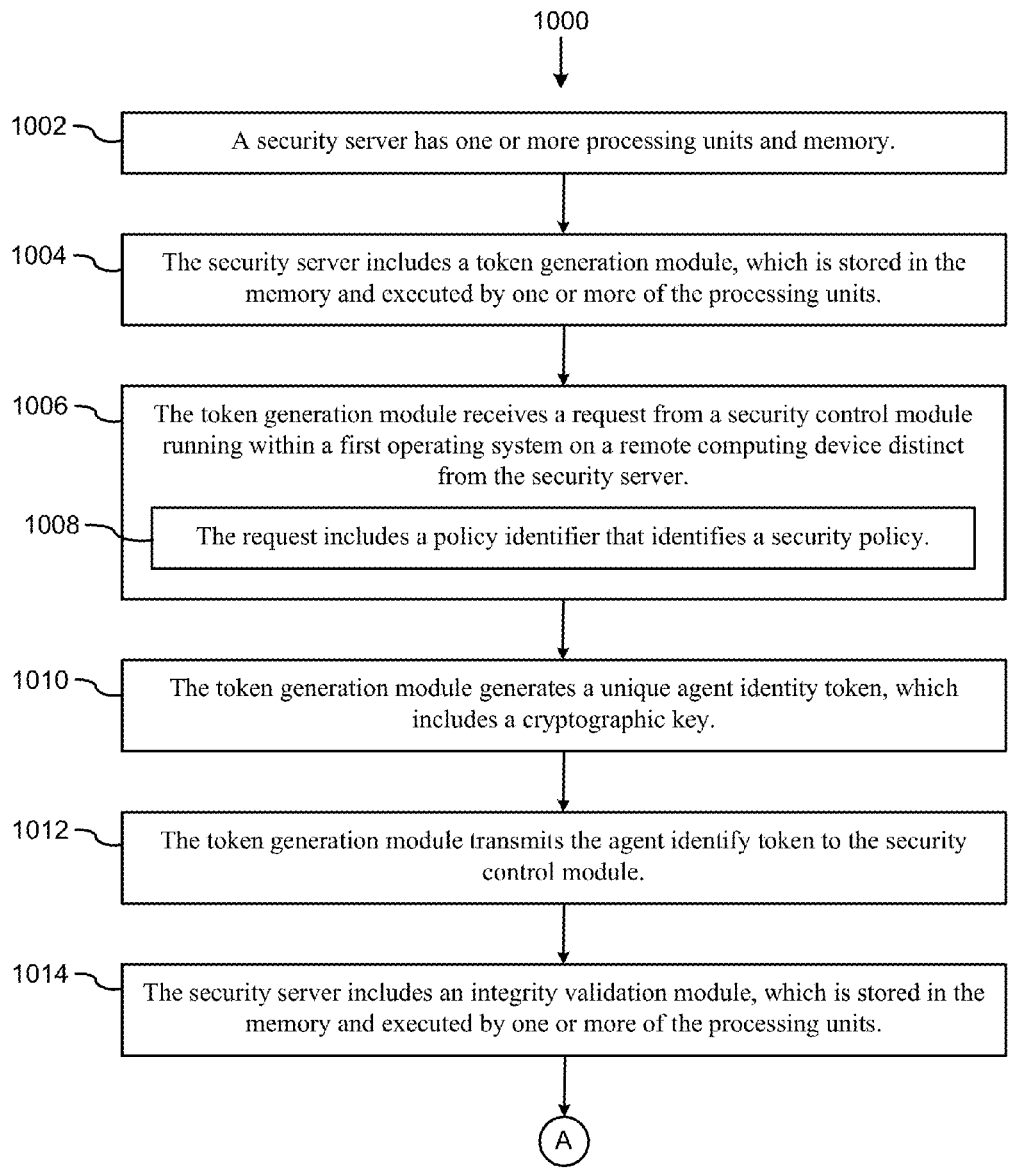
FIGS. 10A-10E provide a process flow for a security server (e.g., grid server 200) in accordance with some embodiments.
Figure 10B:
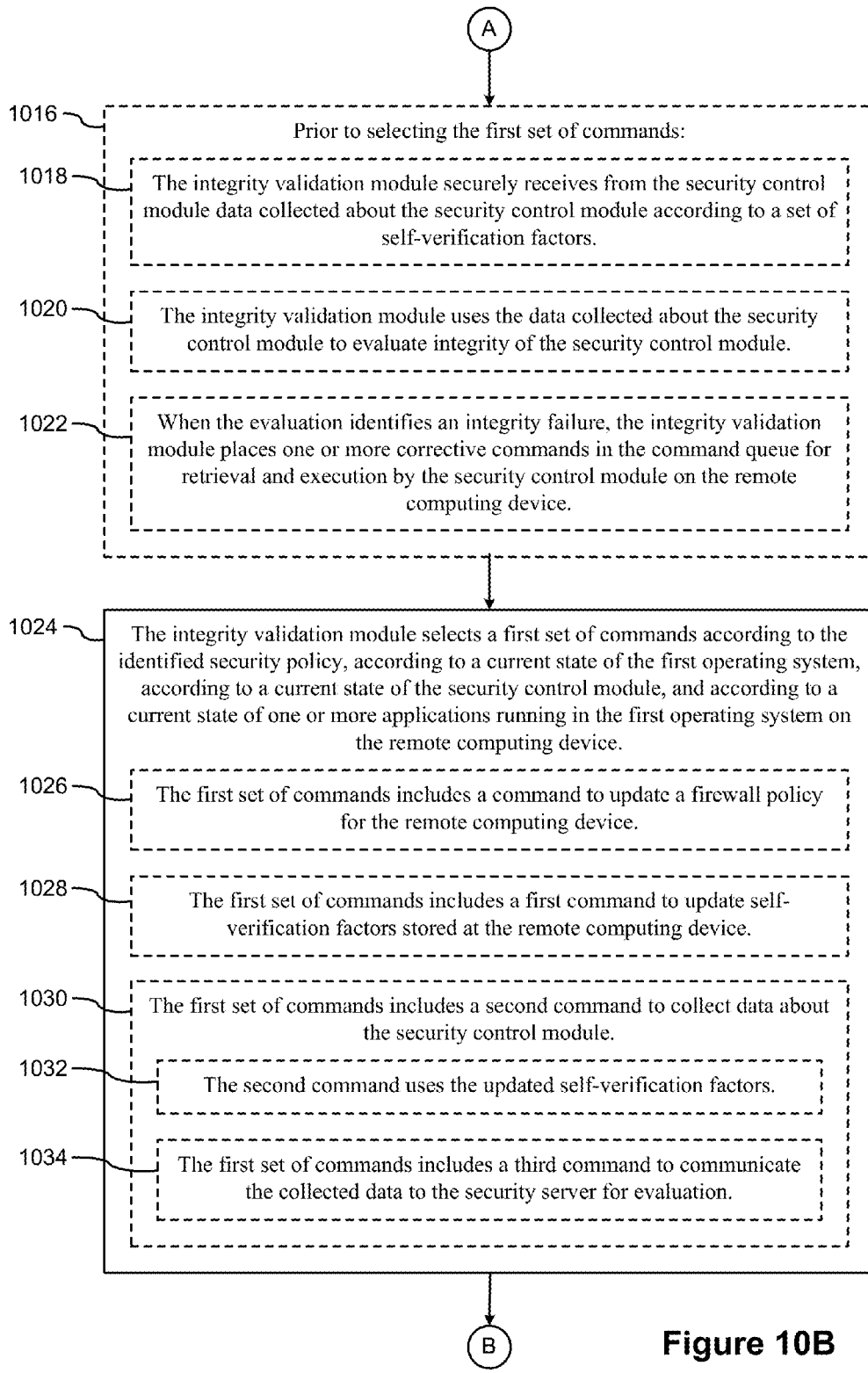
Figure 10C:
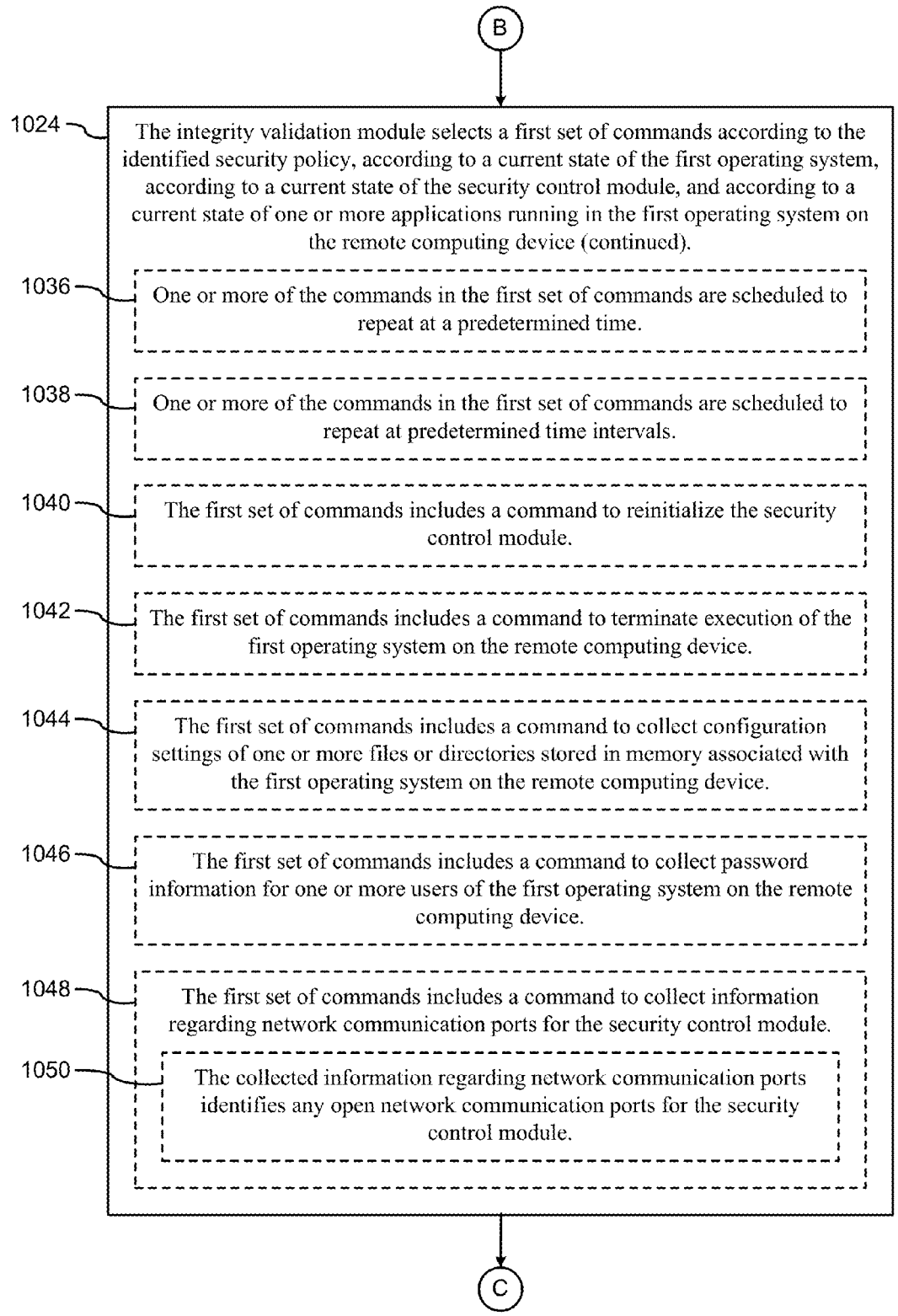
Figure 10D:
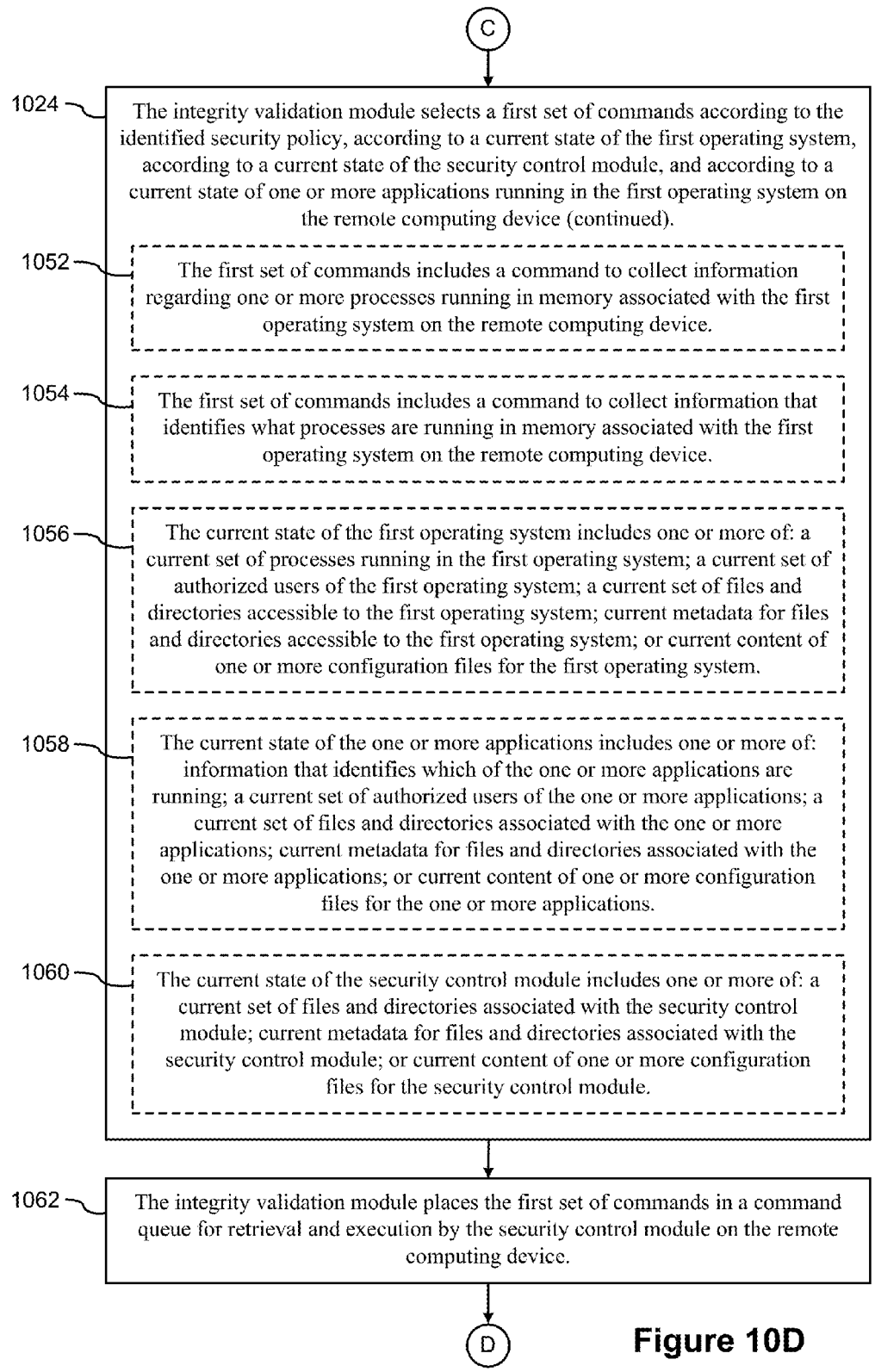
Figure 10E:
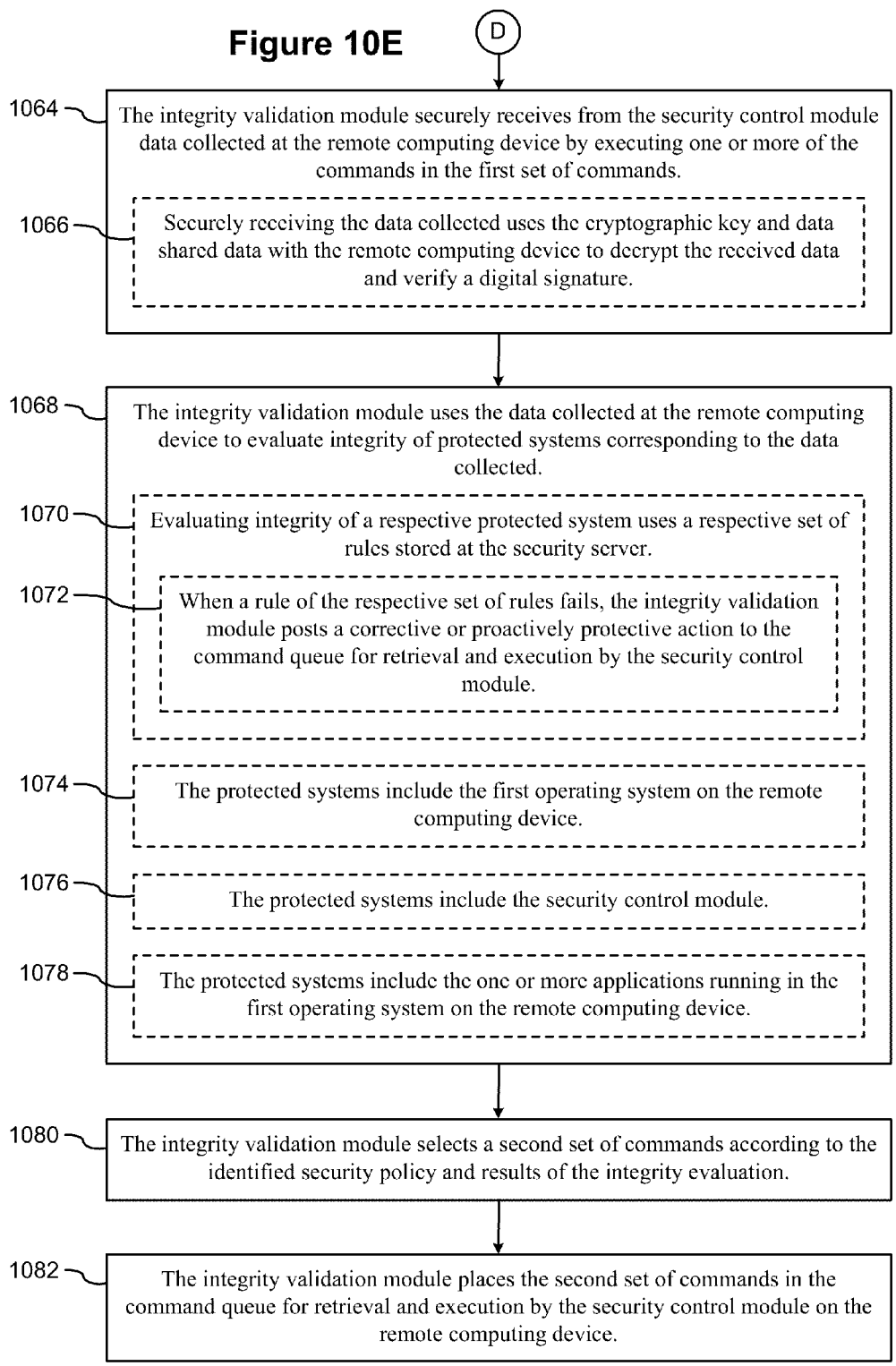

As illustrated in FIG. 8, some computing devices 800 utilize the security server 200 for a single operating system 44, without a virtual machine. The computing device 800 does not require a hypervisor 40 or virtual machines 42. The agent executive 48 monitors and controls security of an operating system 44, including the integrity of the agent executive 48 itself and the integrity of one or more applications 70 running on the operating system 44.

FIG. 8 is a block diagram illustrating a computing device 800. A computing device may be a desktop computer, a laptop computer, a tablet computer, a smart phone, an embedded computing device in an automobile, an embedded computing device in an electronic appliance, an embedded computing device in a medical device, a point of sale terminal, or other computing device having a processing unit, memory, and a network communication interface. In addition a computing device 800 may be a server 100, running a hypervisor 40 and one or more virtual machines 42, as illustrated in FIGS. 1A and 7.

A computing device 800 typically includes one or more processing units (CPUs) 802 for executing modules, programs, or instructions stored in memory 814 and thereby performing processing operations; one or more network or other communications interfaces 804; memory 814; and one or more communication buses 812 for interconnecting these components. The communication buses 812 may include circuitry (sometimes called a chipset) that interconnects and controls communications between system components. Some computing devices 800 include a user interface 806 comprising a display device 808 and one or more input devices or mechanisms 810. In some embodiments, the input device/mechanism includes a keyboard and a mouse; in some embodiments, the input device/mechanism includes a "soft" keyboard, which is displayed as needed on the display device 808, enabling a user to "press keys" that appear on the display 808.

In some embodiments, the memory 814 includes high-speed random access memory, such as DRAM, SRAM, DDR RAM or other random access solid state memory devices. In some embodiments, the memory 814 includes non-volatile memory, such as one or more magnetic disk storage devices, optical disk storage devices, flash memory devices, or other non-volatile solid state storage devices. In some embodiments, the memory 814 includes one or more storage devices remotely located from the CPU(s) 802. The memory 814, or alternately the non-volatile memory device(s) within the memory 814, comprises a non-transitory computer readable storage medium. In some embodiments, the memory 814, or the computer readable storage medium of the memory 814, stores the following programs, modules, and data structures, or a subset thereof:

- an operating system 44, which includes procedures for handling various basic system services and for performing hardware dependent tasks;
- a communications module 818, which is used for connecting the computing device 800 to other computers and devices via the one or more communication network interfaces 804 (wired or wireless) and one or more communication networks 26, such as the Internet, other wide area networks, local area networks, metropolitan area networks, and so on;
- a display module 820, which receives input from the one or more input devices 810, and generates user interface elements for display on the display device 808;

an agent executive 48 (also referred to as a security control module), which is described above with respect to FIG. 1A as well as FIGS. 2, 3A, 3B, 4A-4D, 5, 6A, and 6B. The agent executive 48 includes various executable components or modules in addition to various data, including data stored in an agent data store 52; and one or more applications 70, which run in the operating system 44. In some instances, the applications 70 have associated application data 822, such as configuration data, a usage log, or working data (e.g., files created by a user of the applications 70).

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 814 may store a subset of the modules and data structures identified above. Furthermore, the memory 814 may store additional modules or data structures not described above.

Although FIG. 8 shows a computing device 800, FIG. 8 is intended more as a functional description of the various features that may be present rather than as a structural schematic of the embodiments described herein. In practice, and as recognized by those of ordinary skill in the art, items shown separately could be combined and some items could be separated.

FIGS. 9A-9E provide a process flow 900 for implementing security on a computing device in accordance with some embodiments. The computing device has (902) one or more processing units and memory. In some embodiments, the computing device is (904) a server system including one or more servers, such as the server system 100 illustrated in FIG. 1A. In some embodiments, the computing device is (906) a desktop computer, a laptop computer, a tablet computer, or a smart phone. In some embodiments, the computing device is (908) an embedded component of an automobile or an embedded component of an electrical appliance. In some embodiments, the computing device is a point-of-sale terminal. In some embodiments, the computing device includes a hypervisor 40 and one or more virtual machines. In some embodiments, the computing device includes a single operating system, which is not executing within a virtual machine.

The computing device includes (910) a first security control module 48 (also referred to as an agent executive), which is stored in the memory and executed by one or more of the processing units. The first security control module monitors (912) and controls (912) security of a first operating system and security of one or more first applications executing within the first operating system, as illustrated above in FIGS. 1A, 7, and 8. In some embodiments, the first security control module executes (914) within the first operating system, as illustrated in FIGS. 1A and 7. In some embodiments, the first operating system is (916) is the sole operating system running on the computing device, as illustrated in FIG. 8.

In some embodiments, the computing device is a server system that instantiates one or more virtual machines, as illustrated in FIG. 1A. In these embodiments, the computing device includes (918) a hypervisor module, which instantiates virtual machines on the computing device. In some embodiments, the first operating system executes (920) within a first virtual machine instantiated in the memory by the hypervisor module.

In some embodiments, the memory stores (922) a second virtual machine instantiated by the hypervisor module, as illustrated in FIGS. 1A and 7. The second virtual machine includes (924) a second operating system and a second security control module. The second security control module is executed (926) by one or more of the processing units to monitor and control security of the second operating system and security of one or more second applications executing within the second operating system. Typically, the memory allocated to the first virtual machine is (928) distinct from the memory allocated to the second virtual machine. Programs within one virtual machine have no visibility or access to memory used by another virtual machine.

The security for an operating system and the programs running in the operating system (including the security control module itself) is monitored and evaluated by a remote security server 200, which is also referred to as a grid server. Because a single remote security server can monitor and evaluate many computing devices (and many individual virtual machines on a single computing device in some embodiments), security policies are used to identify what security applies to each security control module. A single policy typically applies to multiple security control modules.

The security control module transmits (930) to a remote security server a policy id, which identifies (932) a security policy that applies to the first operating system and applies to the one or more first applications. As illustrated in FIGS. 1A and 1B, each policy has an associated set of commands and an associated set of rules for evaluating the collected data (e.g., data about each security control module, data about the operating system in which each security control module is running, and/or data about one or more applications running in each operating system). The remote security server generates a token with a first cryptographic key and transmits it to the security control module. The security control module receives (934) the first cryptographic key from the remote security server. The first cryptographic key is uniquely associated (934) with the first security control module.

The security control module periodically uses (936) the first cryptographic key to securely retrieve from the remote security server a respective set of commands (e.g., from a command queue 150 at the remote security server 200, as illustrated in FIG. 1B). The respective set of commands is selected (938) by the remote security server according to the security policy, according to the current state of the first operating system, according to the current state of the first security control module, and/or according to the current state of one or more first applications running in the first operating system. This is described above with respect to FIGS. 6A and 6B.

In some embodiments, the current state of the first operating system includes (940) one or more of: a current set of processes running in the first operating system; a current set of authorized users of the first operating system; a current set of files and directories accessible to the first operating system; current metadata for files and directories accessible to the first operating system; or current content of one or more configuration files for the first operating system.

In some embodiments, the current state of the one or more first applications includes (942) one or more of: information that identifies which of the one or more first applications are running; a current set of authorized users of the one or more first applications; a current set of files and directories associated with the one or more first applications; current metadata for files and directories associated with the one or more first applications; and/or current content of one or more configuration files for the one or more first applications.

In some embodiments, the current state of the first security module includes one or more of: a current set of files and directories associated with the security control module; current metadata for files and directories associated with the security control module; and/or current content of one or more configuration files for the security control module.

The respective set of commands can include commands to perform various operations in the first operating system. At noted above, the remote security server selects the commands and puts them into a queue 150, which are retrieved by the security control module for execution.

In some instances, the respective set of commands includes (944) a command to update a firewall policy for the first operating system. For example, a user may modify a firewall policy associated with a certain security policy. Each security control module using that security policy will be updated by placing appropriate commands in the command queues for each relevant security control module.

In some instances, the respective set of commands includes (946) a command to collect information about the first security control module according to a set of self-verification factors. In some embodiments, the self verification factors are stored in the agent data source associated with the security control module, as illustrated in FIG. 1A. In some embodiments, the self-verification factors are included with the command to collect information about the security control module. The collected information enabled the remote security server to evaluate the integrity of the security control module itself (e.g., determine whether some malware has modified a program or a configuration parameter for the security control module). In some embodiments, stored self-verification factors at computing device can be subsequently modified by commands from the security server.

Security of a computing device is an ongoing activity, and thus commands are periodically retrieved (936) as noted above. In some instances, one or more of the commands in the respective set are scheduled (948) to repeat execution at a predetermined time. In some instances, one or more of the commands in the respective set are scheduled (950) to repeat execution at predetermined time intervals.

In some instances, the respective set of commands includes (952) a command to reinitialize the first security control module. In some instances, reinitializing the first security control module may resolve certain issue with the integrity of the first security module (whether due to malware or not).

In some instances, the respective set of commands includes (954) a command to terminate execution of the first operating system. This is typically a last resort when corruption or malware has been identified and corrective actions have been unsuccessful. This is an example of a failsafe action, as described above with respect to FIG. 6B. In some embodiments, when execution of the operation is terminated an alert message is transmitted to one or more users to point out the situation and the action taken.

In some instances, the respective set of commands includes (956) a command to collect configuration settings of one or more files or directories stored in the memory. This collected data will be subsequently evaluated by the remote security server.

In some instances, the respective set of commands includes (958) a command to collect password information for one or more users of the first operating system. In some instances, the password information includes (960) encrypted passwords of the one or more users. For example, this can enable the remote security server to identify if any passwords have been modified. In some instances, the password information includes access rights associated with one or more users. This can be used to determine if a user's access rights have been elevated to an improper level. In some instances, the password information includes access groups or access roles assigned to users.

In some instances, the respective set of commands includes (962) a command to collect information regarding network communication ports for the first operating system. For example, in some instances the collected information regarding network communication ports identifies (964) any open network communication ports for the first operating system or open network communication ports for the first security control module.

Sometime malware changes the set of processes that are running within the operating system. This may involve running an additional process that should not be running, terminating execution of a process that should be running, or modifying an existing process in some way. Some embodiments detect such problems by gathering information about the processes. In some instances, the respective set of commands includes (968) a command to collect information that identifies what processes are running in the memory. This can enable the remote server to identify processes that have been added or removed. In some instances, the respective set of commands includes (966) a command to collect information regarding one or more processes running in the memory. This information about running processes may identify resources used the processes, such as memory, file handles, CPU usage, and so on. The information may also identify how long the process has been running or a user account under which the process is running.

After the security control module retrieves the respective set of commands, the security control module executes (970) each command in the respective set. In some embodiments, the commands have a defined order, and the commands are executed in the defined order. For example, a command to perform a corrective action may be sequenced before another command to gather information. The gathered information may be used by the remote security server to determine whether the corrective action was successful.

Each command is (972) either a command to modify execution of an executable program or process, a command to collect information about the first operating system, about the security control module, or about the one or more first applications, or a command to perform an action that modifies data associated with the first operating system, data associated with the security control module, or data associated with the one or more first applications. For example, commands to terminate execution of the operating system, reinitialize the security control module, terminate a process, or start a process are all commands that modify execution of an executable program or process. Collection commands include commands that collect data about the security control module, collect data about one or more applications, collect data about the operating system, or collect data about one or more files or directories. Commands that modify data include commands that insert new data, remove existing data, and/or change existing data. Modification commands can change configuration parameters (for the operating system, for the security control module, or for one or more of the applications), change user access rights, change data or metadata associated with the operating system or any application running in the operating system, and so on.

The information collected by the collection commands is evaluated by the remote security server based on rules stored at the remote security server. The security control module just collects the information according to the commands, then transmits the collected data to the remote security server. In particular, the first security control module includes (974) instructions that execute when the respective set of commands includes one or more commands to collect information about the first operating system, about the security control module, or about the one or more first applications. The instructions securely transmit (974) the collected information to the remote security server for evaluation. In some embodiments, securely transmitting the collected information includes (976) using the cryptographic key and data shared with the remote security server to digitally sign and encrypt the collected information prior to transmitting the collected information to the remote security server.

FIGS. 10A-10E provide a process flow 1000 for implementing security using a security server 200 in accordance with some embodiments. The security server identifies commands to be executed on each computing device, and places the commands in a queue. As illustrated above, the computing device retrieves the commands and executes them, then returns requested data to the security server. The security server evaluates the collected data (e.g., comparing the data against a set of rules). When anomalies are detected, corrective commands are placed into the queue for execution on the computing device. Typically the process of receiving and evaluating data collected by the security control module occurs on a regular periodic basis, such as every minute, every ten minutes, or every hour. The frequency can depend on the type of the computing device. For example, if the computing device is part of a server farm that instantiates virual machines, there is probably high bandwidth connectivity, so the process may occur frequently. On the other hand, if the computing device is an embedded component in an automobile, the process may occur less frequently (e.g., two or three times a day).

The security server 200 has (1002) one or more processing units and memory. The security server 200 includes (1004) a token generation module 144, which is stored in the memory and executed by one or more of the processing units. The token generation module 144 receives (1006) a request from a security control module 48 running within a first operating system 44 on a remote computing device distinct from the security server 200. As noted above with respect to FIGS. 9A-9E, the computing device may be a server with a hypervisor instantiating a plurality of virtual machines, or a device running a single operating system, such as an individual user computer, a computing device embedded in machine (e.g., a automobile or electrical appliance), or a point-of-sale terminal. The request includes (1008) a policy identifier that identifies a security policy. A security policy determines what security will be applied (e.g., what applications will be monitored, what processes will be monitored, what individual files and folders will be monitored, and so on).

The token generation module 144 generates (1010) a unique agent identity token for the security control module. The agent identity token includes (1010) a cryptographic key. In some embodiments, the agent identity token includes a piece of information that will be shared by the security server and the security control module (but but by any other device). The shared information and the cryptographic key can be used to guarantee integrity of communication between the security control module and the security server. Each distinct security control module instance has a unique agent identity token, which corresponds to a unique command queue on the security server. The token generation module 144 transmits (1012) the agent identity token to the security control module.

The security server 200 also includes (1014) an integrity validation module 158, which is stored in the memory of the security server and executed by one or more of the processing units of the security server. In some embodiments, the security control module initiates a self-validation before (1016) the security server selects the first set of commands. In some embodiments, the security control module collects initial self-validation data using a set of self-validation factors stored with the security control module. The integrity validation module 158 at the security server securely receives (1018) the data collected about the security control module. The integrity validation module 158 then uses (1020) the collected data to evaluate the integrity of the security control module. When the evaluation identifies an integrity failure, the integrity validation module 158 places (1022) one or more corrective commands in the command queue 150 for retrieval and execution by the security control module 48 on the remote computing device.

The integrity validation module 158 selects (1024) a first set of commands according to the identified security policy, according to a current state of the first operating system, according to a current state of the security control module, and/or according to a current state of one or more applications running in the first operating system on the remote computing device. The first set of commands may contain commands for different unrelated purposes, such as one command to collect information about the operating system on the computing device, a second command to update a firewall policy, and a third command to collect information about an application running on the computing device.

In some instances, the first set of commands includes (1026) a command to update a firewall policy for the remote computing device. For example, a user may specify changes to a firewall policy by updating the corresponding security policy on the security server. Subsequently, the changes are placed into command queues 150 for each of the affected operating systems (e.g., a hundred virtual machines or a dozen embedded devices).

In some instances, the first set of commands includes (1028) a first command to update self-verification factors stored at the remote computing device. In embodiments that store the self-verification factors with the security control module, updates are sometimes required based on new knowledge about malware. In other embodiments, the self-verification factors are included in the relevant self-verification commands each time they are used, and thus the most current self-verification factors are used automatically.

In some instances, the first set of commands includes (1030) a second command to collect data about the security control module. If the factors have been updated by a command in the first set of commands, the second command uses (1032) the updated self-verification factors. In some embodiments, the first set of commands includes (1034) a third command to communicate the collected data to the security server for evaluation. In other embodiments, whenever a set of commands includes one or more commands to collect data, the collected data is automatically communicated to the security server.

In some instances, one or more of the commands in the first set of commands are scheduled (1036) to repeat at a predetermined time. In some instances, one or more of the commands in the first set of commands are scheduled (1038) to repeat at predetermined time intervals. For example, commands to collect basic integrity information may be repeated every five minutes or once an hour.

In some instances, the first set of commands includes (1040) a command to reinitialize the security control module. For example, the security server may change one or more configuration parameters for the security control module and reinitialize the security control module so that the new parameters take effect. As another example, the integrity validation module may identify anomalous data for the security control module, and reinitializing may be able to resolve the problem.

In some instances, the first set of commands includes (1042) a command to terminate execution of the first operating system on the remote computing device. This is a severe action, and is typically applied only when the integrity validation module identifies a significant security problem that cannot be resolved by less drastic measures.

In some instances, the first set of commands includes (1044) a command to collect configuration settings of one or more files or directories stored in memory associated with the first operating system on the remote computing device. For example, if a critical file should be read-only, a command may read the attributes of the critical file to verify the read-only attribute has not changed. As another example, suppose a directory with specific operating system files should not be altered. A command may collect information on the number of files in the directory, the names of the files, the sizes of the files, and so on to guarantee that the system has not been compromised.

In some instances, the first set of commands includes (1046) a command to collect password information for one or more users of the first operating system on the remote computing device. The password information may include access rights associated with certain users, whether there have been failed login attempts, whether passwords meet strength requirements, and so on. In some instances, the password information includes the passwords themselves in encrypted form. This can be used to determine whether a password has been modified.

In some instances, the first set of commands includes (1048) a command to collect information regarding network communication ports for the security control module. In some instances, the collected information regarding network communication ports identifies (1050) any open network communication ports for the security control module. To protect the integrity of the security control module, it should not have any open network ports, so the existence of any open ports would represent an anomalous condition.

In some instances, the first set of commands includes (1052) a command to collect information regarding one or more processes running in memory associated with the first operating system on the remote computing device. The information may include the resources used by each process (e.g., memory, CPU), how long each process has been running, the user ID or account under which each process is running, and so on.

In some instances, the first set of commands includes (1054) a command to collect information that identifies what processes are running in memory associated with the first operating system on the remote computing device. This information can be used to identify whether there are any unexpected processes running or whether any expected processes are not running.

As noted above, the selection of commands is based on several factors, including the current state of the first operating system. The current state of the first operating system is known based on data collected by the security control module. In particular, the current state of the first operating system includes (1056) one or more of: a current set of processes running in the first operating system; a current set of authorized users of the first operating system; a current set of files and directories accessible to the first operating system; current metadata for files and directories accessible to the first operating system; or current content of one or more configuration files for the first operating system.

Similarly, the selection of commands is based on the current state of one or more applications running in the operating system. This information is collected by the security control module. The current state of the one or more applications includes (1058) one or more of: information that identifies which of the one or more applications are running; a current set of authorized users of the one or more applications; a current set of files and directories associated with the one or more applications; current metadata for files and directories associated with the one or more applications; or current content of one or more configuration files for the one or more applications.

Finally, the selection of commands is based on the current state of the security control module, which is based on data previously collected by the security control module (e.g., using the self-verification factors). The current state of the security control module includes (1060) one or more of: a current set of files and directories associated with the security control module; current metadata for files and directories associated with the security control module; or current content of one or more configuration files for the security control module.

When the first set of commands is selected, the integrity validation module 158 places (1062) the first set of commands into a command queue 150 for retrieval and execution by the security control module on the remote computing device.

After the security control module retrieves and executes the first set of commands, the security control module transmits the collected data 64 to the security server 200. The integrity validation module securely receives (1064) from the security control module the data collected at the remote computing device, which was collected by executing one or more of the commands in the first set of commands. In some embodiments, securely receiving the collected data is performed by using (1066) the cryptographic key and data shared data with the remote computing device to decrypt the received data and verify the digital signature.

The integrity validation module uses (1068) the data collected at the remote computing device to evaluate integrity of protected systems corresponding to the data collected. In some embodiments, the protected systems include (1074) the first operating system on the remote computing device. In some embodiments, the protected systems include (1076) the security control module itself. In some embodiments, the protected systems include (1078) one or more applications running in the first operating system on the remote computing device. In some embodiments, evaluating integrity of a respective protected system uses (1070) a respective set of rules stored at the security server. For example, a rule may specify what data is expected for a certain data collection operation. When a rule of the respective set of rules fails (e.g., results not matching expected results), the integrity validation module posts (1072) a corrective or proactively protective action to the command queue for retrieval and execution by the security control module.

Security is an ongoing process, so the process of selecting commands and evaluating retrieved data repeats. The specific commands selected depend on the results from the previous iteration. In particular, the integrity validation module selects (1080) a second set of commands according to the identified security policy and results of the integrity evaluation (which was based on the previously collected data). The integrity validation module places (1082) the second set of commands into the command queue for retrieval and execution by the security control module on the remote computing device.

In sum, during each iteration the integrity validation module selects a set of commands according to the identified security policy, according to a current state of the first operating system, according to a current state of the security control module, and according to a current state of one or more applications running in the first operating system on the remote computing device. The set of commands are placed into the appropriate command queue, and are subsequently retrieved by the security control module. The security control module executes each of the commands, which either perform an action or collect data. The security control module then securely transmits the collected data to the security server. The integrity validation module evaluates the collected data according to various rules, and the next set of commands is selected, beginning the next iteration.

Figure 11:
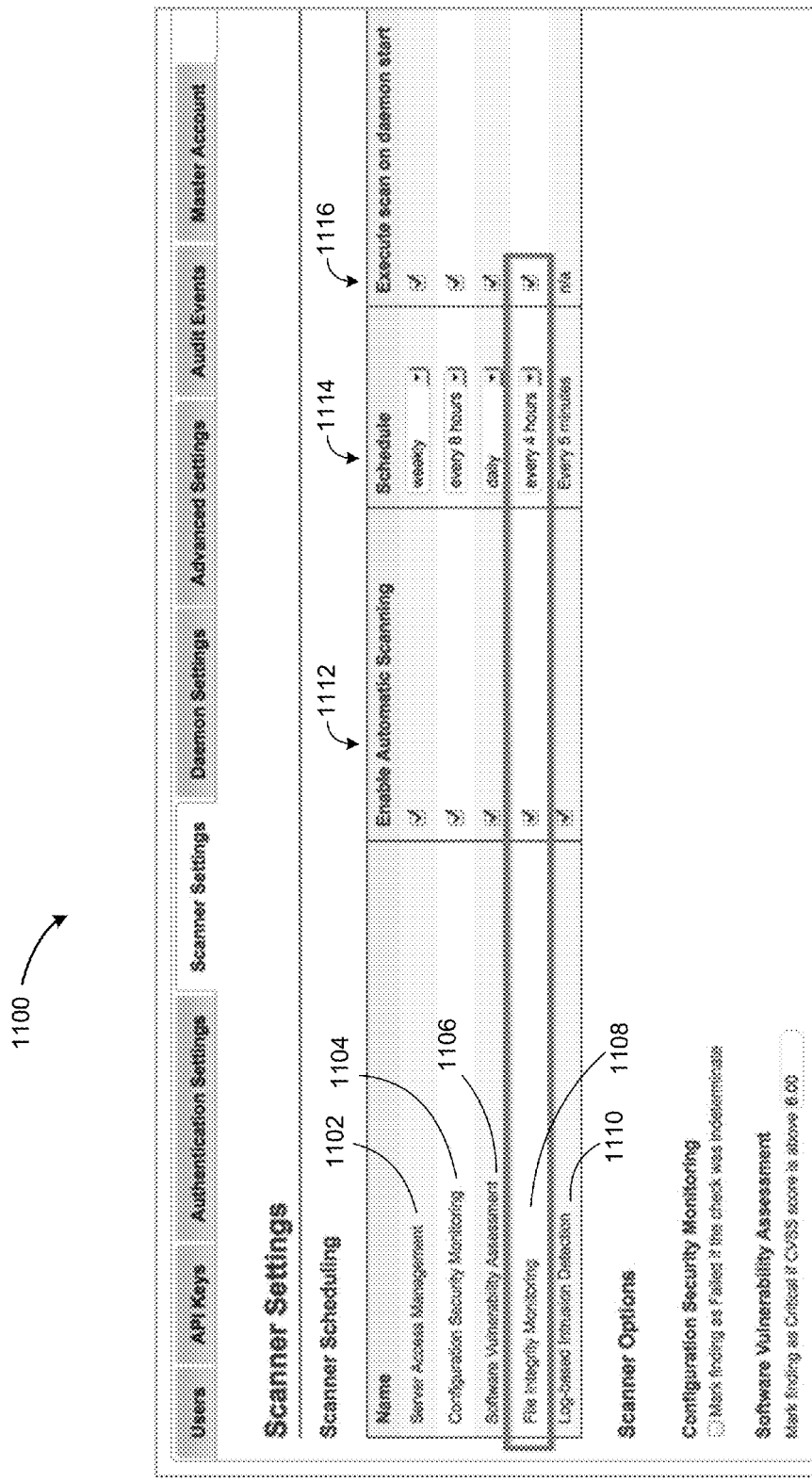
FIG. 11 provides a user interface for configuring security options in accordance with some embodiments.

FIG. 11 provides a user interface for configuring security options in accordance with some embodiments. Some embodiments provide security protection in multiple ways, including server access management 1102, configuration security monitoring 1104, software vulnerability assessment 1106, file integrity monitoring (FIM) 1108, and log-based intrusion protection 1110. In the user interface 1100, a security administrator can configure scanning options for each of these security processes. For example, the administrator can use the automatic scanning options 1112 to have scanning done automatically (the default) or only when selected manually. In some embodiments, an administrator can choose to initiate a scan manually even when configured for automatic scanning. The configuration settings also include a schedule 1114, which specifies how frequently a scan runs. Different security processes have different normal frequencies. For example, in the user interface 1100 illustrated in FIG. 11, the administrator has selected weekly scans for server access management 1102, but has selected to have scans every five minutes for log-based intrusion detection. For file integrity monitoring 1108, common schedules range from once an hour to once a day. The configuration settings also include a setting 1116 that specifies whether to perform a scan whenever the daemon (e.g., the agent executive/security control module 48) starts. This is on by default, but can be turned off.

Figure 12:
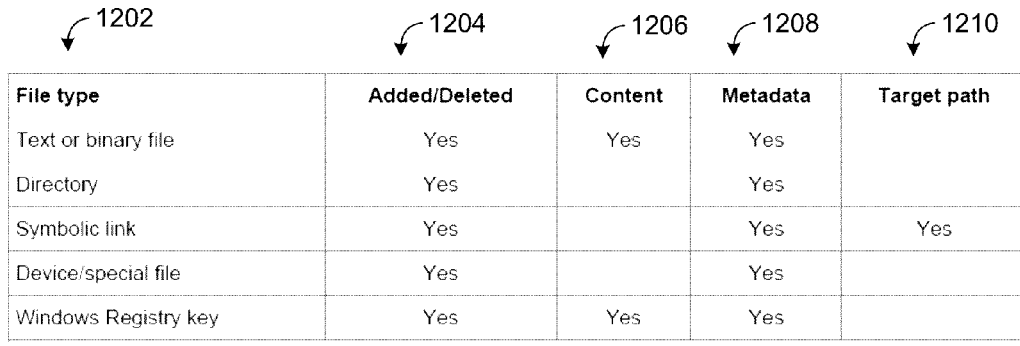
FIG. 12 identifies what aspects of objects can be monitored in accordance with some embodiments.

FIG. 12 identifies attributes of objects that can be monitored in accordance with some embodiments. In this example, there are five different "file" types 1202: (1) text files (e.g., a document or an image) and binary files (e.g., an EXE or DLL file); (2) directories; (3) symbolic links; (4) device or special files (e.g., named pipes); and Windows™ registry keys. The added/deleted column 1204 in the table indicates that monitoring will detect when any of the files are added or deleted. The content column 1206 indicates that file content is compared for text files, binary files, and registry keys. The content is evaluated by comparing content signatures, which are commonly computed as a hash of the content. The metadata column 1208 indicates that metadata is compared to the baseline for all of the file types. Some examples of metadata are illustrated below with respect to FIG. 13. The target path column 1210 indicates that for symbolic links, the target paths are compared to baseline values.

Figure 13:
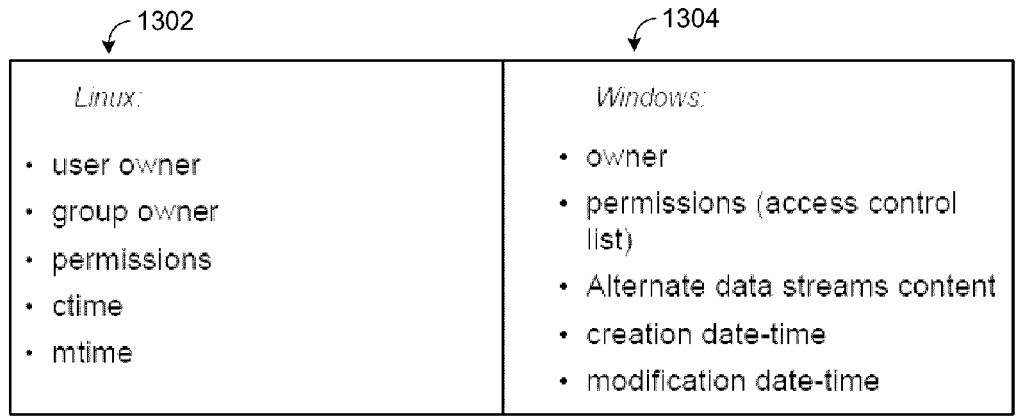
FIG. 13 illustrates some attributes of files and directories that may be tracked and compared for certain operating systems.

FIG. 13 illustrates some attributes of files and directories that may be tracked and compared for certain operating systems. The operating system determines what metadata is readily available. For example, the Linux column 1302 indicates that metadata is available that specifies user owner, group owner, permissions (e.g., read, write, or execute), ctime (creation date/time), and mtime (last modification date/time). Similarly, the Windows column 1304 indicates that metadata is available that specifies owner, permissions (e.g., an access control list), alternate data streams content, creation date/time, and last modification date/time. The available metadata is collected when a baseline is created, and the same types of metadata are collected later to verify integrity.

Figure 15A:
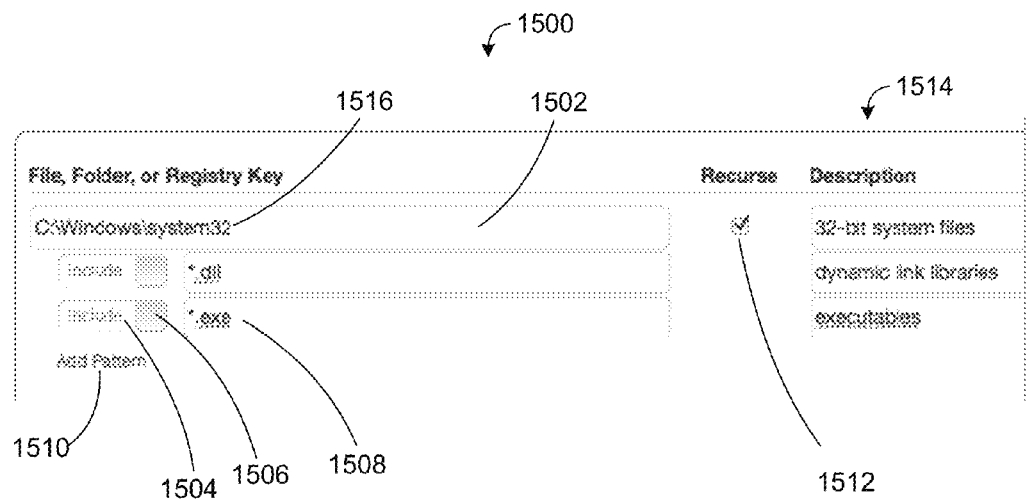
FIGS. 15A and 15B illustrate creating a specification of files and directories to be monitored in accordance with some embodiments.
Figure 15B:
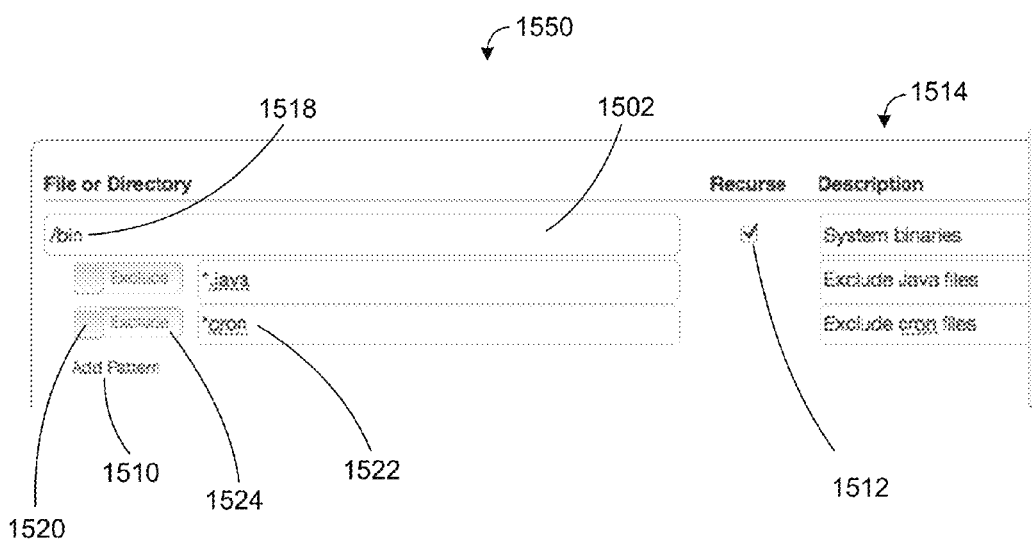

File integrity monitoring is usually applied only to sensitive files, such as binary files, passwords, configuration files, and unexpected new files or deleted files. Unexpected new or deleted files are identified by tracking sensitive directories. FIGS. 14A-14C provide examples of target objects for integrity monitoring in accordance with some embodiments. In FIG. 14A, individual file name examples 1402 are specified. In some embodiments, the file extensions are required (e.g., for Windows), but in some embodiments, the file extensions are omitted or optional (e.g., for Linux). FIG. 14B illustrates various examples 1404 of selecting a directory for monitoring. In some embodiments, when a directory is selected, the user may specify whether to include nested subdirectories as well. In some embodiments, inclusion of subdirectories is based on a "Recurse" option 1512, as illustrated in FIGS. 15A and 15B below. FIG. 14C provides an example 1406 of a registry key that can be selected for integrity monitoring.

FIGS. 15A and 15B illustrate creating a specification of files and directories to be monitored in accordance with some embodiments. The user interface snippet 1500 in FIG. 15A illustrates usage of file patterns for a Windows™ computing device. The user has selected a specific directory 1516 in the directory selection field 1502, and has selected the recurse option 1512. Within the selected directory 1516, the user has chosen to include certain file types using the Include option 1504. In some embodiments, the user can toggle between including or excluding using a toggle button 1506. Currently, the user has selected to include DLL files and EXE files 1508. Embodiments typically include a user interface control to add additional file patterns, such as an Add Pattern button 1510. Some embodiments include descriptions 1514 of the directories or file patterns selected.

The user interface snippet 1550 in FIG. 15B illustrates usage of file patterns for a Linux computing device. The user has selected a specific directory 1518 in the directory selection field 1502, and has selected the recurse option 1512. In this example, the user has selected the Exclude option 1524 in order to exclude Java files (*.java) and cron files (*.cron) 1522. Embodiments typically include an Include/Exclude toggle button 1520 to switch from exclusion to inclusion or vice versa.

Although not illustrated in FIG. 15A or 15B, some embodiments allow both inclusion and exclusion for the same directory. For example, include all EXE files, as illustrated in FIG. 15A, but exclude temp*.exe. In some embodiments, when a specific file matches both an inclusion pattern and an exclusion pattern, the file is excluded. In some embodiments, selecting a directory in the directory selection field 1502 acts like selecting the pattern *.* for inclusion. If the user subsequently chooses to include a specific pattern (such as *.exe 1508), there is no longer an implicit selection to include the *.* file pattern.

Figure 16:
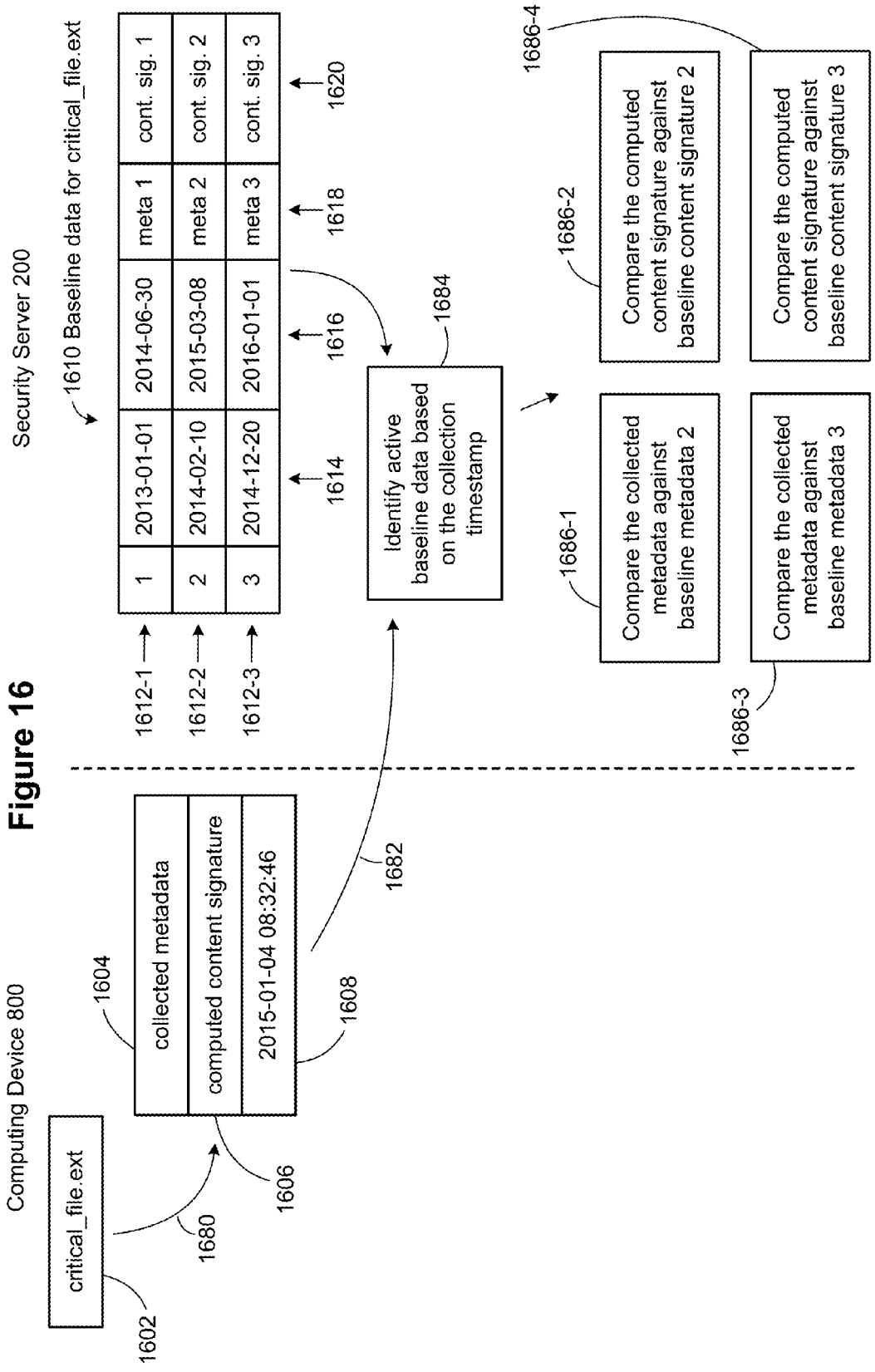
FIG. 16 illustrates a process of collecting data for a file and comparing the data against multiple baselines for the same file.
Figure 17A:
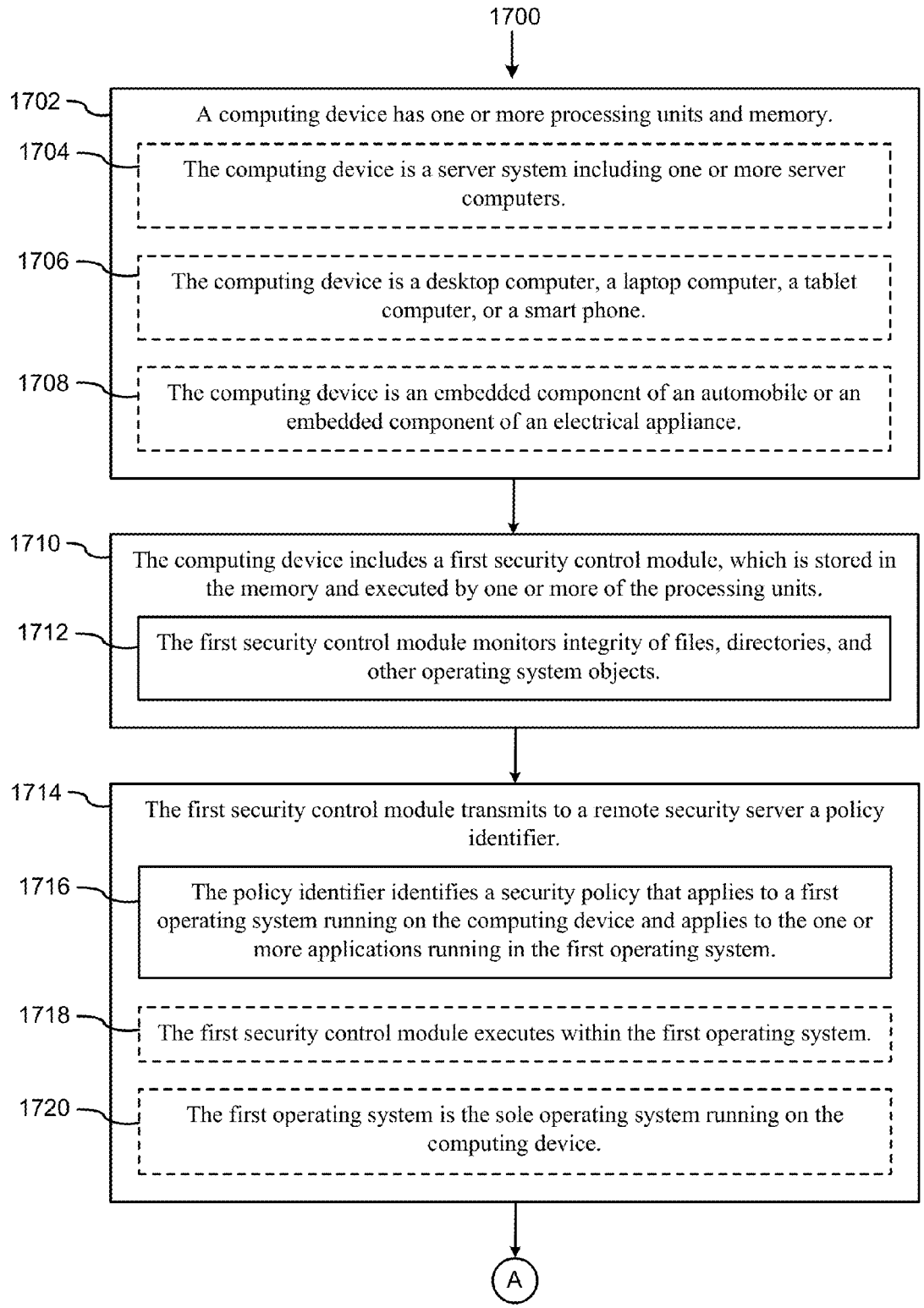
FIGS. 17A-17E provide a process flow for implementing file integrity monitoring at a computing device in accordance with some embodiments.
Figure 17B:
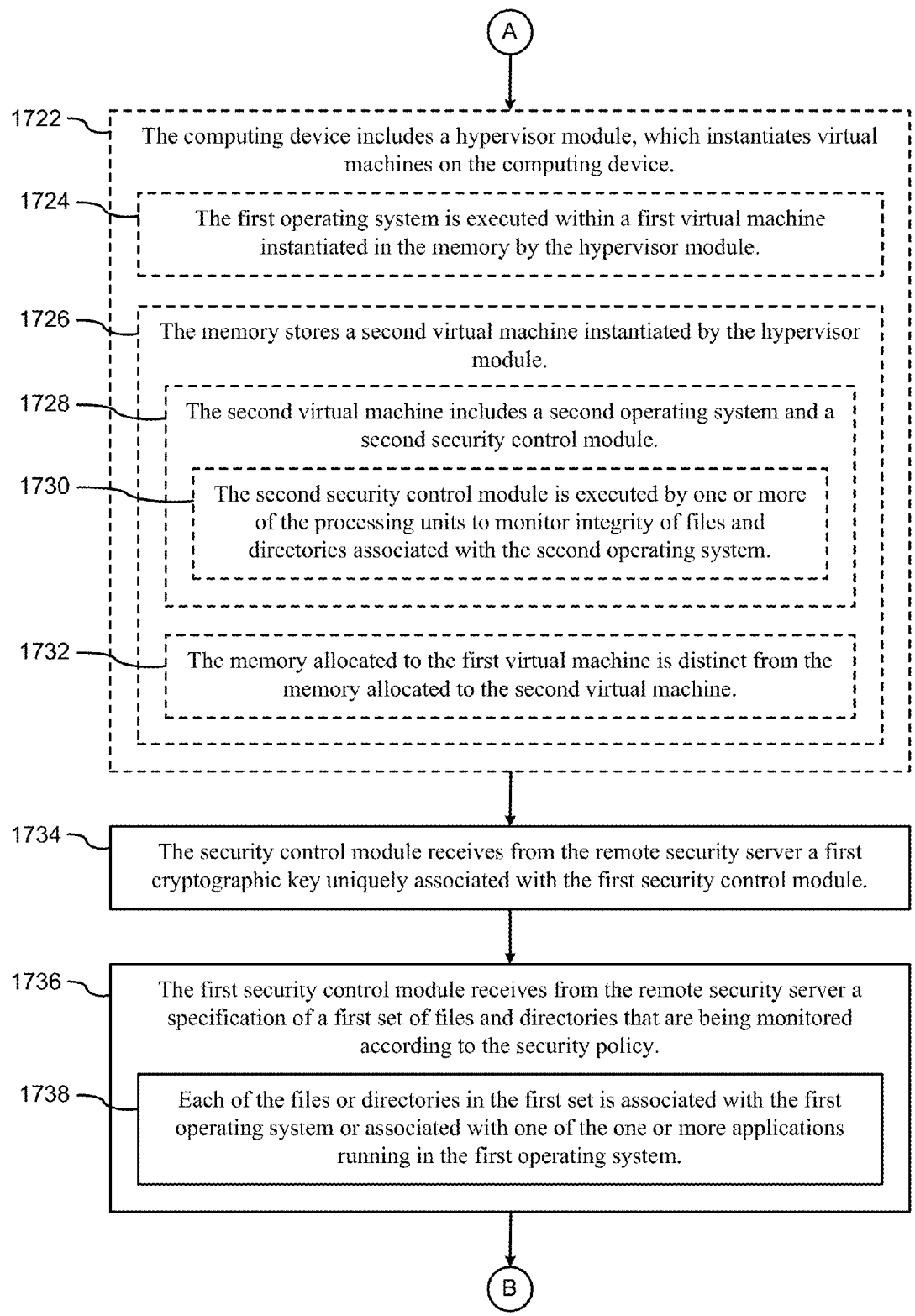
Figure 17C:
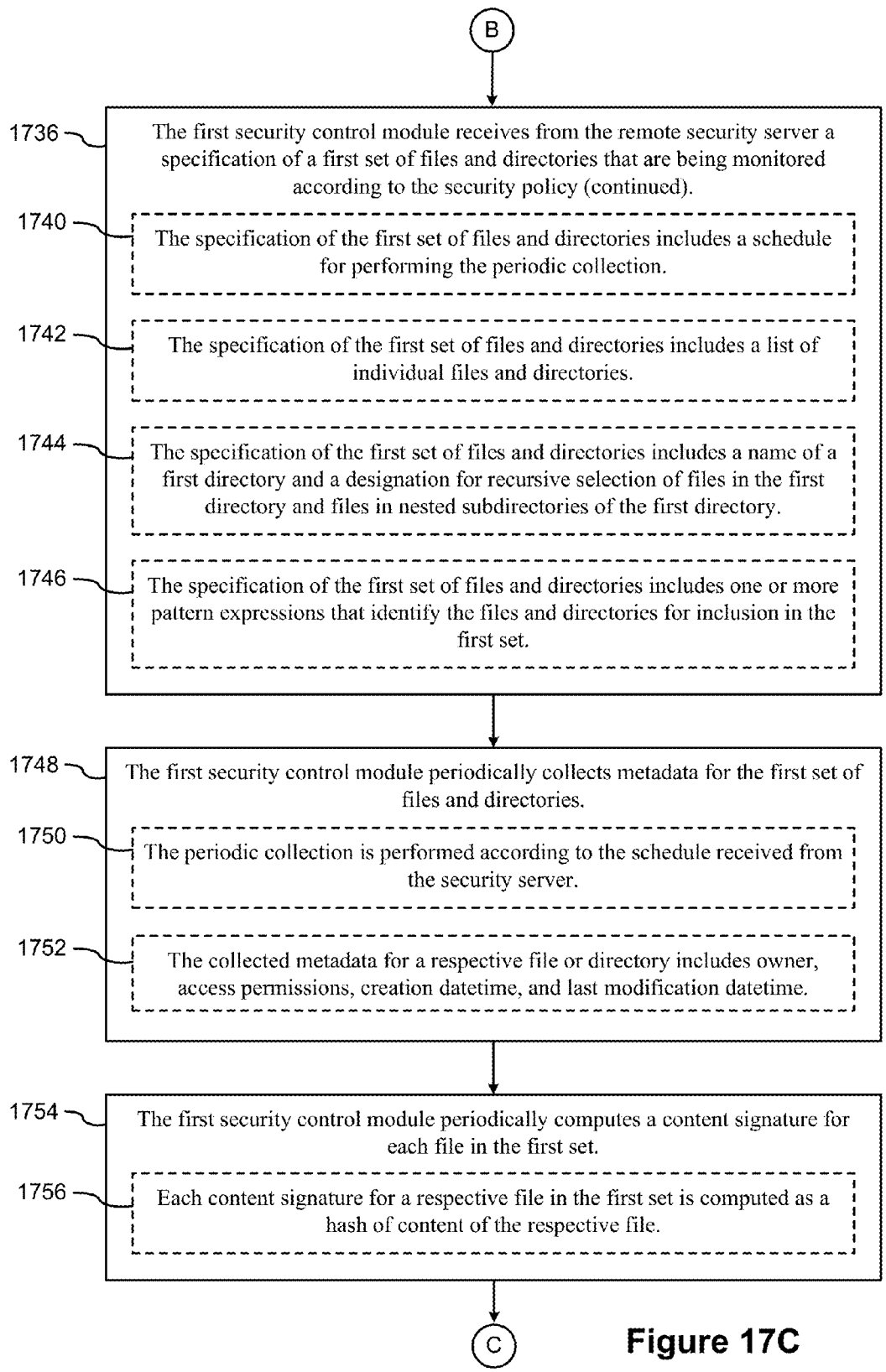
Figure 17D:
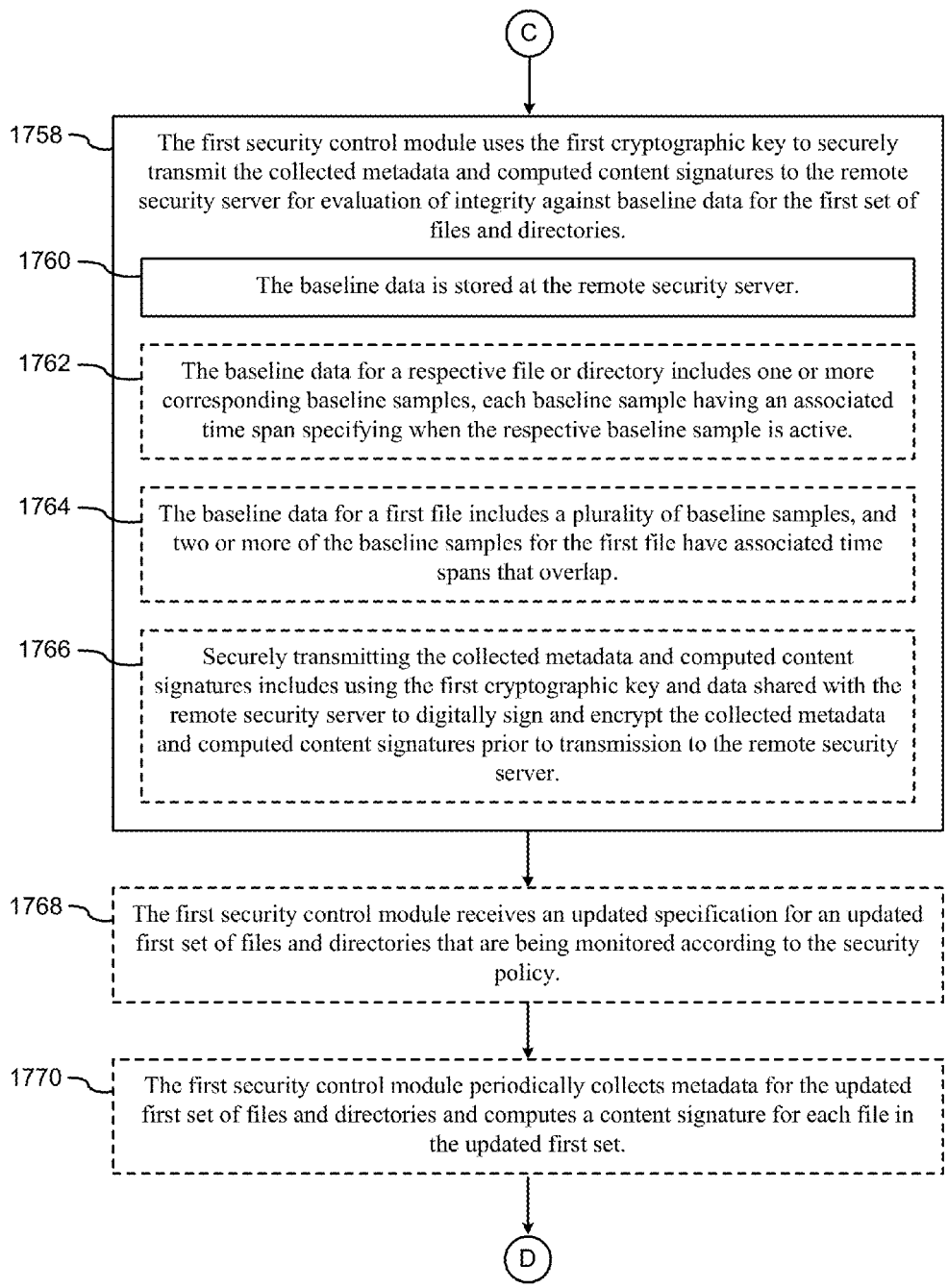
Figure 17E:
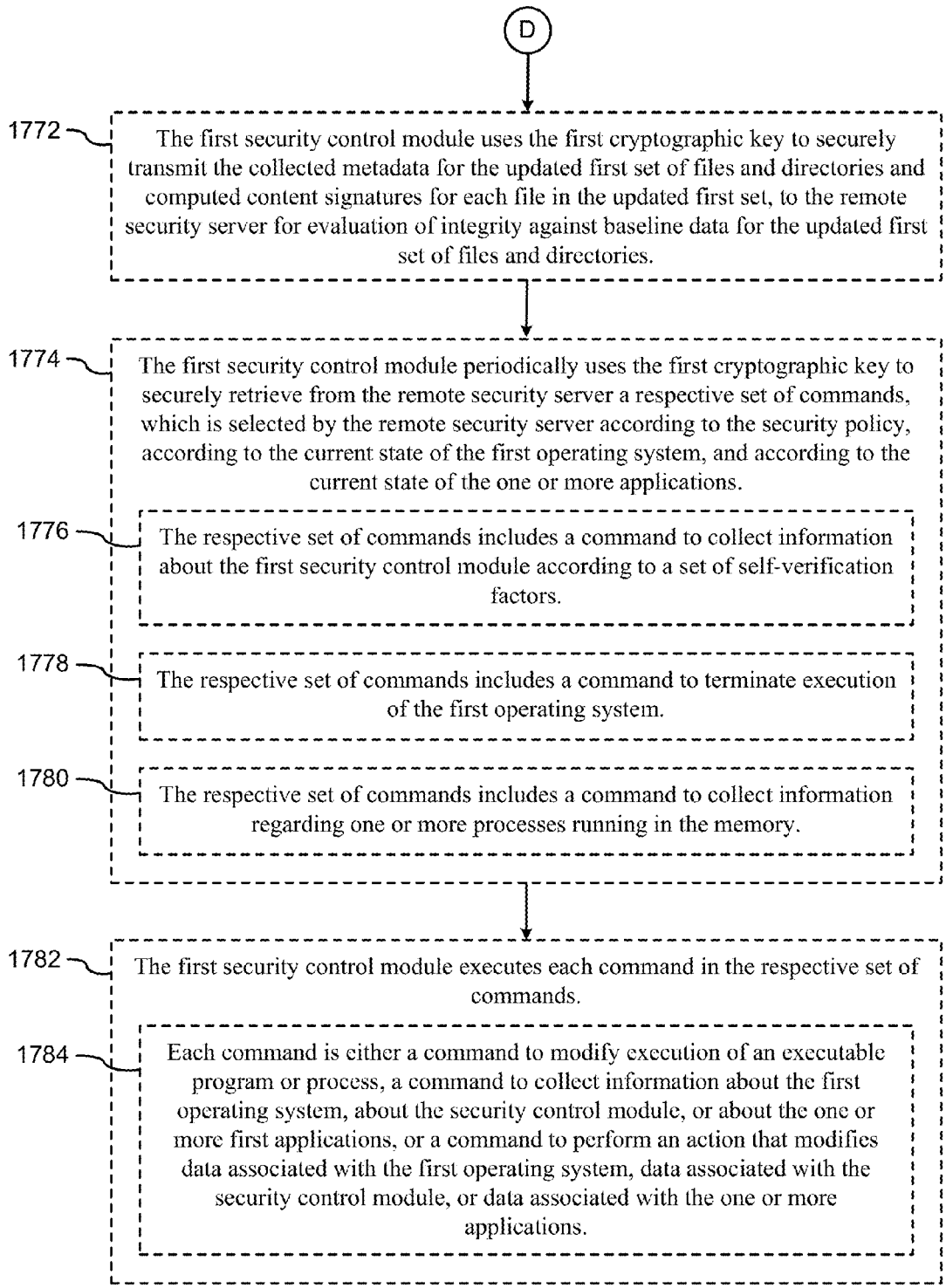
Figure 18A:
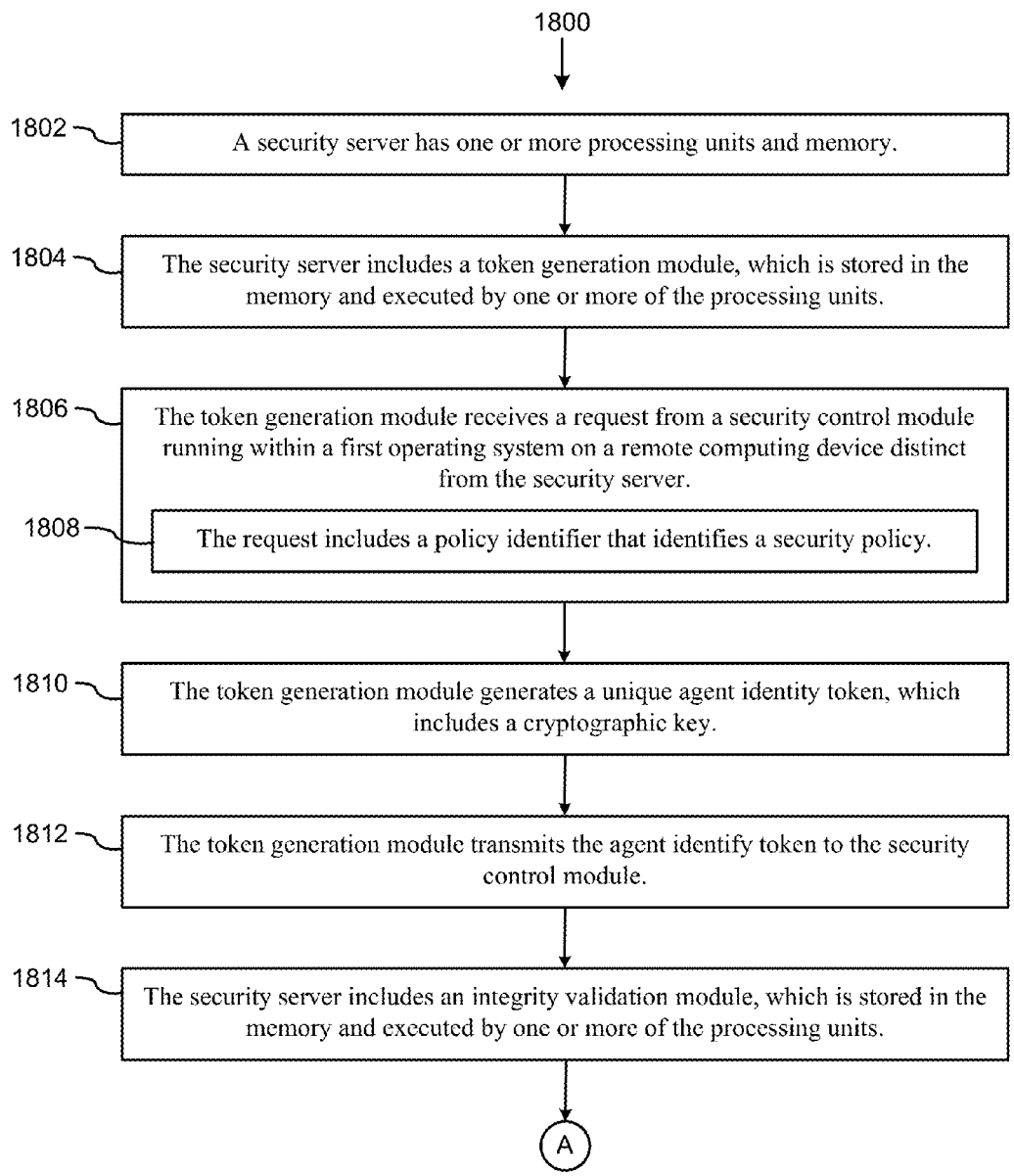
FIGS. 18A-18F provide a process flow for a security server that implements file integrity monitoring in accordance with some embodiments.
Figure 18B:
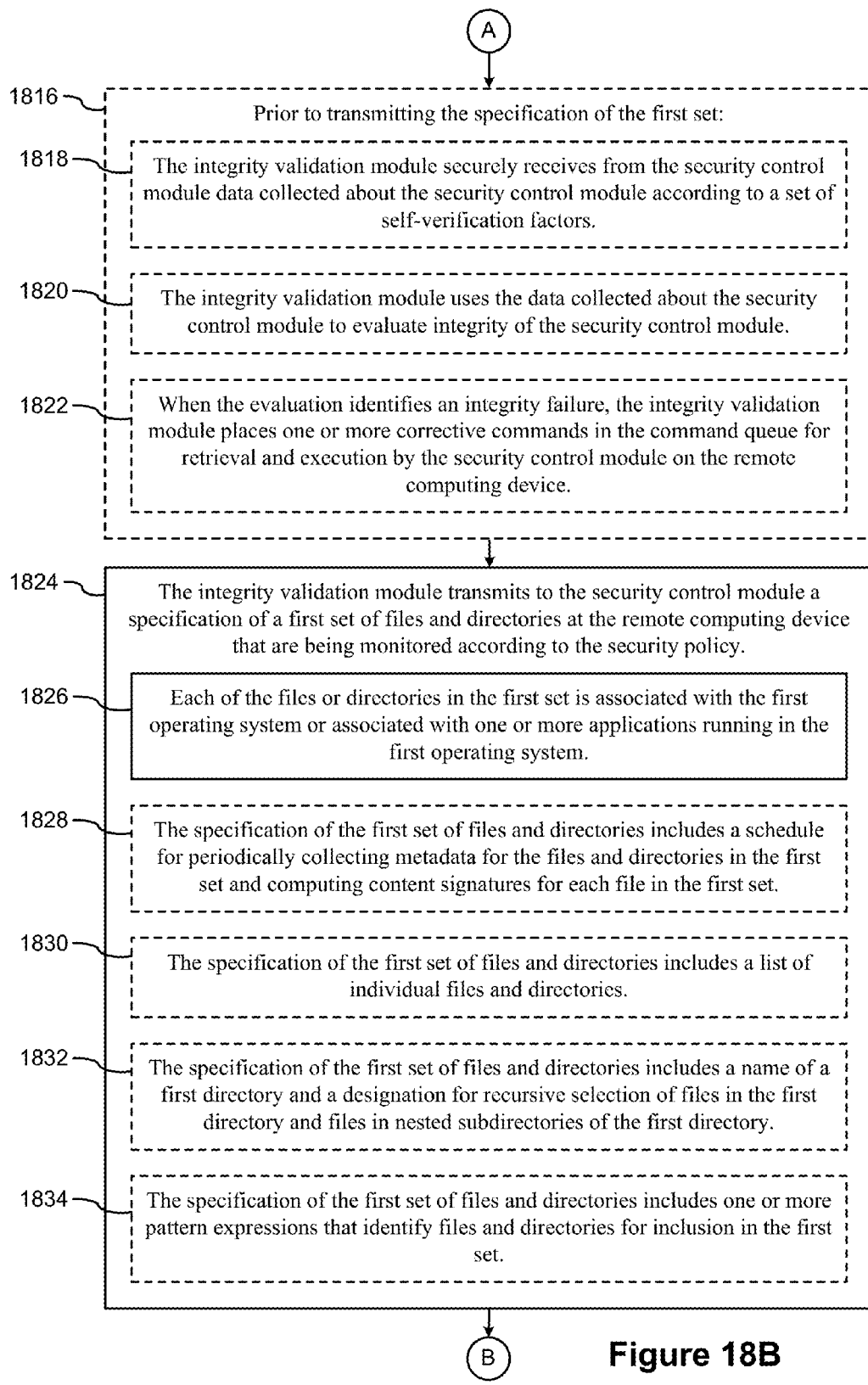
Figure 18C:
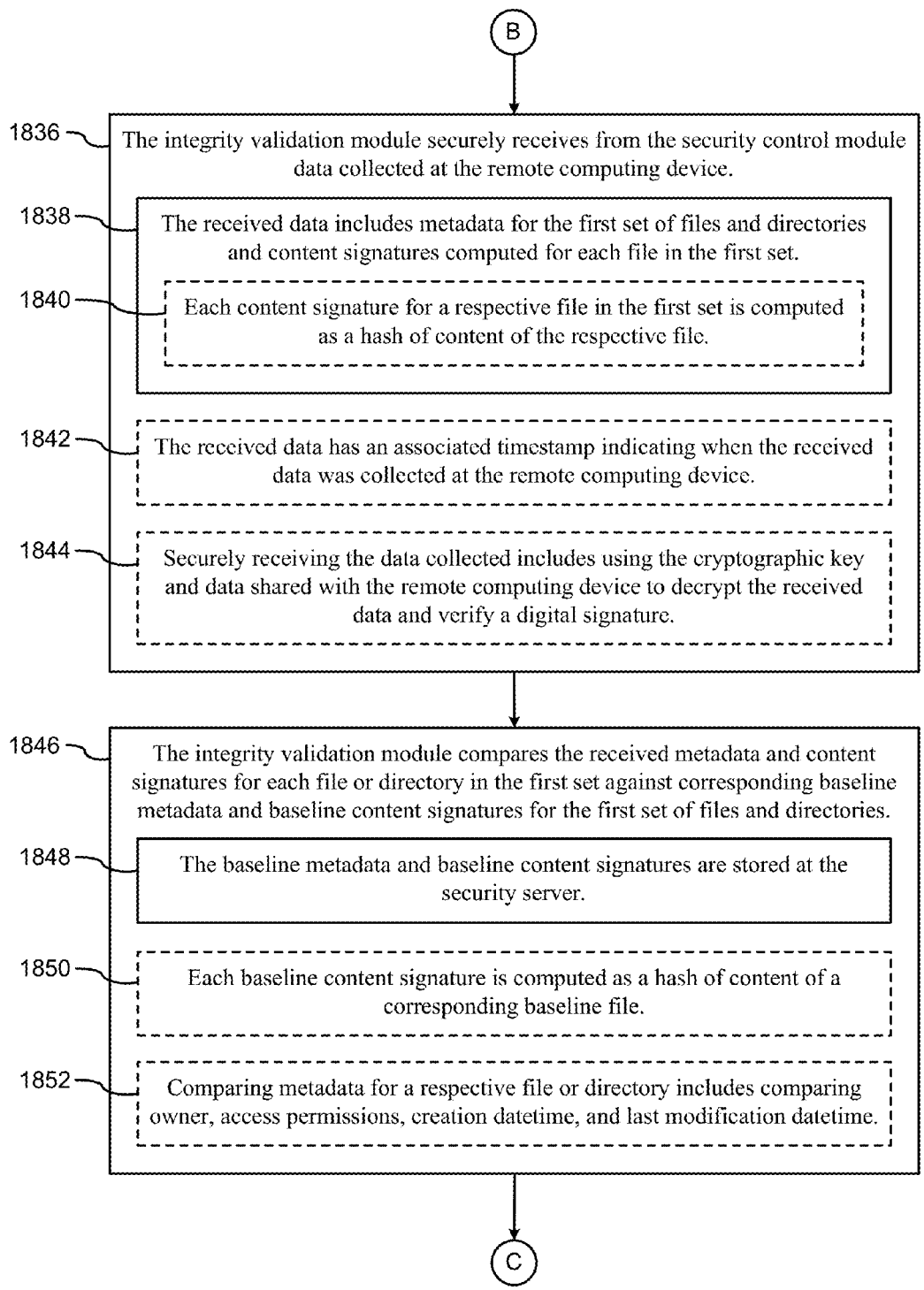
Figure 18D:
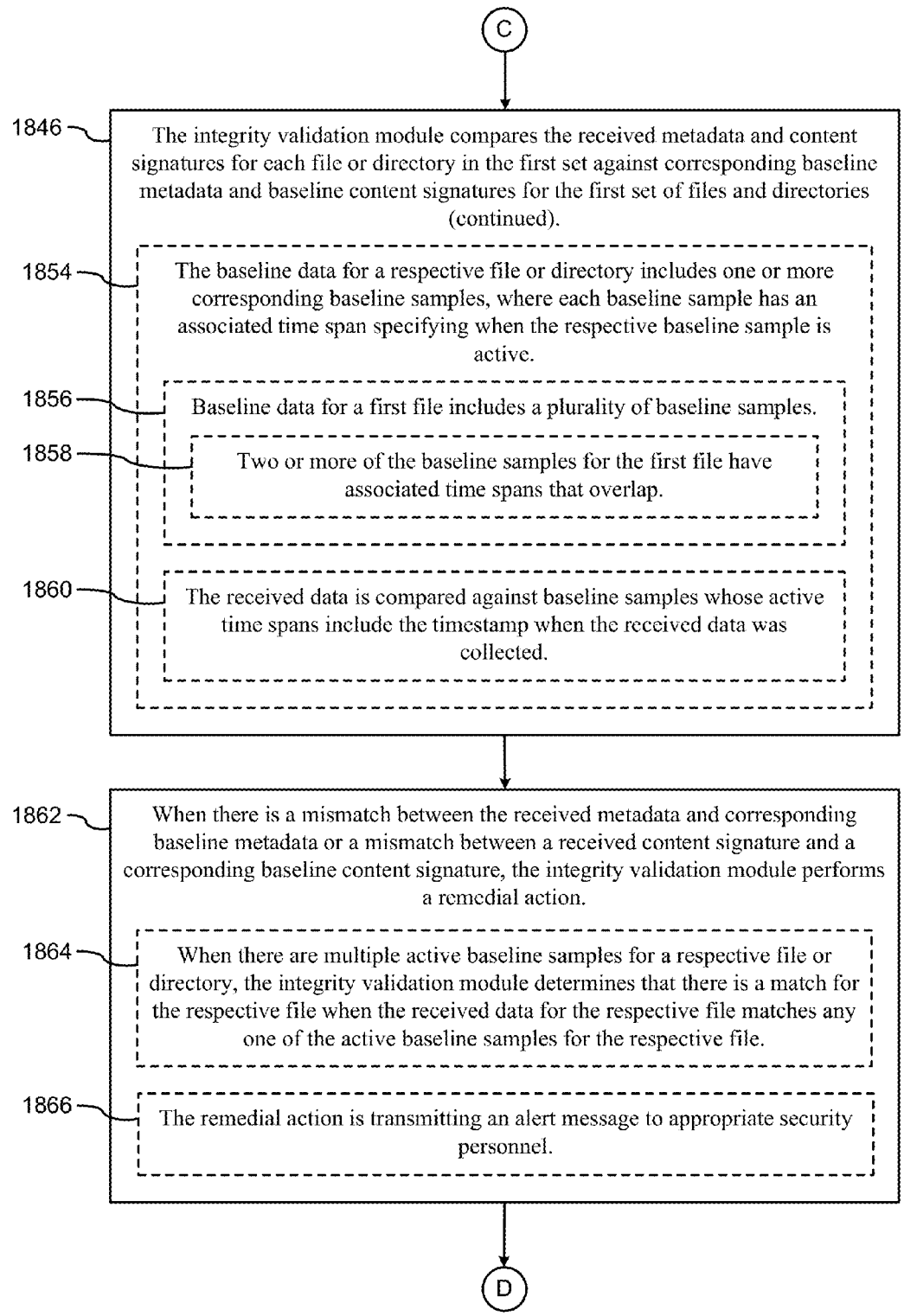
Figure 18E:
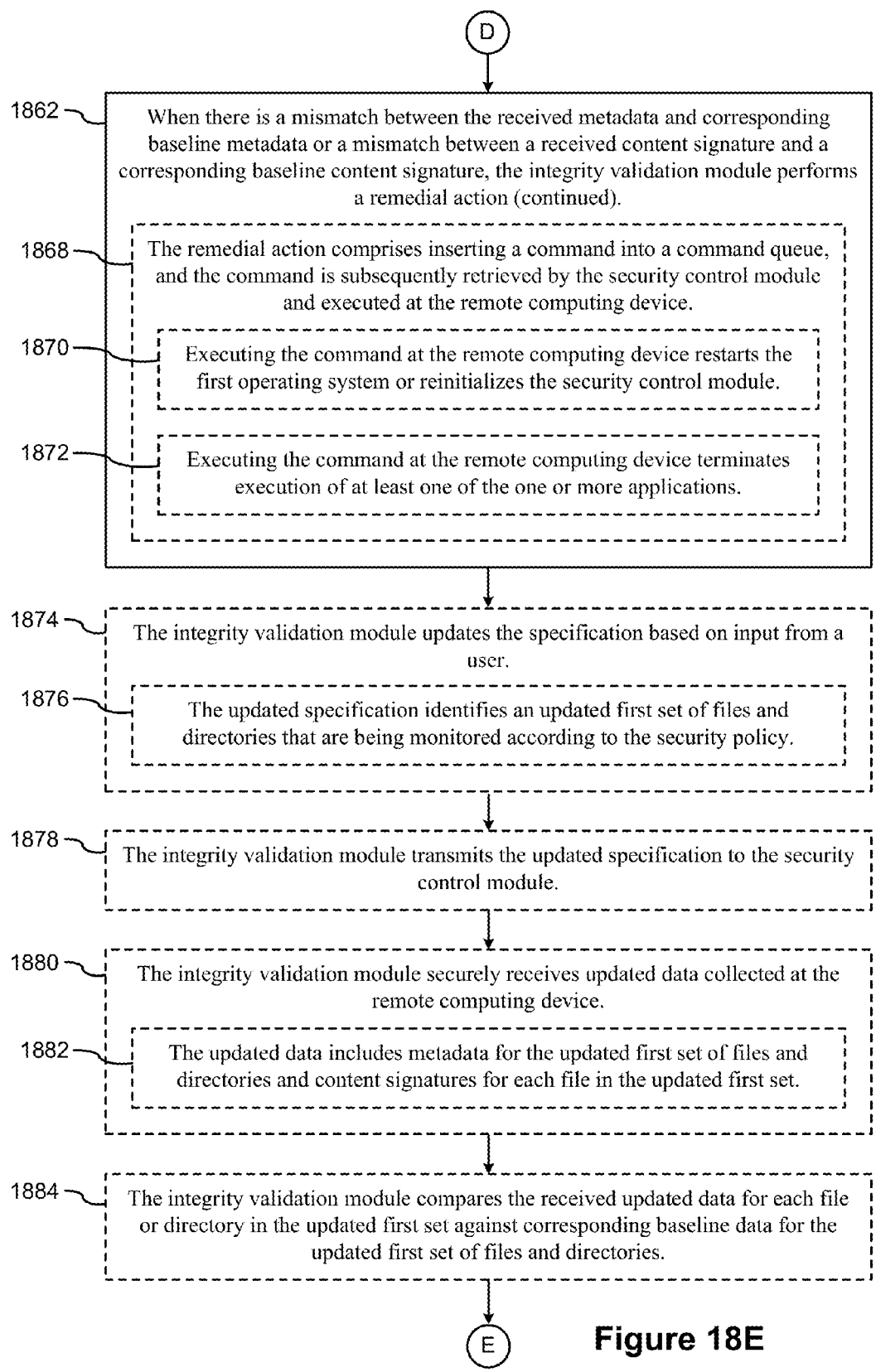
Figure 18F:
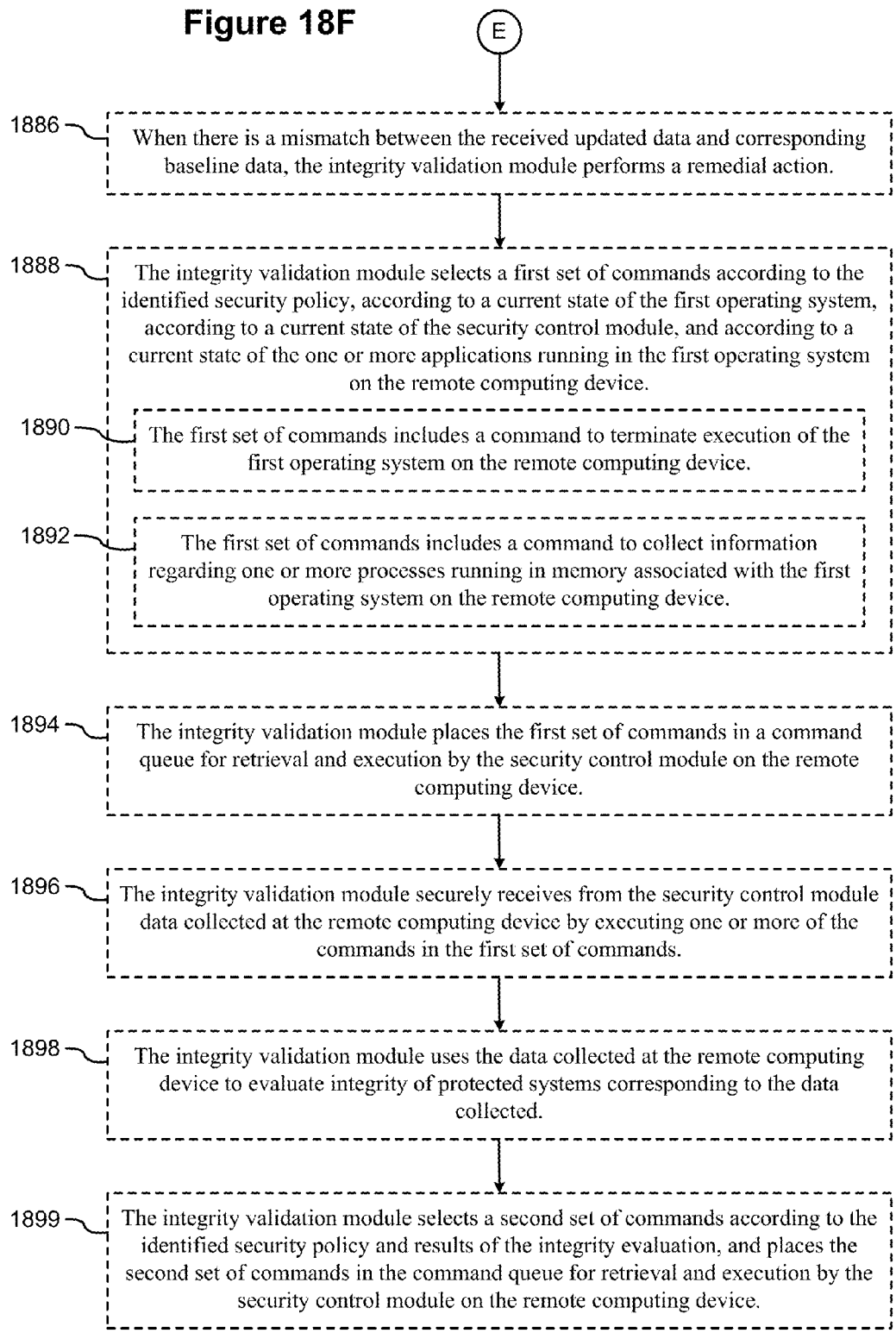

FIG. 16 illustrates a process of collecting data for a file and comparing the data against multiple baselines for the same file. A critical file 1602 exists on the computing device 800, and is being monitored. Baseline data 1610 for the critical file is stored at the server. In some embodiments, there are two or more distinct baseline samples 1612 for the critical file. In the illustrated example, there are three baseline samples, 1612-1, 1612-2, and 1612-3. Each baseline sample 1612 has an effective starting date 1614, an effective ending date 1616, and metadata 1618 for comparison. For some files, the baseline samples 1612 also include a content signature 1620, as described above with respect to FIG. 12. A baseline sample is active between the effective starting date 1614 and the effective ending date 1616.

In some embodiments, multiple baseline samples may be active at the same time, as illustrated in FIG. 16. In this illustration, the first baseline sample 1612-1 overlaps with the second baseline sample 1612-2, and the second baseline sample 1612-2 overlaps with the third baseline sample 1612-3.

Periodically (e.g., according to the schedule 1114), the security control module 48 on the computing device 800 scans (1680) the identified files and collects (1680) metadata 1604 for the critical file, computes (1680) a content signature 1606 for the critical file, and tracks the timestamp 1608 when the scan runs. Subsequently, the data (e.g., metadata 1604, content signature 1606, and scan timestamp 1608) are transmitted (1682) to the security server.

Based on the timestamp 1606, the integrity validation module identifies (1684) the active baseline samples 1612 for the critical file. In this illustration, the first baseline sample 1612-1 is not active, but the second and third baseline samples 1612-2 and 1612-3 are active. The integrity validation module then compares (1686-1) the collected metadata 1604 against the baseline metadata for the second baseline sample 1612-2 and compares (1686-3) the collected metadata 1604 against the baseline metadata for the third baseline sample 1612-3. In addition, because this critical file 1602 has content (e.g., it is a text or binary file), it has a content signature 1606 to compare (1686-2) against the baseline content signature for the second baseline sample 1612-2 and to compare (1686-4) against the baseline content signature for the third baseline sample 1612-3.

When there is a single baseline sample for a critical file, any mismatch shows up as a discrepancy. The type of action taken in response to a mismatch can depend on various factors, such as the nature of the critical file (e.g., how critical is the file), whether the discrepancy is correctable, or the nature of the discrepancy When there are two or more distinct active baseline samples for a single critical file, as illustrated in FIG. 16, the baseline samples are generally different, in which case the critical file 1602 on the computing device is guaranteed to be different from at least one of the active baseline samples. Therefore, in embodiments that allow multiple active baseline samples, the critical file is deemed valid when the critical file matches any one of the active baseline samples. Stated differently, there is a mismatch only when the critical file fails to match any of the active baseline samples.

The process illustrated in FIG. 16 assumes baseline samples for the critical file 1602 already exist. Before a file integrity policy can be used or assigned to a computing device (or group of computing devices), a baseline scan has to be run. In many cases, there are multiple computing devices with the same set of files to monitor, so a user selects a computing device for the baseline scan. For example, the scan may be performed on a "golden image" freshly installed on a server.

In addition, a baseline scan is rerun whenever there are changes to the target objects (e.g., a new software release) in the baseline or the policy specification changes (e.g., additional files are added to the list of files that are being monitored).

The selected computing device for the baseline scan represents the golden master—the canonical, correctly configured, clean system, which will serve as the point of reference for all clones of the computing system. In some embodiments, the computing device selected for the baseline is one server in a server group. In some embodiments, the computing device selected to build the baseline is set up solely as a template for the correct configuration of a certain type of server.

The baseline scan is run only on the one selected computing device. Subsequent monitoring scans are run on all the computing devices with the same file integrity monitoring security policy. Therefore, the structure and content of all the computing devices in the group should in general be identical to the baseline server, at least for the specific file targets defined in the policy. Some embodiments allow for specific exceptions.

In some embodiments, immediately after saving a new file integrity policy or saving changes to an existing one, the user is prompted to request a baseline scan. When a baseline scan is run, the user specifies a time window for which the baseline is active. In some embodiments, the effective starting date of a new scan is the current date of the scan, and the user specifies a lifetime for the baseline scan (e.g., the number of days before it expires), and optionally adds a comment about this baseline. In some embodiments, the active time window can be effective dated (e.g., specifying a stating date later than the current date).

In some situations a group of computing devices consists of servers that are similar but not necessarily all identical. For example, patch levels or application versions might vary slightly among the servers. To help handle that situation without fragmenting the server groups, some embodiments allow a user to define several baseline samples for a single group. For example, a user can identify multiple distinct "baseline servers" that will be used to generate baseline samples. Together, the baseline servers should cover all of the acceptable configurations of the group's servers.

When a file integrity scan runs on a computing device for which there are multiple baselines, each target object's content signature and metadata are compared with the baseline content signatures and metadata of that object for each baseline sample. If there is a match with any of the baseline samples, the target rule is matched. This is illustrated in FIG. 16.

If an object has changed and does not match any of the active baseline samples for the object, there is a violation and a security event is triggered.

If an object has been deleted, but all of the active baseline samples include the object, there is a violation and a security event is triggered.

If a new object is added and the new object does not exist in any of the baseline samples, there is a violation and a security event is triggered.

FIGS. 17A-17E provide a process flow 1700 for implementing security on a computing device in accordance with some embodiments. The computing device has (1702) one or more processing units and memory. In some embodiments, the computing device is (1704) a server system including one or more servers, such as the server system 100 illustrated in FIG. 1A. In some embodiments, the computing device is (1706) a desktop computer, a laptop computer, a tablet computer, or a smart phone. In some embodiments, the computing device is (1708) an embedded component of an automobile or an embedded component of an electrical appliance, such as a medical device. In some embodiments, the computing device is a point-of-sale terminal. In some embodiments, the computing device includes a hypervisor 40 and one or more virtual machines. In some embodiments, the computing device includes a single operating system, which is not executing within a virtual machine.

The computing device includes (1710) a first security control module 48 (also referred to as an agent executive), which is stored in the memory and executed by one or more of the processing units. The first security control module monitors (1712) integrity of files, directories, and operating system objects, as illustrated above in FIGS. 11-16.

The first security control module transmits (1714) to a remote security server a policy identifier. The policy identifier identifies (1716) a security policy that applies to a first operating system running on the computing device and applies to the one or more applications running in the first operating system. In some embodiments, the first security control module executes (1718) within the first operating system, as illustrated in FIGS. 1A and 7. In some embodiments, the first operating system is (1720) the sole operating system running on the computing device, as illustrated in FIG. 8.

In some embodiments, the computing device is a server system that instantiates one or more virtual machines, as illustrated in FIG. 1A. In these embodiments, the computing device includes (1722) a hypervisor module, which instantiates virtual machines on the computing device. In some embodiments, the first operating system executes (1724) within a first virtual machine instantiated in the memory by the hypervisor module.

In some embodiments, the memory stores (1726) a second virtual machine instantiated by the hypervisor module, as illustrated in FIGS. 1A and 7. The second virtual machine includes (1728) a second operating system and a second security control module. The second security control module is executed (1730) by one or more of the processing units to monitor integrity of files and directories associated with the second operating system. Typically, the memory allocated to the first virtual machine is (1732) distinct from the memory allocated to the second virtual machine. Programs within one virtual machine have no visibility or access to memory used by another virtual machine.

The integrity of files is monitored and evaluated by a remote security server 200, which is also referred to as a grid server. Because a single remote security server can monitor and evaluate many computing devices (and many individual virtual machines on a single computing device in some embodiments), security policies are used to identify what security applies to each security control module. A single policy typically applies to multiple security control modules.

The security control module transmits to a remote security server a policy identifier (e.g., a policy ID), which identifies a security policy that identifies which files will be monitored. The remote security server generates a token with a first cryptographic key and transmits it to the security control module. The security control module receives (1734) the first cryptographic key from the remote security server. The first cryptographic key is uniquely associated (1734) with the first security control module.

The first security control module 48 receives (1736) from the remote security server a specification of a first set of files and directories that are being monitored according to the security policy. Each of the files or directories in the first set is associated (1738) with the first operating system or associated with one of the one or more applications running in the first operating system. As noted above, the first set of monitored files is typically a small set of critical or sensitive files that do not typically change during ordinary operation of a computing device. Monitoring too many files can create problems. For example, monitoring too many files or monitoring them too frequently can consume resources of the computing device that reduce the performance of the primary operation of the computing device. As another example, monitoring too many files can lead to monitoring of files that do occasionally change during ordinary operation, thus leading to false alerts.

In some embodiments, the specification of the first set of files and directories includes (1740) a schedule for performing the periodic collection of file data. This is illustrated by the schedule data 1114 in FIG. 11. If the schedule changes, the security server provides the updated schedule to each to the relevant computing devices (e.g., by placing an appropriate schedule update command in the command queues 150).

Embodiments use various ways to specify which files and directories to monitor. For example, if the number of files and directories is small, the specification of the first set of files and directories may include (1742) a list of individual files and directories. In some instances, the specification of the first set of files and directories includes (1744) a name of a first directory and a designation for recursive selection of files in the first directory and files in nested subdirectories of the first directory. This is illustrated above in FIGS. 15A and 15B. In some instances, the specification of the first set of files and directories includes (1746) one or more pattern expressions that identify the files and directories for inclusion in the first set, as illustrated in FIGS. 15A and 15B. In some instances, a user specifies some individual file and directory names as well as some file patterns.

The first security control module periodically collects (1748) metadata for the first set of files and directories (and other objects, as illustrated in FIG. 12). In some embodiments, the periodic collection is performed (1750) according to the schedule received from the security server. In some embodiments, the collected metadata for a respective file or directory includes (1752) owner, access permissions, creation datetime, and last modification datetime. Some operating systems track additional metadata for files and directories (e.g., group owner in Linux), and embodiments typically collect any other available metadata as well.

In addition to collecting metadata, the first security control module periodically computes (1754) a content signature for each file in the first set. A content signature is meaningful for only certain file types, as illustrated in FIG. 12. In some embodiments, each content signature for a respective file in the first set is computed (1756) as a hash of content of the respective file. Typically metadata and content signatures are collected/computed together but some embodiments schedule these independently.

The metadata and content signatures are collected/computed at the computing device, but are compared to baseline data, which is stored (1760) at the security server. To prevent spoofing or other security breaches during transmission of the data, the first security control module uses (1758) the first cryptographic key to securely transmit (1758) the collected metadata and computed content signatures to the remote security server for evaluation of integrity against baseline data for the first set of files and directories. In some embodiments, securely transmitting the collected metadata and computed content signatures includes (1766) using the first cryptographic key and data shared 62 with the remote security server to digitally sign and encrypt the collected metadata and computed content signatures prior to transmission to the remote security server.

The baseline data for a respective file or directory includes (1762) one or more corresponding baseline samples and each baseline sample has (1762) an associated time span specifying when the respective baseline sample is active. This is illustrated in FIG. 16. In some instances, the baseline data for a first file includes (1764) a plurality of baseline samples, and two or more of the baseline samples for the first file have associated time spans that overlap.

In some instances, the security policy changes, and the first security control module receives (1768) an updated specification for an updated first set of files and directories that are being monitored according to the security policy. Once the first security control module receives the updated specification, the first security control module periodically collects (1770) metadata for the updated first set of files and directories and computes a content signature for each file in the updated first set. Then the first security control module uses (1772) the first cryptographic key to securely transmit (1772) the collected metadata for the updated first set of files and directories and computed content signatures for each file in the updated first set, to the remote security server for evaluation of integrity against baseline data for the updated first set of files and directories.

As illustrated in FIG. 11, file integrity monitoring is one security feature provided by some embodiments. In addition to collecting data for file integrity monitoring, some embodiments of the security control module are configured to retrieve and execute other commands as determined by the integrity validation module at the security server.

In some embodiments, the first security control module 48 periodically uses (1774) the first cryptographic key to securely retrieve (1774) from the remote security server a respective set of commands, which is selected by the remote security server according to the security policy, according to the current state of the first operating system, and according to the current state of the one or more applications. This is described in more detail above with respect to FIGS. 9A-9E. In some instances, the respective set of commands includes (1776) a command to collect information about the first security control module according to a set of self-verification factors. In some instances, the respective set of commands includes (1778) a command to terminate execution of the first operating system. In some instances, the respective set of commands includes (1780) a command to collect information regarding one or more processes running in the memory of the computing device.

When the security control module retrieves (1774) commands from the security server, the first security control module executes (1782) each command in the respective set of commands. In some embodiments, each command is (1784) either a command to modify execution of an executable program or process, a command to collect information about the first operating system, about the security control module, or about the one or more first applications, or a command to perform an action that modifies data associated with the first operating system, data associated with the security control module, or data associated with the one or more applications.

FIGS. 18A-18F provide a process flow for a security server 200 that implements file integrity monitoring in accordance with some embodiments. As illustrated above in FIGS. 16 and 17A-17E, the computing device 800 collects data for designated files, which are compared against baseline data at the security server 200. When mismatches are detected, corrective actions are taken, such as alerting an appropriate person or placing commands into a queue 150 for execution on the computing device. The monitoring process occurs on a regular periodic basis, such as every hour, every six hours, or once a day. The frequency can depend on the type of the computing device or the number of files being monitored. For example, if the computing device is an embedded component in an automobile, the process may occur less frequently (e.g., once a day or once every two days).

The security server 200 has (1802) one or more processing units and memory. The security server 200 includes (1804) a token generation module 144, which is stored in the memory and executed by one or more of the processing units. The token generation module 144 receives (1806) a request from a security control module 48 running within a first operating system 44 on a remote computing device distinct from the security server 200. As noted above with respect to FIGS. 17A-17E, the computing device may be a server with a hypervisor instantiating a plurality of virtual machines, or a device running a single operating system, such as an individual user computer, a computing device embedded in machine (e.g., a automobile or electrical appliance), or a point-of-sale terminal. The request includes (1808) a policy identifier that identifies a security policy. A security policy determines what security will be applied (e.g., what applications will be monitored, what processes will be monitored, what individual files and folders will be monitored, and so on).

The token generation module 144 generates (1810) a unique agent identity token 56 for the security control module. The agent identity token includes (1810) a cryptographic key. In some embodiments, the agent identity token 56 includes a piece of information 62 that will be shared by the security server and the security control module (but but by any other device). The shared information 62 and the cryptographic key can be used to guarantee integrity of communication between the security control module and the security server. Each distinct security control module instance has a unique agent identity token 56. In some embodiments, each agent identity token 62 corresponds to a unique command queue 150 on the security server 200. The token generation module 144 transmits (1812) the agent identity token 56 to the security control module 48.

The security server 200 also includes (1814) an integrity validation module 158, which is stored in the memory of the security server and executed by one or more of the processing units of the security server. In some embodiments, the security control module initiates a self-validation before (1816) the security server transmits the specification of the first set files to monitor. In some embodiments, the security control module collects initial self-validation data using a set of self-validation factors stored with the security control module. The integrity validation module 158 at the security server securely receives (1818) the data collected about the security control module. The integrity validation module 158 then uses (1820) the collected data to evaluate the integrity of the security control module. When the evaluation identifies an integrity failure, the integrity validation module 158 places (1822) one or more corrective commands into the command queue 150 for retrieval and execution by the security control module 48 on the remote computing device.

The integrity validation module transmits (1824) to the security control module a specification of a first set of files and directories at the remote computing device that are being monitored according to the security policy. Each of the files or directories in the first set is associated (1826) with the first operating system or associated with one or more applications running in the first operating system. In some embodiments, the specification of the first set of files and directories includes (1828) a schedule for periodically collecting metadata for the files and directories in the first set and computing content signatures for each file in the first set. In some instances, the specification of the first set of files and directories includes (1830) a list of individual files and directories. In some instances, the specification of the first set of files and directories includes (1832) a name of a first directory and a designation for recursive selection of files in the first directory and files in nested subdirectories of the first directory. This is illustrated in FIGS. 15A and 15B above. In some embodiments, the specification of the first set of files and directories includes (1834) one or more pattern expressions that identify files and directories for inclusion in the first set. This is illustrated above in FIGS. 15A and 15B.

The integrity validation module securely receives (1836) from the security control module data collected at the remote computing device. In particular, the received data includes (1838) metadata for the first set of files and directories and content signatures computed for each file in the first set. In some embodiments, each content signature for a respective file in the first set is computed (1840) as a hash of content of the respective file. In some embodiments, the received data has (1842) an associated timestamp indicating when the received data was collected at the remote computing device. The timestamp may be used to identify the relevant baseline samples for comparison. In some embodiments, securely receiving the data collected includes (1844) using the cryptographic key and data shared with the remote computing device to decrypt the received data and verify a digital signature. In some embodiments, this guarantees that the data was not altered during transmission and that the data was sent from the proper security control module (e.g., not spoofed).

The integrity validation module compares (1846) the received metadata and content signatures for each file or directory in the first set against corresponding baseline metadata and baseline content signatures for the first set of files and directories. The baseline metadata and baseline content signatures are stored (1848) at the security server. In some embodiments, each baseline content signature is computed (1850) as a hash of content of a corresponding baseline file. In some embodiments, comparing metadata for a respective file or directory includes (1852) comparing owner, access permissions, creation datetime, and last modification datetime.

In some embodiments, the baseline data for a respective file or directory includes (1854) one or more corresponding baseline samples, where each baseline sample has an associated time span specifying when the respective baseline sample is active. In some instances, the baseline data for a first file includes (1856) a plurality of baseline samples, as illustrated in FIG. 16. In some instances, two or more of the baseline samples for the first file have (1858) associated time spans that overlap. For example, in FIG. 16 the time spans for the second and third baseline samples 1612-2 and 1612-3 overlap. For embodiments that allow multiple baseline samples for a single file, the received data is compared (1860) against the baseline samples whose active time spans include the timestamp of when the received data was collected, as illustrated in FIG. 16.

When there is a mismatch between the received metadata and corresponding baseline metadata or a mismatch between a received content signature and a corresponding baseline content signature, the integrity validation module performs (1862) a remedial action. In some instances, the remedial action is (1866) transmitting an alert message to appropriate security personnel. In some instances, the remedial action comprises (1868) inserting a command into a command queue 150, and the command is subsequently retrieved by the security control module and executed at the remote computing device. For example, in some instances, executing the command at the remote computing device restarts (1870) the first operating system or reinitializes (1870) the security control module. In some instances, executing the command at the remote computing device terminates (1872) execution of at least one of the one or more applications (e.g., if the comparison identifies critical files for an application that have been compromised).

For embodiments with only a single baseline for each monitored file, any mismatch represents an error condition (with varying degrees of severity based on the nature of the file and the extent of the mismatch). However, when a single file can have more than one baseline sample, a monitored file at a computing device is okay as long as it matches one of the baseline samples. That is, when there are multiple active baseline samples for a respective file or directory, the integrity validation module determines (1864) that there is a match for the respective file when the received data for the respective file matches any one of the active baseline samples for the respective file.

In some instances, the integrity validation module updates (1874) the specification based on input from a user. The updated specification identifies (1876) an updated first set of files and directories that are being monitored according to the security policy. When this occurs, the integrity validation module transmits (1878) the updated specification to the security control module (e.g., by placing the update into a command queue 150, which is retrieved by the security control module). Subsequently, the security control module at the computing device collects data according to the new specification and transmits the data to the security server for evaluation by the integrity validation module. The integrity validation module 158 securely receives (1880) the updated data collected at the remote computing device. The updated data includes (1882) metadata for the updated first set of files and directories and content signatures for each file in the updated first set. The integrity validation module compares (1884) the received updated data for each file or directory in the updated first set against corresponding baseline data for the updated first set of files and directories. When there is a mismatch between the received updated data and corresponding baseline data, the integrity validation module performs (1886) a remedial action, such as sending an alert to appropriate personnel or inserting a command into a command queue 150 to perform an action at the computing device.

As illustrated in FIG. 11, file integrity monitoring is typically one of several security features that embodiments provide. Some embodiments include a command queue corresponding to each security control module, and the commands in each command queue are retrieved and executed by the security control module. The command queue can be used by each of the security processes, including file integrity monitoring, as illustrated above.

In some embodiments, the integrity validation module selects (1888) a first set of commands according to the identified security policy, according to a current state of the first operating system, according to a current state of the security control module, and according to a current state of the one or more applications running in the first operating system on the remote computing device. In some instances, the first set of commands includes (1890) a command to terminate execution of the first operating system on the remote computing device. In some instances, the first set of commands includes (1892) a command to collect information regarding one or more processes running in memory associated with the first operating system on the remote computing device. Other commands are described above in FIGS. 10A-10E.

The integrity validation module places (1894) the first set of commands into a command queue for retrieval and execution by the security control module on the remote computing device. After the security control module executes the commands, the security control module transmits collected data to the integrity validation module, which securely receives (1896) the data collected at the remote computing device. The integrity validation module uses (1898) the data collected at the remote computing device to evaluate (1898) integrity of protected systems corresponding to the data collected. The integrity validation module then selects (1899) a second set of commands according to the identified security policy and results of the integrity evaluation, and places (1899) the second set of commands in the command queue for retrieval and execution by the security control module on the remote computing device.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a tangible computer readable storage medium. For instance, the computer program product could contain the program modules shown in FIG. 1A, 1B, 7, or 8. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. For example, the agent identity token generator 144, agent communication module 148, server scan module 158, and agent self-verification module 160 may all be components of a single program, may be components of several different programs, or may each comprise multiple standalone programs. Any combination of these possibilities is possible provided that the functionality described above for these components and modules is achieved. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A computing device, comprising:
   one or more processing units;
   memory; and
   a first security control module, wherein the first security control module is stored in the memory and executed by one or more of the processing units to monitor integrity of files and directories, the first security control module including instructions for:
   transmitting to a remote security server a policy identifier, wherein the policy identifier identifies a security policy that applies to a first operating system running on the computing device and applies to one or more applications running in the first operating system;
   receiving from the remote security server a first cryptographic key uniquely associated with the first security control module;
   retrieving from the remote security server a first command to collect information about the first security control module according to a set of self-verification factors;
   securely transmitting the collected information to the remote security server for evaluation of integrity of the first security control module;
   when the remote security server identifies an integrity failure based on the collected information:
      (i) retrieving a second command from the remote security server, wherein the second command specifies a corrective action for the first security control module; and
      (ii) executing the second command to correct the integrity failure;
   receiving from the remote security server a specification of a first set of files and directories that are being monitored according to the security policy, wherein each of the files or directories in the first set is associated with the first operating system or associated with one of the one or more applications running in the first operating system;
   periodically collecting metadata for the first set of files and directories and computing a content signature for each file in the first set; and
   using the first cryptographic key to securely transmit the collected metadata and computed content signatures to the remote security server for evaluation of integrity against baseline data for the first set of files and directories, wherein the baseline data is stored at the remote security server.

2. The computing device of claim 1, wherein the specification of the first set of files and directories includes a schedule for performing the periodic collection, and the periodic collection is performed according to the schedule.

3. The computing device of claim 1, wherein the first security control module further includes instructions for:
   receiving an updated specification for an updated first set of files and directories that are being monitored according to the security policy;

periodically collecting metadata for the updated first set of files and directories and computing a content signature for each file in the updated first set; and using the first cryptographic key to securely transmit the collected metadata for the updated first set of files and directories and computed content signatures for each file in the updated first set, to the remote security server for evaluation of integrity against baseline data for the updated first set of files and directories.

4. The computing device of claim 1, wherein each content signature for a respective file in the first set is computed as a hash of content of the respective file.

5. The computing device of claim 1, wherein the collected metadata for a respective file or directory includes owner, access permissions, creation datetime, and last modification datetime.

6. The computing device of claim 1, wherein baseline data for a respective file or directory includes one or more corresponding baseline samples, each baseline sample having an associated time span specifying when the respective baseline sample is active.

7. The computing device of claim 6, wherein baseline data for a first file includes a plurality of baseline samples, and wherein two or more of the baseline samples for the first file have associated time spans that overlap.

8. The computing device of claim 1, wherein securely transmitting the collected metadata and computed content signatures includes using the first cryptographic key and data shared with the remote security server to digitally sign and encrypt the collected metadata and computed content signatures prior to transmission to the remote security server.

9. The computing device of claim 1, wherein the specification of the first set of files and directories includes a list of individual files and directories.

10. The computing device of claim 1, wherein the specification of the first set of files and directories includes a name of a first directory and a designation for recursive selection of files in the first directory and files in nested subdirectories of the first directory.

11. The computing device of claim 1, wherein the specification of the first set of files and directories includes one or more pattern expressions that identify the files and directories for inclusion in the first set.

12. The computing device of claim 1, wherein the first security control module further includes instructions for:
periodically using the first cryptographic key to securely retrieve from the remote security server a respective set of commands, wherein the respective set of commands is selected by the remote security server according to the security policy, according to a current state of the first operating system, and according to a current state of the one or more first applications; and executing each command in the respective set of commands, wherein each command is either a command to modify execution of an executable program or process, a command to collect information about the first operating system, about the first security control module, or about the one or more first applications, or a command to perform an action that modifies data associated with the first operating system, data associated with the first security control module, or data associated with the one or more first applications.

13. The computing device of claim 12, wherein the respective set of commands includes a command to terminate execution of the first operating system.

14. The computing device of claim 12, wherein the respective set of commands includes a command to collect information regarding one or more processes running in the memory.

15. The computing device of claim 1, wherein the first operating system is the sole operating system running on the computing device.

16. The computing device of claim 15, wherein the computing device is an embedded component of an automobile or an embedded component of an electrical appliance.

17. The computing device of claim 1, further comprising a hypervisor module, wherein the hypervisor module instantiates virtual machines on the computing device, and the first operating system is executed within a first virtual machine instantiated in the memory by the hypervisor module.

18. The computing device of claim 17, wherein the memory stores a second virtual machine instantiated by the hypervisor module, the second virtual machine includes a second operating system and a second security control module, the second security control module is executed by one or more of the processing units to monitor integrity of files and directories associated with the second operating system, and memory allocated to the first virtual machine is distinct from memory allocated to the second virtual machine.

19. A security server, comprising:
one or more processing units;
memory;
a token generation module, wherein the token generation module is stored in the memory and executed by one or more of the processing units, the token generation module including instructions for:
receiving a request from a security control module running within a first operating system on a remote computing device distinct from the security server, wherein the request includes a policy identifier that identifies a security policy;
generating a unique agent identity token, which includes a cryptographic key; and
transmitting the agent identity token to the security control module; and an integrity validation module, wherein the integrity validation module is stored in the memory and executed by one or more of the processing units, the integrity validation module including instructions for:
securely receiving from the security control module data collected about the security control module according to a set of self-verification factors;
using the data collected about the security control module to evaluate integrity of the security control module; and
when the evaluation identifies an integrity failure, placing one or more corrective commands in a command queue for retrieval and execution by the security control module on the remote computing device;
transmitting to the security control module a specification of a first set of files and directories at the remote computing device that are being monitored according to the security policy, wherein each of the files or directories in the first set is associated with the first operating system or associated with one or more applications running in the first operating system;
securely receiving from the security control module data collected at the remote computing device, wherein the received data includes metadata for the first set of files and directories and content signatures computed for each file in the first set;

comparing the received metadata and content signatures for each file or directory in the first set against corresponding baseline metadata and baseline content signatures for the first set of files and directories, wherein the baseline metadata and baseline content signatures are stored at the security server; and when there is a mismatch between the received metadata and corresponding baseline metadata or a mismatch between a received content signature and a corresponding baseline content signature, performing a remedial action.

20. The security server of claim 19, wherein the remedial action is transmitting an alert message to appropriate security personnel.

21. The security server of claim 19, wherein the remedial action comprises inserting a command into a command queue, and wherein the command is subsequently retrieved by the security control module and executed at the remote computing device.

22. The security system of claim 21, wherein executing the command at the remote computing device terminates execution of at least one of the one or more applications.

23. The security system of claim 21, wherein executing the command at the remote computing device restarts the first operating system or reinitializes the security control module.

24. The security server of claim 19, wherein the specification of the first set of files and directories includes a schedule for periodically collecting metadata for the files and directories in the first set and computing content signatures for each file in the first set.

25. The security server of claim 19, wherein the security control module further includes instructions for:

updating the specification based on input from a user, wherein the updated specification identifies an updated first set of files and directories that are being monitored according to the security policy;

transmitting the updated specification to the security control module;

securely receiving updated data collected at the remote computing device, wherein the updated data includes metadata for the updated first set of files and directories and content signatures for each file in the updated first set; and comparing the received updated data for each file or directory in the updated first set against corresponding baseline data for the updated first set of files and directories; and when there is a mismatch between the received updated data and corresponding baseline data, performing a remedial action.

26. The security server of claim 19, wherein each content signature for a respective file in the first set is computed as a hash of content of the respective file, and each baseline content signature is computed as a hash of content of a corresponding baseline file.

27. The security server of claim 19, wherein comparing metadata for a respective file or directory includes comparing owner, access permissions, creation datetime, and last modification datetime.

28. The security server of claim 19, wherein baseline data for a respective file or directory includes one or more corresponding baseline samples, each baseline sample having an associated time span specifying when the respective baseline sample is active.

29. The security server of claim 28, wherein baseline data for a first file includes a plurality of baseline samples, and wherein two or more of the baseline samples for the first file have associated time spans that overlap.

30. The security server of claim 28, wherein the received data has an associated timestamp indicating when the received data was collected at the remote computing device, and the received data is compared against baseline samples whose active time spans include the timestamp.

31. The security server of claim 30, wherein, when there are multiple active baseline samples for a respective file or directory, determining that there is a match for the respective file when the received data for the respective file matches any one of the active baseline samples for the respective file.

32. The security server of claim 19, wherein securely receiving the data collected includes using the cryptographic key and data shared with the remote computing device to decrypt the received data and verify a digital signature.

33. The security server of claim 19, wherein the specification of the first set of files and directories includes a list of individual files and directories.

34. The security server of claim 19, wherein the specification of the first set of files and directories includes a name of a first directory and a designation for recursive selection of files in the first directory and files in nested subdirectories of the first directory.

35. The security server of claim 19, wherein the specification of the first set of files and directories includes one or more pattern expressions that identify files and directories for inclusion in the first set.

36. The security server of claim 19, wherein the integrity validation module further includes instructions for:

selecting a first set of commands according to the identified security policy, according to a current state of the first operating system, according to a current state of the security control module, and according to a current state of the one or more applications running in the first operating system on the remote computing device;

placing the first set of commands in a command queue for retrieval and execution by the security control module on the remote computing device;

securely receiving from the security control module data collected at the remote computing device by executing one or more of the commands in the first set of commands;

using the data collected at the remote computing device to evaluate integrity of protected systems corresponding to the data collected; and selecting a second set of commands according to the identified security policy and results of the integrity evaluation, and placing the second set of commands in the command queue for retrieval and execution by the security control module on the remote computing device.

37. The security server of claim 36, wherein the first set of commands includes a command to terminate execution of the first operating system on the remote computing device.

38. The security server of claim 36, wherein the first set of commands includes a command to collect information regarding one or more processes running in memory associated with the first operating system on the remote computing device.

39. A non-transitory computer readable storage medium storing one or more programs configured for execution by a server system having one or more processors and memory, the one or more programs comprising a token generation module and an integrity validation module, wherein:
    the token generation module includes instructions for:
        receiving a request from a security control module running within a first operating system on a remote computing device distinct from the security server, wherein the request includes a policy identifier that identifies a security policy;
        generating a unique agent identity token, which includes a cryptographic key; and
        transmitting the agent identity token to the security control module; and
    the integrity validation module includes instructions for:
        securely receiving from the security control module data collected about the security control module according to a set of self-verification factors;
        using the data collected about the security control module to evaluate integrity of the security control module; and
        when the evaluation identifies an integrity failure, placing one or more corrective commands in a command queue for retrieval and execution by the security control module on the remote computing device;
        transmitting to the security control module a specification of a first set of files and directories at the remote computing device that are being monitored according to the security policy, wherein each of the files or directories in the first set is associated with the first operating system or associated with one or more applications running in the first operating system;
        securely receiving from the security control module data collected at the remote computing device, wherein the received data includes metadata for the first set of files and directories and content signatures computed for each file in the first set;
        comparing the received metadata and content signatures for each file or directory in the first set against corresponding baseline metadata and baseline content signatures for the first set of files and directories, wherein the baseline metadata and baseline content signatures are stored at the security server; and
        when there is a mismatch between the received metadata and corresponding baseline metadata or a mismatch between a received content signature and a corresponding baseline content signature, performing a remedial action.

\* \* \* \* \*